United States Patent
Georgiev et al.

(10) Patent No.: US 8,228,417 B1
(45) Date of Patent: Jul. 24, 2012

(54) FOCUSED PLENOPTIC CAMERA EMPLOYING DIFFERENT APERTURES OR FILTERING AT DIFFERENT MICROLENSES

(75) Inventors: Todor G. Georgiev, Sunnyvale, CA (US); Andrew Lumsdaine, Bloomington, IN (US)

(73) Assignee: Adobe Systems Incorporated, San Jose, CA (US)

( * ) Notice: Subject to any disclaimer, the term of this patent is extended or adjusted under 35 U.S.C. 154(b) by 561 days.

(21) Appl. No.: 12/503,803

(22) Filed: Jul. 15, 2009

(51) Int. Cl.
*H04N 5/225* (2006.01)
*G03B 13/00* (2006.01)
*G03B 3/00* (2006.01)
*G03B 7/099* (2006.01)
*G02B 21/00* (2006.01)

(52) U.S. Cl. .......... 348/340; 348/335; 348/345; 396/89; 396/268; 359/368

(58) Field of Classification Search .................. 348/335, 348/345–351, 340; 396/89, 268, 104; 359/368, 359/619; 250/208.1
See application file for complete search history.

(56) References Cited

U.S. PATENT DOCUMENTS

| | | | |
|---|---|---|---|
| 725,567 A | 4/1903 | Ives | |
| 2,039,648 A | 5/1936 | Ives | |
| 3,985,419 A | 10/1976 | Matsumoto et al. | |
| 4,180,313 A | 12/1979 | Inuiya | |
| 4,193,093 A | 3/1980 | St. Clair | |
| 4,230,942 A | 10/1980 | Stauffer | |
| 4,580,219 A | 4/1986 | Pelc et al. | |
| 4,732,453 A | 3/1988 | de montebello et al. | |
| 4,849,782 A | 7/1989 | Koyama et al. | |
| 5,076,687 A | 12/1991 | Adelson | |
| 5,361,127 A | 11/1994 | Daily | |
| 5,400,093 A | 3/1995 | Timmers | |
| 5,659,420 A | 8/1997 | Wakai et al. | |
| 5,729,011 A | 3/1998 | Sekiguchi | |
| 5,946,077 A | 8/1999 | Nemirovskiy | |

(Continued)

FOREIGN PATENT DOCUMENTS

EP 1548481 6/2005

(Continued)

OTHER PUBLICATIONS

JP504669 (1975), all pages, english equivalent is U.S. Patent 3985419, dated Oct. 12, 1976 by Matsumoto, et al.

(Continued)

*Primary Examiner* — Lin Ye
*Assistant Examiner* — Mekonnen Dagnew
(74) *Attorney, Agent, or Firm* — Robert C. Kowert; Meyertons, Hood, Kivlin, Kowert & Goetzel, P.C.

(57) ABSTRACT

Methods and apparatus for capturing and rendering images with focused plenoptic cameras employing different filtering at different microlenses. In a focused plenoptic camera, the main lens creates an image at the focal plane. That image is re-imaged on the sensor multiple times by an array of microlenses. Different filters that provide different levels and/or types of filtering may be combined with different ones of the microlenses. A flat captured with the camera includes multiple microimages captured according to the different filters. Multiple images may be assembled from the microimages, with each image assembled from microimages captured using a different filter. A final image may be generated by appropriately combining the images assembled from the microimages. Alternatively, a final image, or multiple images, may be assembled from the microimages by first combining the microimages and then assembling the combined microimages to produce one or more output images.

23 Claims, 35 Drawing Sheets

U.S. PATENT DOCUMENTS

| | | | |
|---|---|---|---|
| 6,097,394 A | 8/2000 | Levoy et al. | |
| 6,097,541 A | 8/2000 | Davies et al. | |
| 6,137,535 A | 10/2000 | Meyers | |
| 6,137,937 A | 10/2000 | Okano et al. | |
| 6,268,846 B1 | 7/2001 | Georgiev | |
| 6,301,416 B1 | 10/2001 | Okano et al. | |
| 6,339,506 B1 | 1/2002 | Wakelin et al. | |
| 6,351,269 B1 | 2/2002 | Georgiev | |
| 6,476,805 B1 | 11/2002 | Shum et al. | |
| 6,738,533 B1 | 5/2004 | Shum et al. | |
| 6,838,650 B1 | 1/2005 | Toh | |
| 7,019,671 B2 | 3/2006 | Kawai | |
| 7,054,067 B2 | 5/2006 | Okano et al. | |
| 7,085,062 B2 | 8/2006 | Hauschild | |
| 7,620,309 B2 * | 11/2009 | Georgiev | 396/113 |
| 7,723,662 B2 * | 5/2010 | Levoy et al. | 250/208.1 |
| 7,732,744 B2 | 6/2010 | Utagawa | |
| 7,792,423 B2 | 9/2010 | Raskar et al. | |
| 7,880,794 B2 | 2/2011 | Yamagata et al. | |
| 7,962,033 B2 | 6/2011 | Georgiev et al. | |
| 7,965,936 B2 * | 6/2011 | Raskar et al. | 396/268 |
| 8,019,215 B2 | 9/2011 | Georgiev et al. | |
| 2001/0012149 A1 | 8/2001 | Lin et al. | |
| 2001/0050813 A1 | 12/2001 | Allio | |
| 2002/0140835 A1 | 10/2002 | Silverstein | |
| 2003/0231255 A1 | 12/2003 | Szajewski et al. | |
| 2004/0114807 A1 | 6/2004 | Lelescu et al. | |
| 2004/0223214 A1 | 11/2004 | Atkinson | |
| 2005/0088714 A1 | 4/2005 | Kremen | |
| 2005/0122418 A1 | 6/2005 | Okita et al. | |
| 2006/0104542 A1 | 5/2006 | Blake et al. | |
| 2007/0091197 A1 | 4/2007 | Okayama et al. | |
| 2007/0252074 A1 | 11/2007 | Ng et al. | |
| 2008/0056549 A1 | 3/2008 | Hamill et al. | |
| 2008/0107231 A1 | 5/2008 | Miyazaki et al. | |
| 2008/0152215 A1 | 6/2008 | Horie et al. | |
| 2008/0165270 A1 * | 7/2008 | Watanabe et al. | 348/340 |
| 2008/0166063 A1 | 7/2008 | Zeng | |
| 2008/0187305 A1 | 8/2008 | Raskar et al. | |
| 2008/0193026 A1 | 8/2008 | Horie et al. | |
| 2008/0218610 A1 | 9/2008 | Chapman et al. | |
| 2008/0247623 A1 | 10/2008 | Delso et al. | |
| 2009/0041381 A1 | 2/2009 | Georgiev | |
| 2009/0041448 A1 | 2/2009 | Georgiev | |
| 2009/0086304 A1 | 4/2009 | Yurlov et al. | |
| 2009/0140131 A1 * | 6/2009 | Utagawa | 250/226 |
| 2009/0185801 A1 | 7/2009 | Georgiev et al. | |
| 2009/0295829 A1 | 12/2009 | Georgiev et al. | |
| 2010/0026852 A1 * | 2/2010 | Ng et al. | 348/239 |
| 2010/0085468 A1 | 4/2010 | Park et al. | |
| 2010/0205388 A1 | 8/2010 | MacInnis | |

FOREIGN PATENT DOCUMENTS

| | | |
|---|---|---|
| JP | 7270791 | 10/1995 |
| JP | 2001330769 | 11/2001 |
| JP | 2004239932 | 8/2004 |
| WO | 01/37025 | 5/2001 |
| WO | 2006/057838 | 6/2006 |
| WO | 2007/115281 | 10/2007 |

OTHER PUBLICATIONS

U.S. Appl. No. 12/271,389, filed Nov. 14, 2008.
U.S. Appl. No. 12/474,112, filed May 28, 2009.
Adelson, T., and Wang, J., "Single lens stereo with a plenoptic camera," IEEE Transactions on Pattern Analysis and Machine Intelligence, vol. 14, issue 2, 99-106, 1992.
Borman, S., and Stevenson, R., "Super-resolution from image sequences—a review", Proceedings of the 1998 Midwest Symposium on Circuits and Systems, Publication Date: Aug 9-12, 1998, on pp. 374-378.
Elad, M., and Feuer, A., "Restoration of a single superresolution image from several blurred, noisy, and undersampled measured images," IEEE Transactions on Image Processing Dec. 1997.
Farsiu, S., Robinson, D., Elad, M., and Milanfar, P., "Advances and challenges in super-resolution," International Journal of Imaging Systems and Technology, 2004.
Georgiev, T., Zheng, K., Curless, B., Salesin, D., and et al., "Spatio-angular resolution tradeoff in integral photography," Proc. Eurographics Symposium on Rendering, 2006.
Gortler, S. J., Grzeszczuk, R., Szeliski, R., and Cohen, M. F., "The lumigraph," ACM Trans. Graph., 43-54, 1996.
Isaksen, A., McMillan, L., and Gortler, S. J., "Dynamically reparameterized light fields," ACM Trans. Graph., 297-306, 2000.
Levoy, M., and Hanrahan, P., Light field rendering, ACM Trans. Graph., 31-42, 1996.
Ng, R., Levoy, M., Brdif, M., Duval, G., Horowitz, M., and Hanrahan, P., "Light field photography with a hand-held plenoptic camera," 2005.
Ng, R., "Fourier slice photography," International Conference on Computer Graphics and Interactive Techniques Proceedings of ACM SIGGRAPH 2005.
Park, S., Park, M., and Kang, M., "Super-resolution image reconstruction: a technical overview," Signal Processing Magazine, 2003.
Veeraraghavan, A., Mohan, A., Agrawal, A., Raskar, R., and Tumblin, J., "Dappled photography: Mask enhanced cameras for heterodyned light fields and coded aperture refocusing," ACM Trans. Graph. 26, 3, 69, 2007.
Levoy, Mark et al., "Light Field Microscopy," Stanford University, Submitted to Siggraph 2006, 5 pages.
Brown M., Lowe D. G.: "Unsupervised 3d Object Recognition and Reconstruction in Unordered Datasets," In Proceedings of 5th International Conference on 3D Imaging and Modelling (3DIM) (2005), pp. 21-30.
Levoy, et al. "Recording and controlling the 4D light field in a microscope using microlens arrays", Journal of Microscopy, 2009, 19 pages.
Georgiev T., Wainer M.: "Morphing Between Multiple Images," Tech. Rep. (1997).
Georgiev T., Lumsdaine A.: Depth of field in plenoptic cameras. In Eurographics 2009—Annex (Apr. 2009), pp. 5-8.
Xiao J., Shah M.: "Tri-view Morphing," Computer Vision and Image Understanding 96, 3 (2004), 345-366.
Lippmann G.: "Epreuves reversible donnant la sensation du relief ("Reversible Prints Providing the Sensation of Depth")", Journal of Physics 7 (1908), pp. 821-825.
Lippmann G.: "Epreuves Reversibles Photographies Integrales," Academie des sciences (Mar. 1908), pp. 446-451.
Lee S., Wolberg G., Shin S.: "Polymorph: Morphing Among Multiple Images," IEEE Computer Graphics and Applications (1998).
Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.
Schultz R.: Super-resolution enhancement of native digital video versus digitized NTSC sequences. In Proceedings of the Fifth IEEE Southwest Symposium on Image Analysis and Interpretation (2002), pp. 193-197.
Naemura T., Yoshida T., Harashima H.: "3d Computer Graphics Based on Integral Photography," Optics Express, vol. 8, 2 (2001).
Zitnick C. L., Jojic N., Kang S.: "Consistent Segmentation for Optical Flow Estimation" In Proceedings of IEEE International Conference on Computer Vision (ICCV) (2005).
Seitz S. M., Dyer C. R.: "View Morphing," ACM Trans. Graph. (1996), 21-30.
Stevens R., Harvey T.: "Lens Arrays for a Three-dimensional Imaging System," Journal of Optics A, vol. 4 (2002).
Stewart J., Yu J., Gortler S. J., McMillan L.: "A New Reconstruction Filter for Undersampled Light Field," Eurographics Symposium on Rendering (2003), 150-156.
Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004).
Wilburn B., Joshi N., Vaish V., Talvala E., Antunez E., Barth A., Adams A., Levoy M., Horowitz M.: "High Performance Imaging Using Large Camera Arrays," In ACM Trans. Graph. (2005).
U.S. Appl. No. 12/574,183, filed Oct. 6, 2009.
U.S. Appl. No. 12/144,411, filed Jun. 23, 2008.
U.S. Appl. No. 12/186,396, filed Jun. 23, 2008.
U.S. Appl. No. 11/874,611, filed Oct. 18, 2007.

U.S. Appl. No. 12/111,735, filed Apr. 29, 2008.
U.S. Appl. No. 11/627,141, filed Jan. 25, 2007.
U.S. Appl. No. 12/130,725, filed May 30, 2008.
U.S. Appl. No. 12/636,168, filed Dec. 11, 2009.
U.S. Appl. No. 12/690,569, filed Jan. 20, 2010.
U.S. Appl. No. 12/690,871, filed Jan. 20, 2010.
U.S. Appl. No. 12/5503,803, filed Jul. 15, 2009.
U.S. Appl. No. 12/628,437, filed Dec. 1, 2009.
U.S. Appl. No. 12/790,677, filed May 28, 2010.
Yang, J C, et al., "A Real-Time Distributed Light Field Camera," Rendering Techniques 2002, Eurographics Workshop Proceedings, PIS, Italy, Jun. 26-28, 2002, 9 pages.
Ng M. K., Bose N. K.: Mathematical analysis of super-resolution methodology. Signal Processing Magazine, IEEE 20, 3 (2003), 62-74.
M. Levoy, "Light Fields and computational Imaging," Computer [Online], vol. 39, No. 8, Aug. 2006, pp. 46-55, XP002501300.
Lumsdaine A., Georgiev T.: The focused plenoptic camera. In International Conference on Computational Photography (Apr. 2009), 8 pages.
J. Chai, S. Chan, H. Shum, and X. Tong: "Plenoptic Sampling", ACM Trans. Graph., pp. 307-318, 2000.
F. Durand, N. Holzschuch, C. Soler, E. Chan, and F. Sillion: "A frequency Analysis of Light Transport," ACM Trans. Graph., pp. 1115-1126, 2005.
Todor Georgiev and Chintan Intwala: "Light Field Camera Design for Integral View Photography," Adobe Tech. Rep., 2006, 13 pages.
J. Neumann, et al., "Eyes from Eyes Analysis of Camera Design Using Plenoptic Video Geometry," Dec. 2001, 20 pages, XP002509893.
Zhang, et al., "A Survey on Image-based Rendering-Representation, Sampling and Compression," Signal Processing, Image Communication, Elsevier Science Publishers, vol. 19, No. 1, Jan. 1, 2004, 28 pages.
Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003, 18 pages.
Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.
Ulrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, 8 pages.
Grzeszczuk, R., et al., "Standard Support for 1-13 Progressive Encoding, Compression and Interactive Visualization of Surface Light Fields," Joint Video Tem (JVT) of ISO/IEC MPEG& ITU-T VGEG (ISO/IEC JTC1/SC29/WG11 and ITU-T SG16 Q6), Nov. 21, 2001, 11 pages.
Chang, et al., "Light Field Compression Using Disparity-Compensated Lifting and Shape Adaptation," IEEE Transactions on Image Processing, vol. 15, No. 4, Apr. 2006, pp. 793-806.
Sebe, et al., "Mutli-View Geometry Estimation for Light Field Compression," VMV 2002, 8 pages.
Levoy, Mark, "Optical Recipes for Light Microscopes," Stanford Computer Grpahics Laboratory Technical Memo 2006-001, Jun. 20, 2006, 10 pages.
Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. I: 436-443, 2004.
Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.
Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, 203.
Georgiev, et al. "Light-Field Capture by Multiplexing in the Frequency Domain," Adobe Technical Report, Apr. 2007, all pages.
Lin Z., Shum H.: Fundamental limits of reconstruction-based super-resolution algorithms under local translation. IEEE Transactions on Pattern Analysis and Machine Intelligence 26, 1 (Jan. 2004), 83-97.
David E. Roberts, History of Lenticular and Related Autostereoscopic Methods, 2003, 17 pages.
Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.
Lumsdaine A., Georgiev T.: Full Resolution Lightfield Rendering. Tech. rep., Adobe Systems, Jan. 2008, 12 pages.
Baker S., Kanade T.: Limits on superresolution and how to break them. IEEE Transactions on Pattern Analysis and Machine Intelligence (Jan. 2002), 377 pages.
Bishop T. E., Zanetti S., Favaro P.: Light field superresolution. In International Conference on Computational Photography (Apr. 16-17, 2009), 4 pages.
Levin A., Fergus R., Durand F., Freeman W.: Image and depth from a conventional camera with a coded aperture. ACM Transactions on Graphics, SIGGRAPH 2007 Conference Proceedings, San Diego, CA (2007), 10 pages.

* cited by examiner

*(Keplerian telescopic case)*

(Galilean telescopic case)

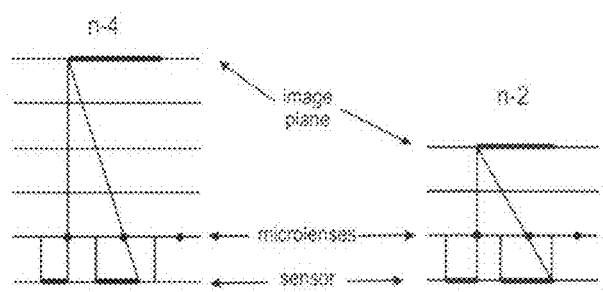
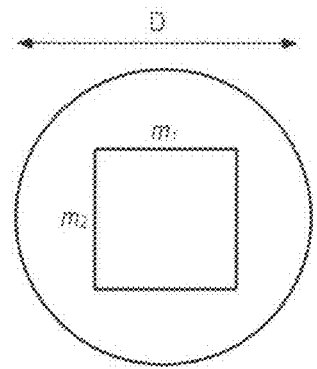
*FIG. 14A*  *FIG. 14B*  *FIG. 15*
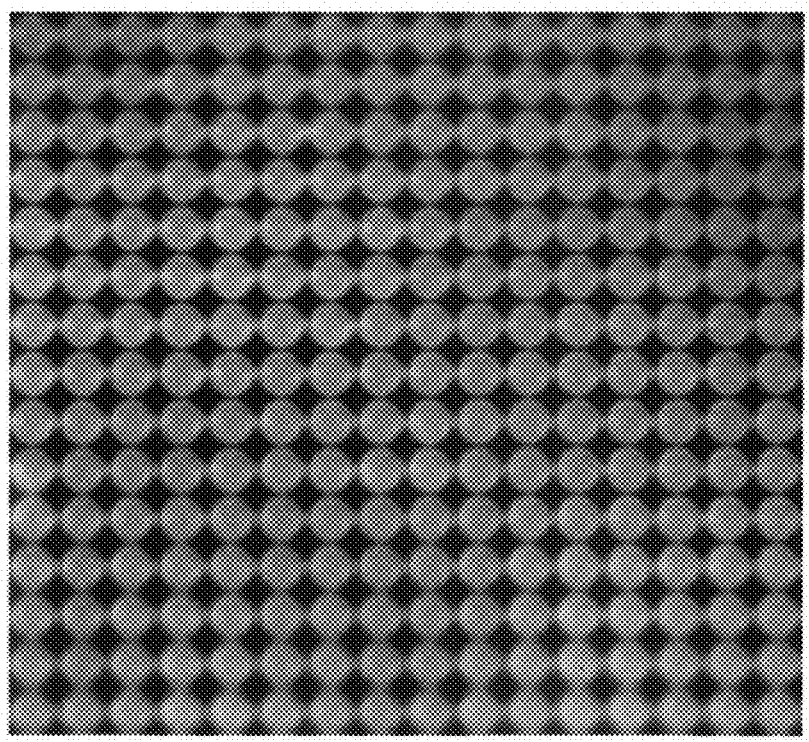
*FIG. 16*

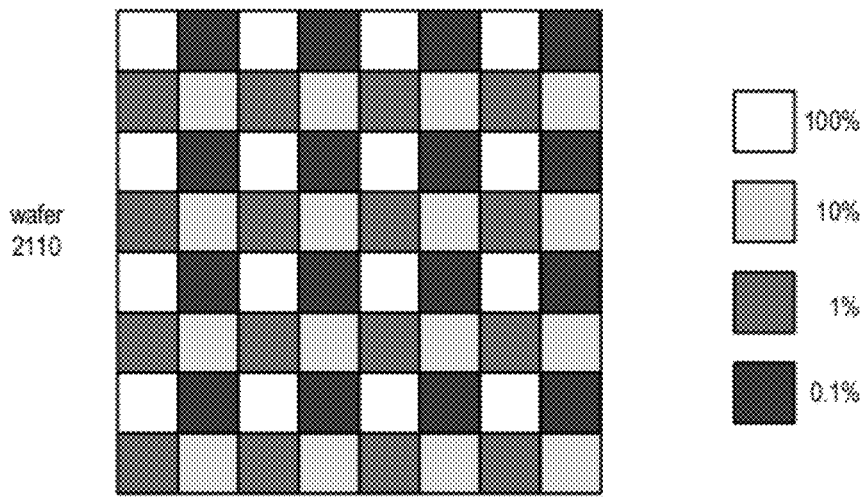
FIG. 38
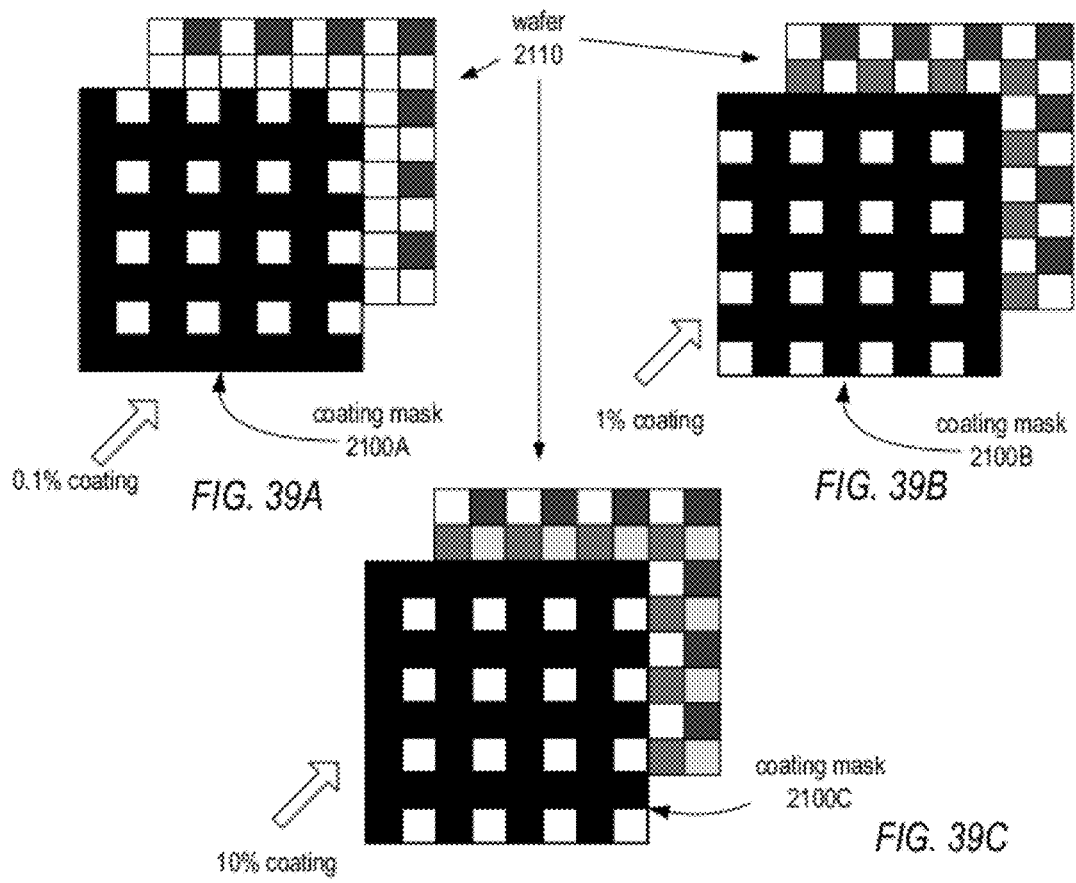
FIG. 39A
FIG. 39B
FIG. 39C

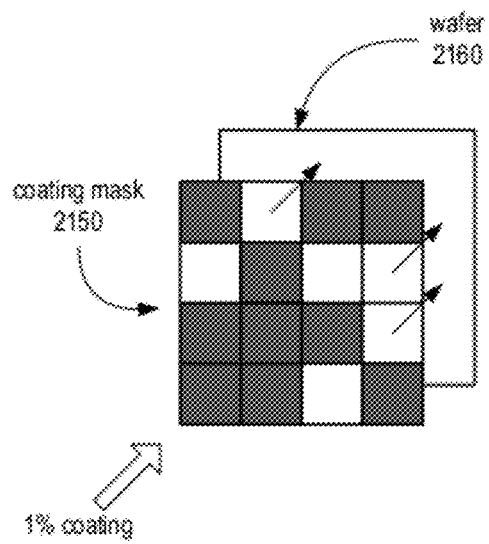
FIG. 40A
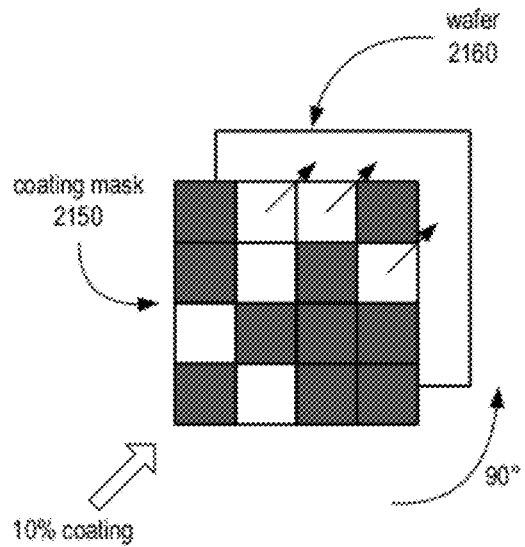
FIG. 40B
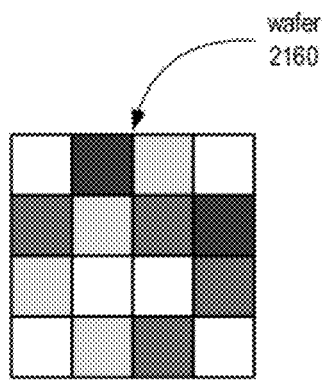
FIG. 41A
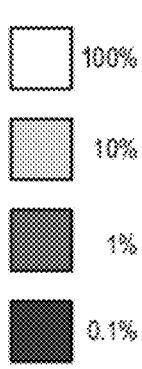
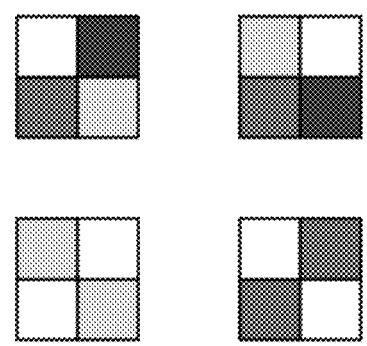
FIG. 41B

FOCUSED PLENOPTIC CAMERA EMPLOYING DIFFERENT APERTURES OR FILTERING AT DIFFERENT MICROLENSES

BACKGROUND

Description of the Related Art

In a conventional camera, the main lens maps the 3D world of the scene outside camera into a 3D world inside camera. FIG. 1 illustrates imaging in a conventional camera. "Inside world" represents inside the camera. The shaded oval regions represent the order of depths in the outside world, and the corresponding depths inside the camera. One particular image plane inside the camera is shown. The mapping of the 3D world of the scene outside camera into a 3D world inside camera is governed by the lens equation:

$$\frac{1}{A} + \frac{1}{B} = \frac{1}{F}$$

where A and B are respectively the distances from the lens to the object plane and from the lens to the image plane. This equation is normally used to describe the effect of a single image mapping between two fixed planes. In reality, however, the lens equation describes an infinite number of mappings—it constrains the relationship between, but does not fix, the values of the distances A and B. That is, every plane in the outside scene (which is described as being at some distance A from the objective lens) is mapped by the objective lens to a corresponding plane inside of the camera at a distance B. When a sensor (e.g., conventional film, a charge-coupled device (CCD), etc.) is placed at a distance B between F and ∞ (infinity) inside the camera, the sensor captures an in-focus image of the corresponding plane at A that was mapped from the scene in front of the lens.

Conventional cameras render a three-dimensional scene onto a two-dimensional sensor. During operation, a conventional digital camera captures a two-dimensional (2-D) image representing a total amount of light that strikes each point on a photosensor within the camera. However, this 2-D image contains no information about the direction of the light that strikes the photosensor. The image captured by a conventional camera essentially integrates the radiance function over its angular portion, resulting in a two-dimensional intensity as a function of position. The angular information of the original radiance is lost. Thus, conventional cameras fail to capture a large amount of optical information.

Light-Field or Radiance Capturing Cameras

In contrast to conventional cameras, light-field, or radiance capturing, cameras sample the four-dimensional (4-D) optical phase space or light-field, and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

Light-fields, i.e. radiance, may be captured with a conventional camera. In one conventional method, M×N images of a scene may be captured from different positions with a conventional camera. If, for example, 8×8 images are captured from 64 different positions, 64 images are produced. The pixel from each position (i, j) in each image are taken and placed into blocks, to generate 64 blocks. FIG. 2 illustrates an example prior art light-field camera, or camera array, which employs an array of two or more objective lenses 110. Each objective lens focuses on a particular region of photosensor 108, or alternatively on a separate photosensor 108. This light-field camera 100 may be viewed as a combination of two or more conventional cameras that each simultaneously records an image of a subject on a particular region of photosensor 108 or alternatively on a particular photosensor 108. The captured images may then be combined to form one image.

FIG. 3 illustrates an example prior art plenoptic camera, another type of radiance capturing camera, that employs a single objective lens and a microlens or lenslet array 106 that includes, for example, about 100,000 lenslets. In a conventional plenoptic camera 102, lenslet array 106 is fixed at a small distance (~0.5 mm) from a photosensor 108, e.g. a charge-coupled device (CCD). In conventional plenoptic cameras, the microlenses are placed and adjusted accurately to be exactly at one focal length f from the sensor 108. This is done by placing the array of microlenses at distance f from the sensor, where f is the focal length of the microlenses. Another way to say this is that, for the microlenses, f is chosen to be equal to the distance to the photosensor 108. In other words, the microlenses are focused on infinity, which is essentially equivalent to focusing the microlenses on the main lens 104, given the large distance of the microlenses to the main lens relative to the focal length of the microlenses. Thus, the raw image captured with plenoptic camera 102 is made up of an array of small images, typically circular, of the main lens 108. These small images may be referred to as microimages. However, in conventional plenoptic camera 102, each microlens does not create an image of the internal world on the sensor 108, but instead creates an image of the main camera lens 104.

The lenslet array 106 enables the plenoptic camera 102 to capture the light-field, i.e. to record not only image intensity, but also the distribution of intensity in different directions at each point. Each lenslet splits a beam coming to it from the main lens 104 into rays coming from different locations on the aperture of the main lens 108. Each of these rays is recorded as a pixel on photosensor 108, and the pixels under each lenslet collectively form an n-pixel image. This n-pixel area under each lenslet may be referred to as a macropixel, and the camera 102 generates a microimage at each macropixel. The plenoptic photograph captured by a camera 102 with, for example, 100,000 lenslets will contain 100,000 macropixels, and thus generate 100,000 microimages of a subject. Each macropixel contains different angular samples of the light rays coming to a given microlens. Each macropixel contributes to only one pixel in the different angular views of the scene; that is, only one pixel from a macropixel is used in a given angular view. As a result, each angular view contains 100,000 pixels, each pixel contributed from a different macropixel. Another type of integral or light-field camera is similar to the plenoptic camera of FIG. 3, except that an array of pinholes is used between the main lens and the photosensor instead of an array of lenslets.

FIG. 4 further illustrates an example prior art plenoptic camera model. In conventional plenoptic camera 102, the microlens-space system swaps positional and angular coordinates of the radiance at the microlens. For clarity, only the rays through one of the microlenses are illustrated. The conventional optical analysis of such a plenoptic camera considers it as a cascade of a main lens system followed by a microlens system. The basic operation of the cascade system is as follows. Rays focused by the main lens 104 are separated by the microlenses 106 and captured on the sensor 108. At their point of intersection, the rays have the same position but different slopes. This difference in slopes causes the separation of the rays when they pass through a microlens-space system. In more detail, each microlens functions to swap the positional and angular coordinates of the radiance, then this new positional information is captured by the sensor 108. Because of the swap, it represents the angular information at the microlens. As a result, each microlens image captured by sensor 108 represents the angular information for the radiance at the position of the optical axis of the corresponding microlens.

The light-field is the radiance density function describing the flow of energy along all rays in three-dimensional (3D) space. Since the description of a ray's position and orientation requires four parameters (e.g., two-dimensional positional information and two-dimensional angular information), the radiance is a four-dimensional (4D) function. This function may be referred to as the plenoptic function. Image sensor technology, on the other hand, is only two-dimensional, and light-field imagery must therefore be captured and represented in flat (two dimensional) form. A variety of techniques have been developed to transform and capture the 4D radiance in a manner compatible with 2D sensor technology. This may be referred to as a flat representation of the 4D radiance (or light-field), or simply as a flat.

High Dynamic Range (HDR) Imaging

The amount of variation of light in the world is huge. Normal objects in sunlight and in a shadow often differ in brightness by a factor of 10,000 or more. Objects deep in a room, seen through a small window from outside, can be very dark compared to the outside wall of the house illuminated by direct sunlight. Such environments are difficult to capture, for example, in 8-bit images, which provide a pixel brightness range of only 0 to 255, or even in 10- or 12-bit images as captured by most conventional digital cameras. Conventional film cameras have a slightly higher, but nonlinear, range. However, conventional film scanning techniques are generally limited to less than 16-bit (for example, 10-bit or 12-bit); thus, digitizing conventional film limits the dynamic range.

High dynamic range imaging (HDRI, or just HDR) allows a greater dynamic range of luminance between light and dark areas of a scene than these conventional imaging techniques. An HDR image more accurately represents the wide range of intensity levels found in real scenes. Pixel values of digital HDR images thus require more bits per channel than conventional images. An HDR imaging technique may, for example, use 16-bit or 32-bit floating point numbers for each channel to capture a much wider dynamic range of luminance than is captured using normal imaging techniques. Note that HDR images are not directly displayable to a display device or printable; the information stored in HDR images corresponds to the physical values of luminance. In contrast, the information stored in conventional digital images represents colors that should appear on a display device or a paper print.

HDR images are conventionally generated by capturing multiple images at different exposures (e.g., using different F-stops and/or shutter speeds) with a conventional camera, and then combining the image data from the multiple images into a single HDR image. An obvious problem with these conventional methods is that it is difficult to generate HDR images of action scenes, where one or more objects in the scene are moving or changing, as two different images of the scene captured at different times would be quite different in content. Multiple synchronized cameras may be used to capture different images of the scene at different exposures; however, this is expensive and difficult to set up properly. In addition, the different cameras have largely different viewpoints, so the same object is imaged at largely different perspectives in the images.

SUMMARY

Various embodiments of methods and apparatus for capturing and rendering images with focused plenoptic cameras employing different filtering at different microlenses are described. In a focused plenoptic camera, the main camera lens creates an image of a scene in front of the camera at the focal plane of the main lens. That image is re-imaged onto the sensor multiple times by an array of microlenses. The microlenses are focused on the image of the scene created by the main lens at the focal plane, instead of being focused on the main lens itself as in conventional plenoptic cameras. This serves to increase or maximize spatial resolution, and thus the focused plenoptic camera achieves sharper, higher spatial resolution microlens images than those produced by conventional plenoptic cameras.

In a focused plenoptic camera, if the scene is sufficiently far from the camera, the scene may be considered to be at infinity. The main camera lens creates an image of the scene at the focal plane of the main lens. Different ones of the microlenses may project identical or nearly identical microimages of the image at the focal plane onto the sensor. Thus, each point of the image at the focal plane is re-imaged onto the sensor multiple times by multiple microlenses in the microlens array of a focused plenoptic camera. Embodiments may leverage these characteristics of the focused plenoptic camera by applying different optical elements, such as different filters or different apertures, at different ones of the microlenses to capture various characteristics of light, such as luminance, color, polarization, and so on, differently (e.g., at different levels of exposure for luminance, at different wavelengths of color, at different angles of polarization, etc.) in different microimages. All of the microimages are captured at the same time in a single image (referred to as a flat) at the sensor. Thus, multiple microimages of the same image of a scene may be captured at different colors, different exposures, different polarities, etc., in a single image at the same time with a focused plenoptic camera according to embodiments. Images captured using embodiments of a focused plenoptic camera with different lenses may be used in High Dynamic Range (HDR) imaging, spectral imaging, and other imaging applications. When the main image created by the main lens of the focused plenoptic camera represents objects from a scene that are at optical infinity, those objects are exactly at the focal plane of the camera, one focal length from the main lens. The different views of the main image captured by the different microlenses are identical or nearly identical 3D views of the objects, that is identical or nearly identical images, but modified in brightness, color, polarization, or other characteristics. Thus, imaging functions, such as HDR imaging and spectral imaging, performed according to embodiments may produce precise and high quality output images, such as HDR images, color images, and so on.

In embodiments, different filters, or other optical elements such as apertures, that provide different levels or types of light filtering may be arranged in an optical element array so that the different optical elements are combined with different ones of the microlenses in the microlens array of a focused plenoptic camera. For example, an alternating pattern (or some other pattern) of two or more different filters may be applied to the microlenses of a microlens array, with one particular filter applied to each microlens. A raw image or "flat" captured using a focused plenoptic camera that incorporates two or more different filters thus includes multiple microimages captured at the same time according to the two or more different filters. One or more different images may then be assembled from the microimages, with each image assembled from the microimages captured using one of the different filters. A final image may then be generated by appropriately combining the images assembled from the microimages. Alternatively, a final image, or multiple images, may be assembled from the microimages by first combining the microimages and then assembling the combined microimages to produce one or more output images.

Using a focused plenoptic camera with two or more different filters applied to different microlenses in the microlens array, a single image or "flat" consisting of multiple microimages, each corresponding to a microlens in the microlens array, may be captured using the camera. From this single flat, two or more different images exhibiting different characteristics according to the respective filters may be generated by appropriately assembling the microimages. This allows, for example, a single image or flat to be captured of an action scene, such as a sporting event or wildlife; from that flat, multiple images, for example at different levels of exposure or at different polarization angles, may be generated. Two or more of the multiple images, or portions thereof, may be combined to generate an output image.

In some embodiments, the microimages from a raw flat captured with a focused plenoptic camera employing two or more different filters may be combined to generate a combined flat (a flat including the combined microimages). The microimages from the combined flat may then be appropriately assembled to produce one or more output images. Combining the microimages to generate a combined flat allows the combined flat to be used in generating 3D views, performing refocusing, parallax generation, and in general in any of various light-field operations that may be performed on a flat captured with a focused plenoptic camera.

Different types of filters may be used in embodiments. Filters that may be used include, but are not limited to, light-limiting filters, color filters, and polarizing filters. Light-limiting filters may be implemented, for example, as neutral-density filters or as apertures. In embodiments employing light-limiting filters, different levels of light filtering may be employed at different microlenses (using either different neutral density filters or different apertures) to thus capture microimages at different levels of exposure in a raw flat. The microimages from the raw flat may then be appropriately assembled to generate High Dynamic Range (HDR) images.

In embodiments employing color filters, different color filters may be employed at different microlenses to thus capture microimages specific to different wavelengths of light corresponding to the respective color filters. The microimages from the raw flat may be appropriately assembled to generate two or more images of the captured scene each corresponding to one of the color filters. Two or more of the images thus generated may be combined to generate color output images of the scene. A focused plenoptic camera using an appropriate pattern of different color filters applied to the microlenses in the array may capture two, three, four, or even more microimages that include the same point in the image in different color channels. Embodiments of a focused plenoptic camera, using a pattern of 100 different color filters at the microlenses may, for example, sample 100 wavelengths of light at each point in an image. Thus, embodiments of a focused plenoptic camera using color filters may provide true spectral imaging.

In embodiments employing polarizing filters, different polarizing filters may be employed at different microlenses to thus capture microimages specific to different polarizations of light corresponding to the respective polarizing filters. The microimages from the raw flat may be appropriately assembled to generate two or more images of the captured scene each corresponding to one of the polarizing filters. Two or more of the images thus generated may be combined to generate output images of the scene.

The different types of filters described above may be combined in a focused plenoptic camera. For example, appropriate filters and/or apertures may be used in combination to perform color imaging and HDR imaging at the same time, polarizing filtering and color filtering at the same time, or polarizing filtering, color filtering and HDR imaging at the same time.

BRIEF DESCRIPTION OF THE DRAWINGS

FIG. 14A shows the ray geometry in the Keplerian telescopic case for n=4.

FIG. 14B shows the ray geometry in the Keplerian telescopic case for n=2.

FIG. 15 illustrates a lens circle (or microimage) of diameter D and a patch or crop of size $m_1 \times m_2$, where at least one of $m_1$ and $m_2$ is an integer greater than or equal to 2.

FIG. 16 shows a zoom into an example microlens array.

FIG. 38 shows an example of a checkerboard pattern of four different levels of filtering according to some embodiments.

FIGS. 39A through 39C illustrate an example process for applying different levels of coating to a wafer using coating masks, according to some embodiments.

FIGS. 40A and 40B illustrate an example process for applying different levels of coating to a wafer using a single coating mask, according to some embodiments.

FIGS. 41A and 41B illustrate an example wafer with different filters applied by the process of FIGS. 40A and 40B.

Figure 1:
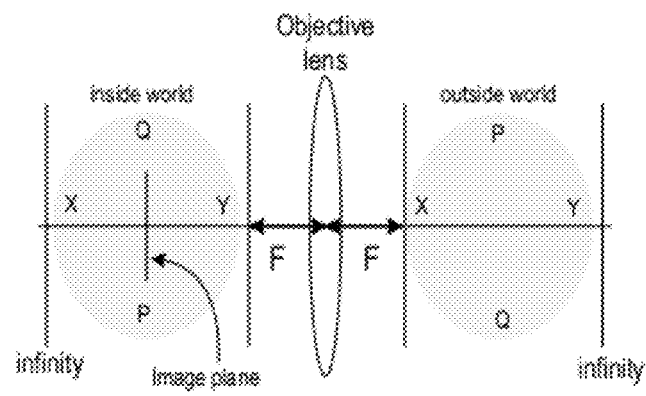
FIG. 1 illustrates imaging in a conventional camera.
Figure 2:
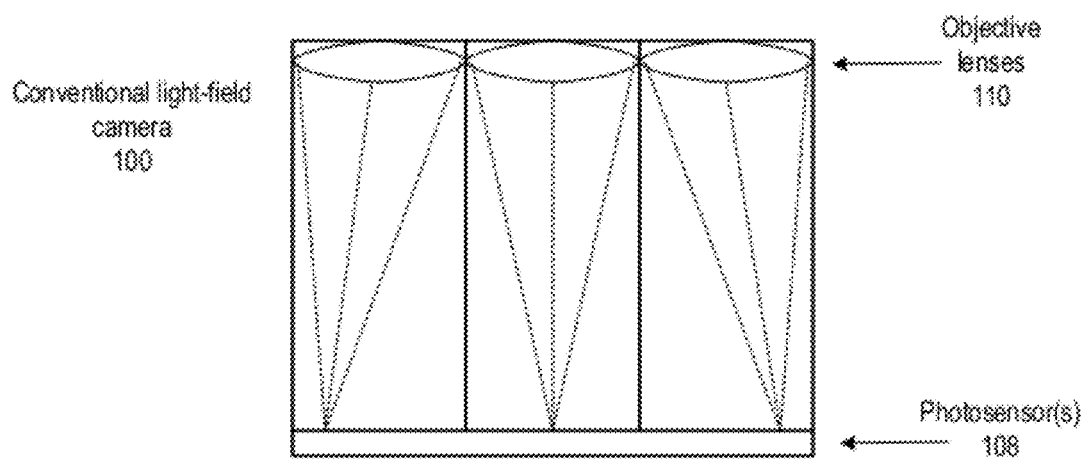
FIG. 2 illustrates an example prior art light-field camera, or camera array, which employs an array of two or more objective lenses.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a method and apparatus for full-resolution light-field capture and rendering are described. Embodiments of a full-resolution radiance camera, which may also be referred to as a radiance camera or a focused plenoptic camera, and of a method for rendering high-resolution images from flat 2D representations of the 4D light-field, referred to herein as flats, captured by embodiments of the focused plenoptic camera, are described. The method for rendering high-resolution images from flats captured by embodiments of the focused plenoptic camera may be referred to as a full-resolution light-field rendering method, or simply as the light-field rendering method. The term "full resolution" does not directly refer to sensor resolution of the camera, but instead refers to resolution as supported by the captured radiance data.

Light-field photography enables many new possibilities for digital imaging because it captures both spatial and angular information, i.e., the full four-dimensional radiance, of a scene. High-resolution is required in order to capture four-dimensional data with a two-dimensional sensor. However, images rendered from this data as projections of the four-dimensional radiance onto two spatial dimensions using conventional light-field cameras and conventional light-field rendering methods are at significantly lower resolutions. Embodiments of the focused plenoptic camera and of the full-resolution light-field rendering method more adequately meet the resolution and image size expectations of modern photography than do conventional light-field cameras and rendering methods.

In embodiments of the focused plenoptic camera, the microlenses in the microlens array are focused on the image plane of the main camera lens, rather than on the main camera lens itself as in conventional plenoptic cameras. In the image plane, there is a real image of a scene in front of the camera and refracted by the main lens to the image plane, but there is nothing there physically (other than light); the image plane is simply a plane location in space that can be considered to have an image "in the air" as created by the main lens. The microlenses, being focused on the image plane instead of on the main lens, can capture the image of the scene at the image plane. Each microlens captures a small area or region of the image at the image plane and maps or projects the captured region onto a corresponding region of the photosensor. The imaging property of the focused plenoptic camera may be viewed as two steps: from the world through the main lens to the image plane, and then from the image plane through the microlenses to the photosensor. This is similar to a cascade of two cameras, but the second camera is actually many small cameras, as each microlens is effectively a little camera that captures a small image from the image plane. This is also similar to the way a telescope operates. By focusing the microlenses on the image produced by the main lens, embodiments of the focused plenoptic camera are able to fully capture the positional information of the radiance. Embodiments of the full-resolution light-field rendering method may be used to render full-resolution images from flats captured by embodiments of the focused plenoptic camera, producing output images at a dramatically higher resolution than conventional light-field rendering techniques. Embodiments may render images at spatial resolutions that meet the expectations of modern photography (e.g., 10 megapixel and beyond), making light-field photography much more practical.

An analysis of light-field camera structure and optics is given below that provides insight on the interactions between the main lens system and the microlens array in light-field cameras. Based on results of this analysis, embodiments exploit the fact that, at every plane of depth, the radiance contains a considerable amount of positional information about the scene, encoded in the angular information at that plane. Accordingly, embodiments may be referred to as full-resolution because embodiments make full use of both angular and positional information that is available in the four-dimensional radiance, as shown in the analysis. In contrast to super-resolution techniques, which create high-resolution images from sub-pixel shifted low-resolution images, embodiments render high-resolution images directly from the radiance data. Moreover, embodiments may generate light-field images that are amenable to radiance processing techniques such as Fourier slice refocusing.

Figure 5A:
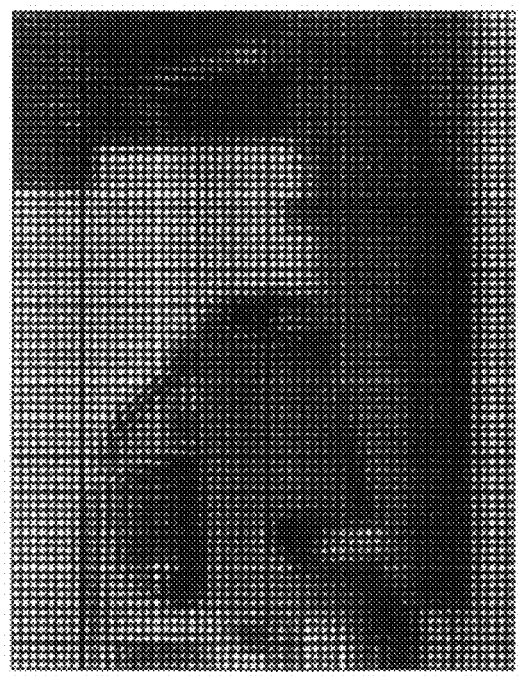
FIG. 5A shows a raw light-field image, or flat, as captured by a plenoptic camera.
Figure 5C:
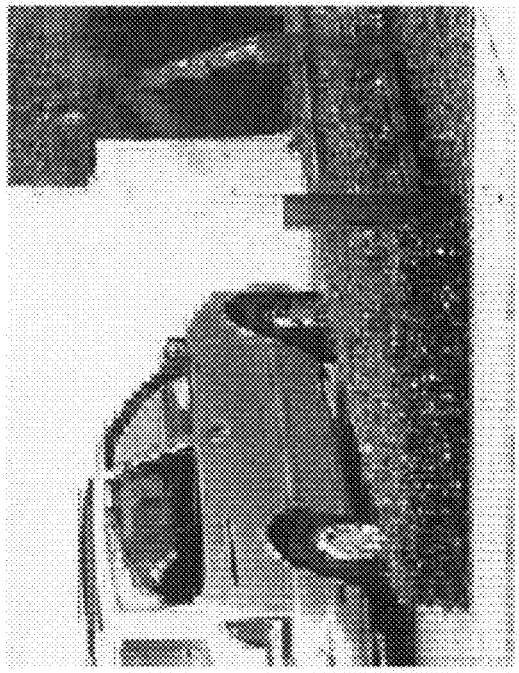
FIG. 5C shows a final image rendered from the flat of FIG. 5A according to an embodiment of the full-resolution light-field rendering method.
Figure 5B:
FIG. 5B shows a final image rendered from the flat of FIG. 5A according to a conventional rendering method.

FIGS. 5A through 5C show, for comparison, results from a conventional plenoptic camera and rendering method and results from example embodiments of a focused plenoptic camera and full-resolution light-field rendering method as described herein. FIG. 5A shows a raw light-field image as captured by a plenoptic camera. Note that, to the untrained human eye, the raw light-field image captured by a conventional plenoptic camera may look similar to the raw light-field image captured by an embodiment of the focused plenoptic camera. FIG. 5B shows a conventionally rendered final image, and FIG. 5C shows a final image rendered according to an embodiment of the full-resolution light-field rendering method as described herein. Even in this small, grayscale format, a drastic improvement in spatial resolution in FIG. 5C when compared to the spatial resolution in FIG. 5B is easily observable.

Focused Plenoptic Cameras

Figure 3:
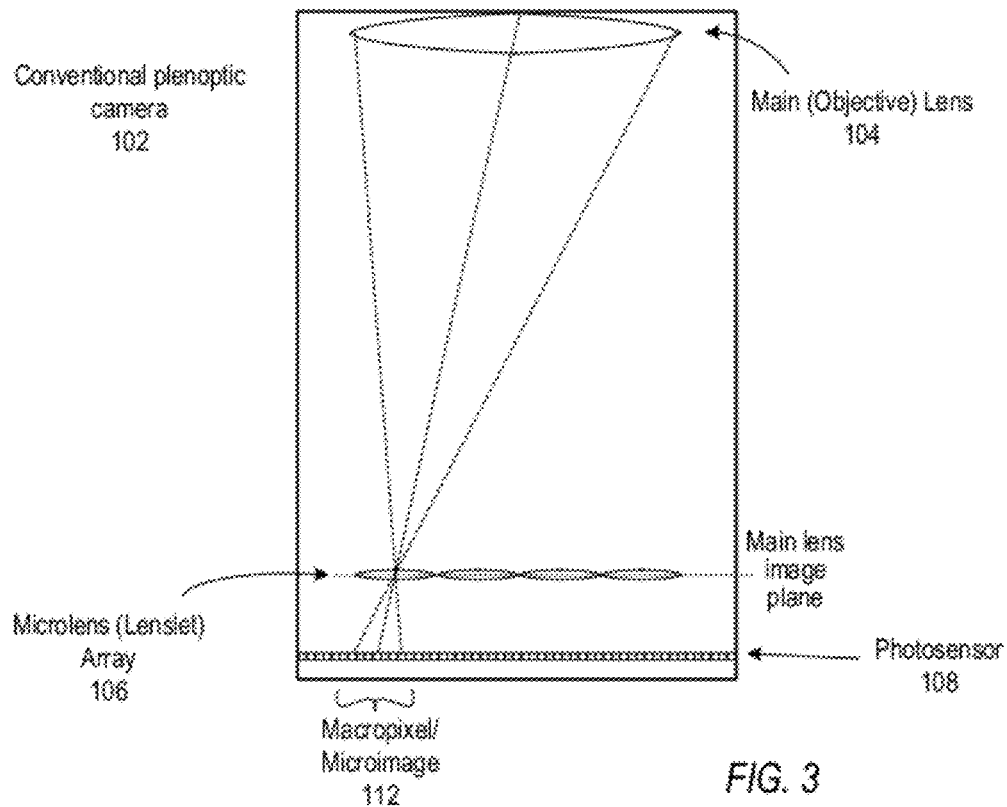
FIG. 3 illustrates an example prior art plenoptic camera that employs a single objective lens and a microlens array.
Figure 4:
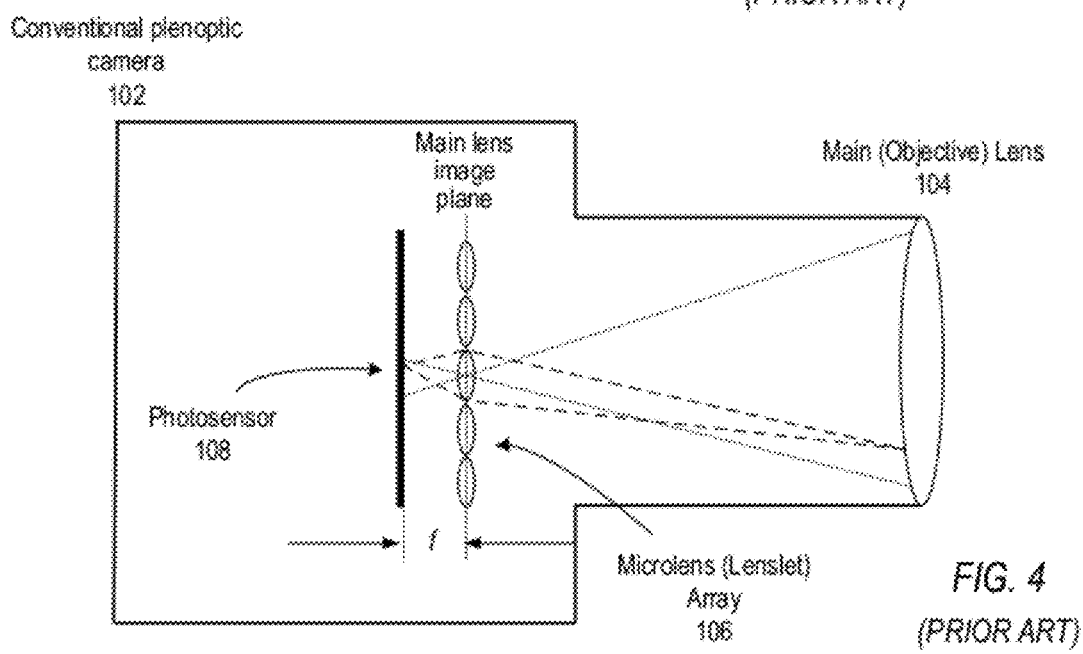
FIG. 4 further illustrates an example prior art plenoptic camera.

Various embodiments of a focused plenoptic camera are described. In conventional plenoptic cameras such as those illustrated in FIGS. 3 and 4, the microlenses are placed and adjusted accurately to be exactly at one focal length f from the photosensor, where f is the focal length of the microlenses. In addition, in conventional plenoptic cameras, the microlens array is fixed at the image plane of the main or objective lens of the camera, and the microlenses in the array are focused at infinity. In contrast, in embodiments of the focused plenoptic camera described herein, in order to increase or maximize spatial resolution, i.e., to achieve sharper, higher spatial resolution, microlens images, the microlenses are focused on the image created by the main lens inside the camera and in front of the microlenses (the image plane of the main lens), instead of being focused on the main lens itself, as in conventional plenoptic cameras. In further contrast to conventional plenoptic cameras, the microlenses in embodiments of the focused plenoptic camera described herein may be located at, or may be moved to, distances greater than for less than f from the photosensor, where f is the focal length of the microlenses. In one embodiment, the array of microlenses may be placed at distance 4/3f from the photosensor. Other embodiments may place the array of microlenses at other distances that are multiples of f e.g. 1.5f or 3/4f. In addition, embodiments of focused plenoptic cameras in which the distance of the microlens array from the photosensor is variable or adjustable, and in which other characteristics of the camera may be adjustable, are described. For example, in one embodiment, the distance of the microlens array from the photosensor may be adjustable within the range 0.5f to 1.5f. For the Keplerian telescopic case (the distance of the microlens array from the photosensor>f), a maximum useful distance may be 1.5f, although distances greater than 1.5f may be possible, if not practical. Thus, for the Keplerian telescopic case, a practical range for the distance of the microlens array from the photosensor may be $f<b\leq 1.5f$.

Various embodiments of the focused plenoptic camera implemented in digital cameras and in film cameras are anticipated, and example embodiments of both types are described. In digital cameras, the photosensor is a digital light-capturing device or medium such as a charge-coupled device (CCD) that captures and records the light in digital format. In film cameras, the photosensor is a film. Thus, "photosensor" as used herein refers to digital media that are used in digital cameras to capture light and to film media that are used in film cameras to capture light, and more generally to any device or medium that may be used to capture light. Light-field images captured on a film using film camera embodiments may subsequently be digitized, for example using a high-resolution scanner, so that the captured light-field may be rendered, for example using the full-resolution light-field rendering method described herein, to produce high-resolution output images. Light-field images captured using digital camera embodiments may be directly rendered.

In addition to digital and film embodiments, fixed and adjustable embodiments of both digital camera and film camera embodiments of the focused plenoptic camera are anticipated, and example embodiments of both types are described. In a fixed embodiment, the photosensor and the microlens array are at a fixed distance b from each other (the distance b is a multiple off f for example 4/3f 3/4f, or 1.5f, where f is the focal length of the microlenses). Note that b is used herein to designate the distance between the microlenses and the photosensor, while a is used herein to designate the distance between the microlenses and the image plane of the main or objective lens. In some embodiments, the microlens array/photosensor combination may be fixed at a location in the camera body. In some embodiments, the microlens array may be fixed in optical characteristics as well as in its physical location. In some embodiments, the main lens of the camera may also be fixed in optical characteristics and location, while possibly allowing for changes in shutter speed, aperture, focusing, etc. In adjustable embodiments, various manual or automatic mechanisms may be employed to change the distance b between the photosensor and the microlens array, to change the location of the microlens array/photosensor combination in the camera body, to change the distance from the main lens to the microlens array, to change the distance a between the microlenses and the image plane, and/or to swap or replace various components such as the microlens array and the main lens. In addition, the main lens of the camera may be swappable to use different main lenses, and may be adjustable according to aperture, shutter speed, focusing, distance from the microlens array, and so on. Embodiments where the microlens array may be swappable, so that microlens arrays with different numbers of microlenses and/or microlenses with different optical characteristics may be used, are also possible.

The optical characteristics of the optical system, including the optical characteristics of the lenses and the distances between the various components or elements, is important in capturing light-fields that may be rendered to yield high-resolution output images as described herein. Thus, in fixed embodiments, the microlenses, main lens, photosensor, and the relative physical location of these components in the camera may be determined according to the formulas and equations described herein to capture appropriate and satisfactory light-field images. In adjustable embodiments, some embodiments may include automated mechanisms that automatically adjust the positioning or other aspects of one or more of the components to capture appropriate and satisfactory light-field images. For example, if the user adjusts or replaces one component, the camera may automatically adjust one or more other components to compensate for the change. Alternatively, a human operator of an adjustable focused plenoptic camera may manually adjust the positioning or other aspects of one or more of the components, may replace one or more components with units that have different characteristics, or may insert other components (e.g., microsheet glass, as described below) to capture appropriate and satisfactory light-field images.

Figure 6:
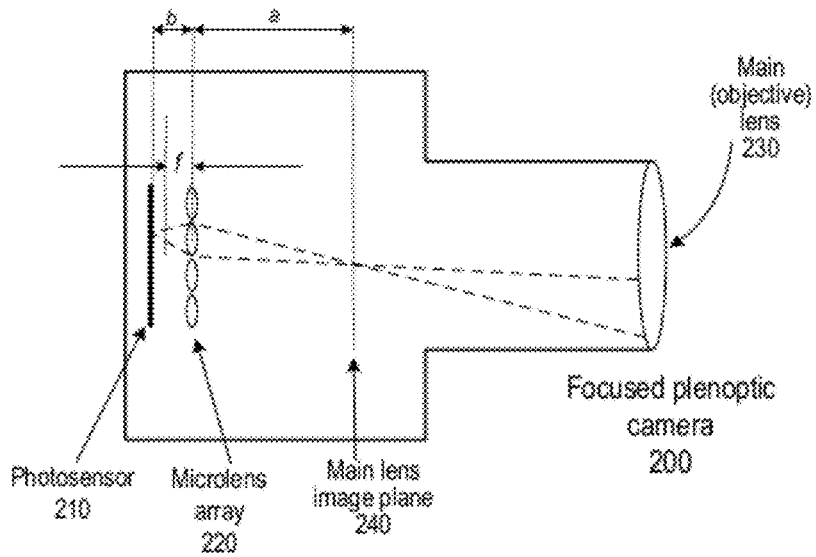
FIG. 6 is a block diagram illustrating a focused plenoptic camera according to one embodiment.
Figure 7:
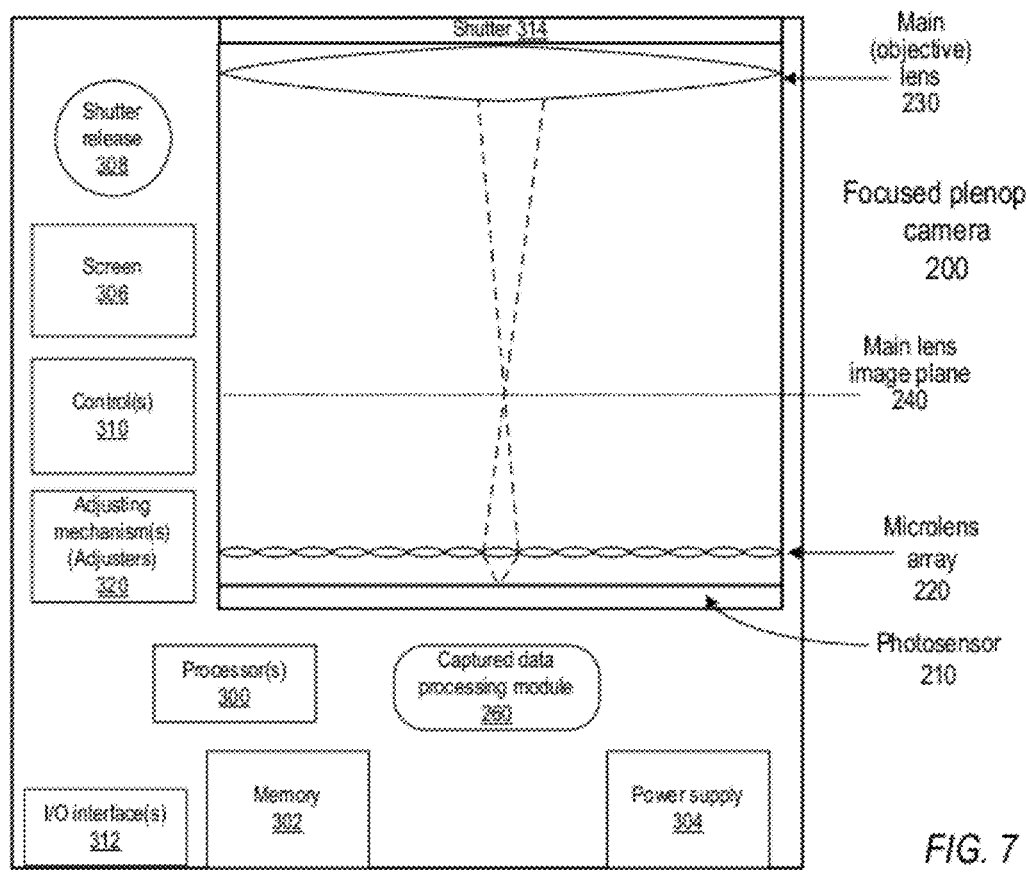
FIG. 7 illustrates an example embodiment of a focused plenoptic camera with various other elements that may be integrated in the camera.
Figure 8:
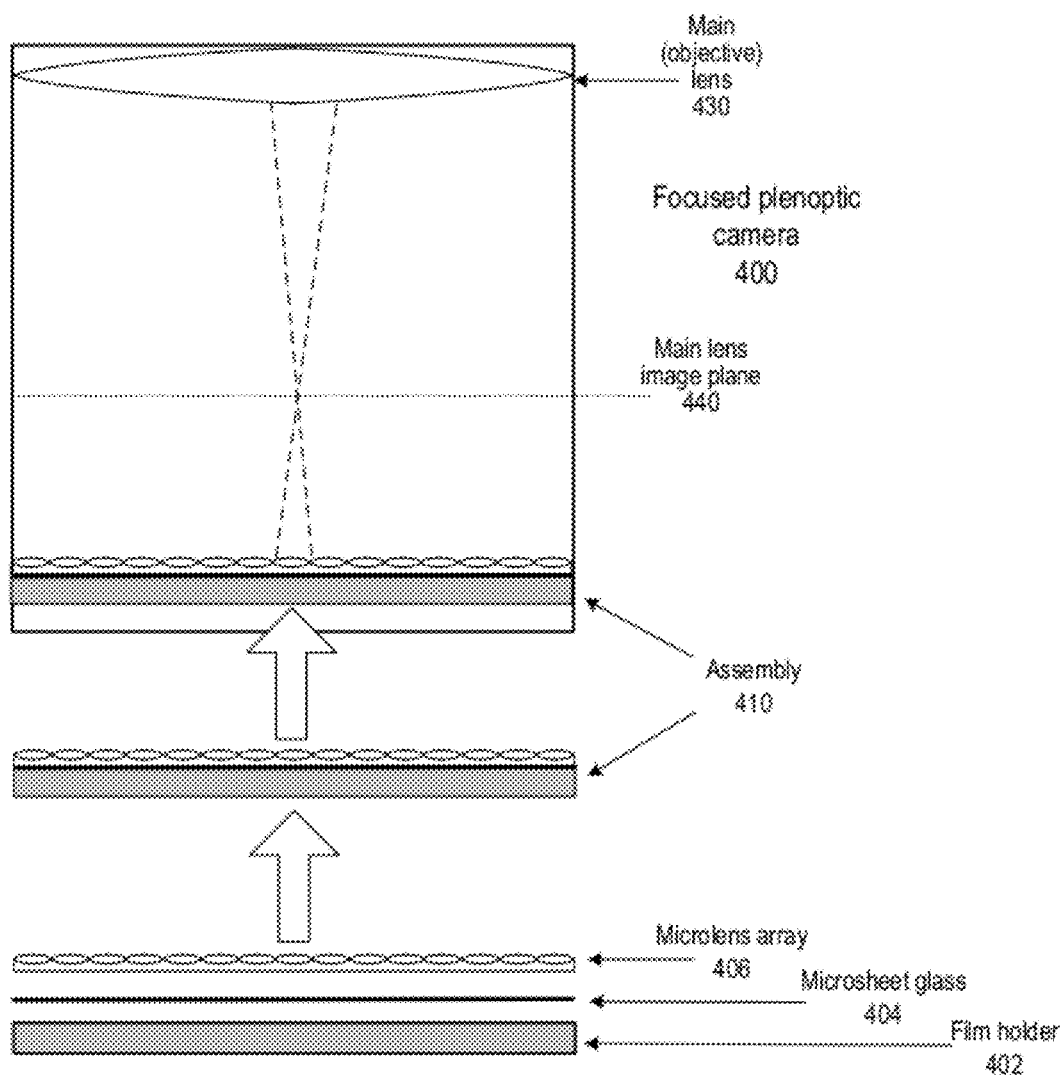
FIG. 8 illustrates an example embodiment of a focused plenoptic camera based on a large-format film camera.

FIGS. 6 through 8 illustrate example film camera and digital camera embodiments of a focused plenoptic camera as described herein, and further illustrate both fixed and adjustable embodiments of the focused plenoptic camera. It is noted that these are example embodiments, and are not intended to be limiting. Other embodiments are possible and anticipated.

FIG. 6 is a block diagram illustrating a focused plenoptic camera according to one embodiment. Focused plenoptic camera 200 may include a main (objective) lens 230, a microlens array 220, and a photosensor 210. Microlens array 220 may be located at a distance greater than f from photosensor 210, where f is the focal length of the microlenses in array 220. In addition, the microlenses in array 220 are focused on the image plane 240 of the main lens 230. In contrast, in conventional plenoptic cameras such as plenoptic camera 102 of FIGS. 3 and 4, the microlens array 106 is fixed at distance f from photosensor 108, and the microlenses in array 106 are focused on the main lens 104. In some embodiment, photosensor 210 may be conventional film; in other embodiments, photosensor 210 may be a device for digitally capturing light, for example a CCD. In one embodiment of a microlens array 220 that may be used in embodiments of focused plenoptic camera 200, or in other embodiments as illustrated in FIGS. 7 and 8, the microlens array 220 may include 146,000 microlenses of diameter 0.25 mm and focal length 0.7 mm. Other configurations of microlens array 220, including different numbers of microlenses and/or microlenses with different optical characteristics, are possible and anticipated. FIG. 16 shows a zoom into an example microlens array, and shows individual microlenses and (black) chromium mask between the microlenses.

FIG. 7 illustrates an example embodiment of focused plenoptic camera 200 with various other elements that may be integrated in the camera 200. In some embodiments of focused plenoptic camera 200, the objective lens 230, the microlens array 220, and the photosensor 210 may be fixed. In other embodiments, one or more of the above elements may be replaceable and/or adjustable. In some embodiment, photosensor 210 may be conventional film; in other embodiments, photosensor 210 may be a device for digitally capturing light, for example a CCD. In general, embodiments of a focused plenoptic camera 200 as described herein may include, in addition to main lens 230, microlens array 220, and photosensor 210, any other type of elements and features commonly found in digital cameras or other cameras including light-field and plenoptic cameras and large-format film cameras, and may also include additional elements and features not generally found in conventional cameras.

Figure 24:
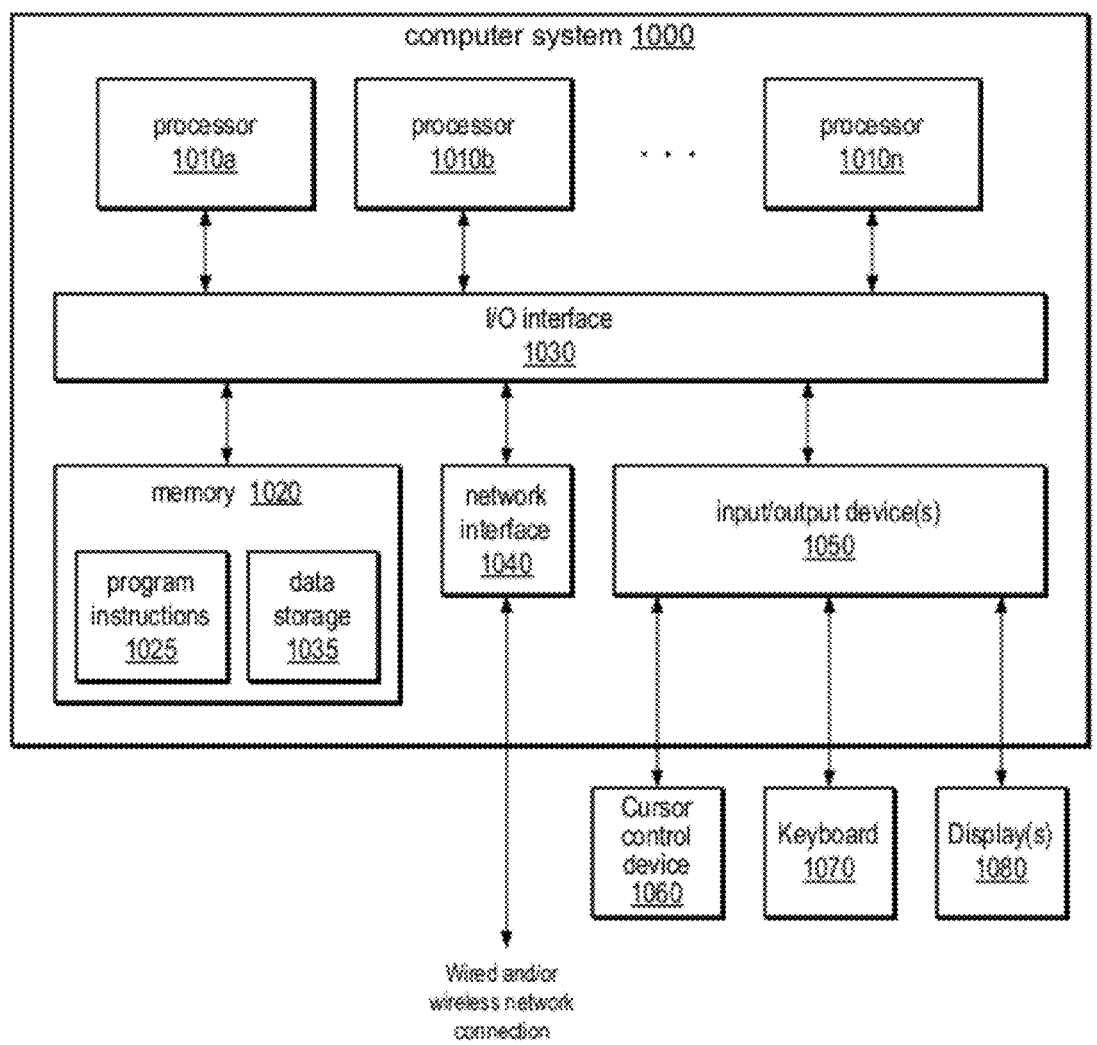
FIG. 24 illustrates an example computer system that may be used in embodiments.

In one embodiment, a full-resolution light-field rendering method for rendering high-resolution images from light-fields captured by focused plenoptic camera 200, and/or other image processing algorithms for application to light-fields captured by embodiments of focused plenoptic camera 200, may be implemented in captured data processing module 260. Captured data processing module 260 may be implemented in hardware, software, or a combination thereof. Alternatively, light-fields captured by focused plenoptic camera 200 may be rendered according to the full-resolution light-field rendering method implemented in a rendering module executing on a separate device, e.g. a computer system, to generate one or more high-resolution output images of a captured scene, as described herein. An example computer system in which embodiments of the full-resolution light-field rendering method may be implemented is illustrated in FIG. 24.

A focused plenoptic camera 200 may include a shutter 314. Shutter 314 may be located in front of or behind objective lens 230. A focused plenoptic camera 200 may include one or more processors 300. A focused plenoptic camera 200 may include a power supply or power source 304, such as one or more replaceable or rechargeable batteries. A focused plenoptic camera 200 may include a memory storage device or system 302 for storing captured light-field images and/or rendered final images or other information such as software. In one embodiment, the memory 302 may be a removable/swappable storage device such as a memory stick. A focused plenoptic camera 200 may include a screen 306 (e.g., an LCD screen) for viewing scenes in front of the camera prior to capture and/or for viewing previously captured and/or rendered images. The screen 306 may also be used to display one or more menus or other information to the user. A focused plenoptic camera 200 may include one or more I/O interfaces 312, such as FireWire or Universal Serial Bus (USB) interfaces, for transferring information, e.g. captured light-field images, software updates, and so on, to and from external devices such as computer systems or even other cameras. A focused plenoptic camera 200 may include a shutter release 308 that is activated to capture a light-field image of a subject or scene.

A focused plenoptic camera 200 may include one or more controls 310, for example controls for controlling optical aspects of the focused plenoptic camera 200 such as shutter speed, one or more controls for viewing and otherwise managing and manipulating captured images stored in a memory on the camera, etc. An adjustable focused plenoptic camera 200 may include one or more controls for adjusting the relative location of (the distance between) the components in the camera 200, such as the distance b between microlens array 220 and photosensor 210. An adjustable focused plenoptic camera 200 may include one or more manual or automatic adjusting mechanism(s) 320, or adjusters, configured to adjust the relative location of (the distance between) the components in the camera 200, such as the distance b between microlens array 220 and photosensor 210. In some embodiments, the adjusting mechanisms 320 may act to adjust one or more components responsively to controls 310.

FIG. 8 illustrates an example embodiment of a focused plenoptic camera 200 based on a large-format film camera. In conjunction with current high-resolution scanners used to digitize captured images from negatives or prints, large-format film camera embodiments are capable of up to 1 gigapixel, or even higher, resolution for the flat (a flat is a 2D representation of the 4D radiance). An example embodiment may, for example, be implemented in large-format film camera using a 135 mm objective lens 430 and 4×5 format film as the "photosensor" (in large-format cameras, single negatives of film are generally placed in a film holder 402 or cartridge that can be inserted into and removed from the camera body). Other objective lenses and/or other film formats, for example 8×10 format film, may be used in various embodiments. Focused plenoptic camera 400 includes a microlens array 406. FIG. 16 shows a zoom into an example microlens array, and shows individual microlenses and (black) chromium mask between the microlenses. In one embodiment of a microlens array that may be used in embodiments of focused plenoptic camera 400, or in other embodiments as illustrated in FIGS. 6 and 7, the microlens array 406 may include 146,000 microlenses of diameter 0.25 mm and focal length 0.7 mm. Other configurations of microlens array 406, including different numbers of microlenses and/or microlenses with different optical characteristics, are possible and anticipated.

In one embodiment, a mechanism inside a film holder 402 of the large-format film camera holds the microlens array 406 so that the flat side of the glass base of the array 406 is pressed against the film. In one embodiment, the thickness of the microlens array 406 is such that, when placed against the film, the microlenses are distance f from the film. Other configurations of microlens arrays 406 are possible, and the configuration of the large-format film camera makes it possible to easily change configurations of microlenses by simply using a different microlens array 406. Microsheets 404 of glass may be used in the assembly as spacers or shims between the microlens array 406 and the film in film holder 402 to increase the distance from the microlenses and the film to be greater than f (e.g., 4/3f). An example thickness of a microsheet 404 that may be used is 0.23 mm. Inserting microsheet glass 404 provides spacing in a rigorously controlled manner. In one embodiment, additional spacing may be created by adding a single microsheet 404 between the film holder 402 and the microlens array 406 in order to displace the microlenses by an additional 1/3f, approximately 0.2 mm from the sensor. Additional microsheets 404 may be added to provide additional spacing. In some embodiments, other mechanisms than microsheet glass may be used as spacers between the microlens array 406 and film holder 402 to adjust the distance between the microlens array 406 and film holder 402.

As illustrated in FIG. 8, in one embodiment, the film holder 402 and microlens array 406 may be coupled to create assembly 410. One or more microsheets 404 may optionally be inserted between the film holder 402 and microlens array 406 to provide additional spacing as necessary or desired. The assembly 410 may then be inserted into the large-format film camera. The combination of the large-format film camera and the assembly 410 effectively forms a focused plenoptic camera 400. Focused plenoptic camera 400 may then be used to capture a flat of a scene on the film in film holder 402. A flat is a 2D representation of the 4D lightfield. The assembly 410 may then be removed from the camera 400, disassembled, and the film may be appropriately processed. The film negative and/or a print of the flat may then be digitized, for example using a high-resolution scanner or a device that generates digital images from negatives. The digitized flat may be stored to a storage device, such as a disk drive, DVD, CD, etc. The digitized flat may be rendered according to the full-resolution light-field rendering method, implemented in a rendering module executing on a computer system, to generate one or more high-resolution output images of the scene as described herein. An example computer system in which embodiments of the full-resolution light-field rendering method may be implemented is illustrated in FIG. 24.

An analysis of the full-resolution light-field rendering methods and apparatus provided herein shows that focusing the microlenses on the image plane of the main lens in the focused plenoptic camera, rather than focusing on the main lens itself as in conventional plenoptic cameras, enables embodiments of the full-resolution light-field rendering methods and apparatus to more fully exploit positional information available in the captured flat (i.e., the 2D representation of the 4D light-field) captured by the light-field camera). Based on good focusing and high-resolution of the microlens images, embodiments of the described methods and apparatus are able to achieve very high-resolution of rendered images when compared to conventional plenoptic cameras and conventional rendering methods. For example, one embodiment achieves a 27× increase in resolution in each spatial dimension when compared to results from conventional plenoptic cameras and conventional rendering methods.

Full-Resolution Light-Field Rendering Method

Embodiments of a method and apparatus for rendering high-resolution images from a light-field, for example captured by embodiments of the focused plenoptic camera, are described. The method for rendering high-resolution images from the light-field may be referred to as a full-resolution light-field rendering method. The light-field rendering method may be referred to as full-resolution because the method makes full use of both positional and angular information available in the captured radiance data. The full-resolution light-field rendering method may be implemented as or in a tool, module, library function, plug-in, stand-alone application, etc. For simplicity, implementations of embodiments of the full-resolution light-field rendering method may be referred to as a rendering module. Alternatively, or in addition, other light-field rendering or processing techniques may be applied to captured flats by a rendering module, and/or by other modules. FIG. 24 illustrates an example computer system on which embodiments of a rendering module may be implemented.

A description of the full-resolution light-field rendering method and an analysis of the limits and tradeoffs of the method are presented. The effectiveness of the full-resolution light-field rendering method when compared to conventional methods may be demonstrated experimentally by rendering images from a 542-megapixel light-field using a conventional rendering approach and using the full-resolution light-field rendering method described herein. In the experiments, the conventional rendering methods produce a 0.146-megapixel final image, while the full-resolution light-field rendering method produces a 106-megapixel final image. Experimental results show that our method may produce full-resolution images that approach the resolution that would have been captured directly with a conventional (non-light-field) high-resolution camera.

Plenoptic Camera Modes of Behavior

The full-resolution light-field rendering method may be derived by analyzing the optical system of the plenoptic camera. First, some observations of captured flats, which are 2D representations of the 4D light-field, are presented, and these observations are used to motivate the subsequent analysis.

Figure 9:
FIG. 9 shows an example crop from a flat acquired with a plenoptic camera.

FIG. 9 shows an example crop from a raw flat acquired with a plenoptic camera. In FIG. 9, repeated edges inside multiple circles may be observed. Each microlens in the microlens array creates a microimage; the resulting flat is thus an array of microimages. On a large scale, the overall image may be perceived, whereas the correspondence between the individual microlens images and the large scale scene is less obvious. Interestingly, as will be shown, it is this relationship—between what is captured by the microlenses and what is in the overall scene—that may be exploited in embodiments to create high-resolution images.

In FIG. 9, on a small scale, a number of clearly distinguishable features inside the circles, such as edges, may be observed. Edges are often repeated from one circle to the next. The same edge (or feature) may be seen in multiple circles, in a slightly different position that shifts from circle to circle. If the main camera lens is manually refocused, a given edge can be made to move and, in fact, change its multiplicity across a different number of consecutive circles.

Repetition of features across microlenses is an indication that that part of the scene is out of focus. When an object from the large-scale scene is in focus, the same feature appears only once in the array of microimages.

In interpreting the microimages, it is important to note that, as with the basic conventional camera described above, the operation of a basic plenoptic camera is far richer than a simple mapping of the radiance function at some plane in front of the main lens onto the sensor. That is, there are an essentially infinite number of mappings from the scene in front of the lens onto the image sensor. For one particular distance, this corresponds to a mapping of the radiance function. What the correspondence is for parts of the scene at other distances—as well as how they manifest themselves at the sensor—is less obvious. This will be the topic of the remaining part of this section.

Next, two limiting cases are considered which can be recognized in the behavior of the plenoptic camera: Keplerian telescopic (where the distance between the photosensor and the microlens array, b, is greater than the focal length f of the microlenses in the array) and Galilean telescopic (also referred to as binocular) (where b is less than f). Neither of those cases is exact for a true plenoptic camera, but their fingerprints can be seen in every plenoptic image. As will be show, both are achievable, and are very useful.

Plenoptic Camera: Keplerian Telescopic Case

Figure 10:
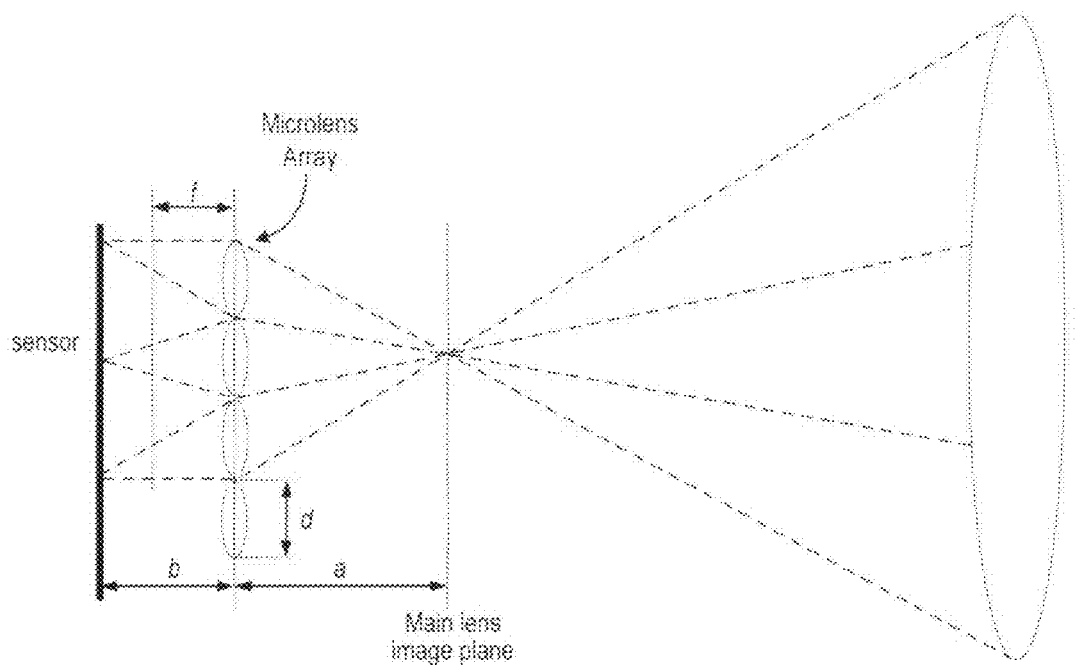
FIG. 10 illustrates the Keplerian telescopic case for a plenoptic camera.

FIG. 10 illustrates the Keplerian telescopic case (b>f) for a plenoptic camera. A plenoptic camera may be considered as an array of (Keplerian) telescopes with a common objective lens. (For the moment the issue of microlenses not being exactly focused for that purpose will be ignored.) Each individual telescope in the array has a microcamera (an eyepiece lens and the eye) inside the big camera. Just like any other camera, this microcamera is focused onto one single plane, and maps the image from the plane onto the retina, inverted and reduced in size. A camera can be focused only for planes at distances ranging from f to infinity (∞) according to the lens equation:

$$\frac{1}{a} + \frac{1}{b} = \frac{1}{f}$$

Here, a, b, and f have the same meaning as for the big camera, except on a smaller scale. It can be seen that since a and b must be positive, it is not possible to focus closer than f. In a conventional plenoptic camera, the image plane is fixed at the microlenses. It may be more natural to consider the image plane fixed at distance f in front of the microlenses. In both cases, microimages are out of focus.

Figure 11:
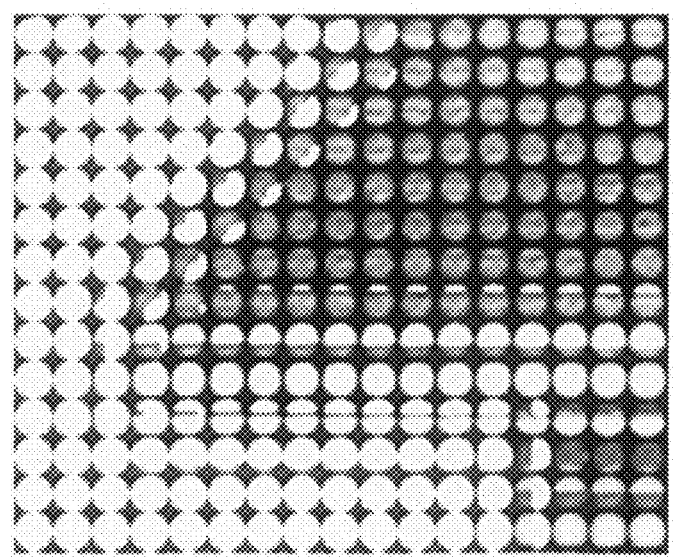
FIG. 11 shows a crop from the roof area in FIG. 9, and visually illustrates the Keplerian telescopic behavior in light-field cameras.

Following the movement of an edge from circle to circle, characteristic behavior of Keplerian telescopic imaging in the flat may be observed. FIG. 11 shows a crop from the roof area in FIG. 9. FIG. 11 may be used to visually illustrate the Keplerian "telescopic" behavior. It is possible to observe in FIG. 11 that the edge is repeated two times when moving away from the roof. The farther from the roof a circle is, the farther the edge appears inside that circle. Moving in any given direction, the edge moves relative to the circle centers in the same direction. Once detected in a given area, this behavior is consistent (valid in all directions in that area). Careful observation shows that images in the small circles are indeed inverted patches from the high-resolution image, as if observed through a telescope.

For the Keplerian telescopic case, a practical range for b may be f<b≦1.5f.

Plenoptic Camera: Galilean Telescopic (Binocular) Case

Figure 12:
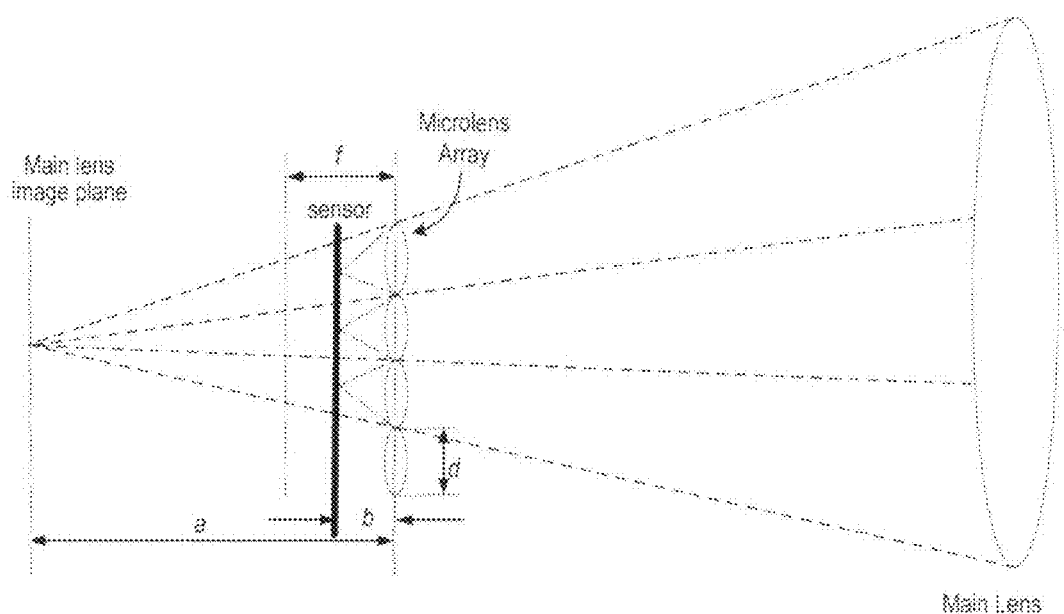
FIG. 12 illustrates the Galilean telescopic case for a plenoptic camera.
Figure 13:
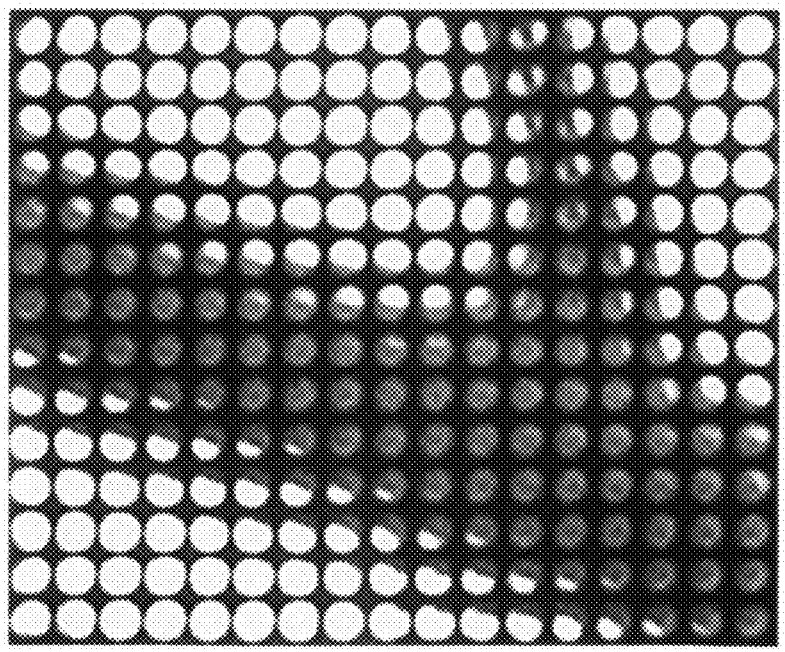
FIG. 13 shows a crop from the tree area in FIG. 9, and visually illustrates the Galilean telescopic behavior in light-field cameras.

FIG. 12 illustrates the Galilean telescopic, or binocular, case (b<f) for a plenoptic camera. FIG. 13 shows a crop from the tree area in FIG. 9, and is used to illustrate details of Galilean telescopic imaging in light-field cameras. Note that the image is not inverted in FIG. 13. A plenoptic camera may also be considered as an "incompletely focused" camera, i.e., a camera focused behind the film plane (as in a Galilean telescope and in binoculars). If an appropriate positive lens is placed in front of the film, the image would be focused on the film. For a Galilean telescope, this is the lens of the eye that focuses the image onto the retina. For a plenoptic camera, this role is played by the microlenses with focal length f. In the Galilean telescopic case, the microlenses would need to be placed at a distance smaller than f from the film. Note also that while the Keplerian telescopic operation inverts the inside image, the Galilean telescopic operation does not invert it.

As with Keplerian telescopic imaging, characteristic behavior of Galilean telescopic imaging can be observed in the plenoptic camera. See FIG. 13, which is a crop from the top left corner in FIG. 9. In FIG. 13, it can be observed that edges are repeated about two or three times when moving away from the branch. The farther from the branch, the closer to the branch the edge appears inside the circle. Moving in any given direction, the edge moves relative to the circle centers in the opposite direction. Once detected in a given area, this behavior is consistent (valid in all directions in that area). This is due to the depth in the image at that location. Careful observation shows that images in the small circles are in fact patches from the corresponding area in the high-resolution image, only reduced in size. The more times the feature is repeated in the circles, the smaller it appears and thus a bigger area is imaged inside each individual circle.

To summarize, an approximately focused plenoptic camera (i.e., a plenoptic camera where b≠f) may be considered as an array of microcameras looking at an image plane in front of the array or behind the array. Each microcamera images only a small part of that plane. The shift between those small images is obvious from the geometry, as explained below in the section titled Analysis. If at least one microcamera could image this entire plane, it could directly capture a high-resolution image. However, the small images are limited in size by the main lens aperture.

The magnification of these microcamera images, and the shift between them, is defined by the distance to the image plane. This distance can be at positive or negative distance from the microlenses, corresponding to the Keplerian telescopic (positive) and Galilean telescopic (negative) cases described above. By slightly adjusting the plane of the microlenses (so that the lenses are in focus), embodiments can make use of the Keplerian telescopic or Galilean telescopic behavior to generate a high-resolution image from the flat. This process is described in the following sections.

Analysis

In some embodiment, microlenses may not be focused exactly on the plane that is to be imaged, causing the individual microlens images to be blurry. This may limit the amount of resolution that can be achieved. One way to improve such results would be deconvolution. Another way would be to stop down the microlens apertures.

In FIGS. 14A and 14B, the case of a "plenoptic" camera using a pinhole array instead of microlens array is considered. In FIGS. 14A and 14B, an array of pinholes (or microlenses) maps the image in front of the array to the sensor. The distance to the image defines the magnification factor M=n−1. In ray optics, in theory, pinhole images produce no defocus blur, and in this way are perfect. But this is in theory; in the real world, pinholes are replaced with finite but small apertures and microlenses.

From the lens equation:

$$\frac{1}{a} + \frac{1}{b} = \frac{1}{f}$$

it can be seen that, if the distance to the object is a=nf, the distance to the image would be:

$$b = \frac{nf}{n-1}$$

$$n = \frac{b}{b-f}$$

The geometric magnification factor may be defined as M=a/b, which by substitution gives:

$$M=n-1$$

FIG. 14A shows the ray geometry in the Keplerian telescopic case for n=4, and FIG. 14B shows the ray geometry in the Keplerian telescopic case for n=2. Note that the distance b from the microlenses to the sensor is always greater than f (this is not represented in FIGS. 14A and 14B). Looking at the geometry in FIGS. 14A and 14B, the images are M times smaller, inverted, and repeated M times.

Full-Resolution Light-Field Rendering Algorithm

Two distinct behaviors (Keplerian telescopic and Galilean telescopic) are described above, and embodiments of the full-resolution light-field rendering method may execute a different action based on which behavior is observed in the microimages contained in the flat captured by a focused plenoptic camera. In one embodiment, if the full-resolution light-field rendering method detects edges (or features) moving relative to the microimage centers (the microimages are generally circular, so may be referred to as circles) in the same direction as the direction of movement, all microimages in that area are inverted relative to their individual centers (this is the Keplerian telescopic case). If the full-resolution light-field rendering method detects edges moving relative to the microimage centers in a direction opposite to the direction of movement, the method does nothing (this is the Galilean telescopic case). In some embodiments, examination of the microimages to determine the direction of movement of edges may be performed by a user via a user interface. The user may mark or otherwise indicate areas that the user determines need be inverted via the user interface. In some embodiments, examination of the microimages to determine the direction of movement of edges may be performed automatically in software.

The small circles, or microimages, in a flat are, effectively, puzzle pieces of the big image, and embodiments of the full-resolution light-field rendering method reproduce the big image by bringing the microimages sufficiently close together. The big image may also be reproduced by enlarging the pieces so that features from any given piece match those of adjacent pieces. Assembling the resized pieces reproduces exactly the high-resolution image.

In either of these approaches, the individual pieces may overlap. FIG. 15 illustrates a lens circle (or microimage) of diameter D and a patch of size $m_1 \times m_2$, where at least one of $m_1$ and $m_2$ is an integer greater than or equal to 2. Some embodiments of the full-resolution light-field rendering method avoid this overlapping by dropping all pixels outside a square of size $m_1 \times m_2$, effectively cropping the microimage to an $m_1 \times m_2$ square. Note that other embodiments may crop to other geometric shapes, such as a rectangle.

Conventional rendering methods do not reassemble pixels as described above; the conventional plenoptic camera algorithm produces one pixel per microlens for the output image. Embodiments of the full-resolution light-field rendering method, using the algorithm described above, produce a gain in resolution that is approximately equal to the number of pixels $m_1 \times m_2$ in the original patches. That is, embodiments produce $m_1 \times m_2$ pixels, instead of one pixel, per microimage It has been shown above that the magnification M=n−1. It is also the case that M=D/m. It therefore follows that:

$$n = 1 + \frac{D}{m}$$

From the above, the distance (measured in number of focal lengths) to the image plane in front of the microlens is related to D and m.

It is important to note that lenses produce acceptable images even when they are not exactly in focus. Additionally, out of focus images can be deconvolved, or simply sharpened. For those reasons, the above analysis is actually applicable for a wide range of locations of the image plane. Even if not optimal, such a result is often a useful tradeoff.

The optics of the microlens as a camera is the main factor in determining the quality of each microimage. Blurry images from optical devices may be deconvolved and the sharp image recovered to some extent. In order to do this, the effective kernel of the optical system should be known. While there are limitations in this related to bit depth and noise, embodiments may increase resolution up to $m_1 \times m_2$ times the resolution of a conventional plenoptic camera and conventional rendering method. Example embodiments have demonstrated a 27× increase of resolution in one plane, and a 10× increase of resolution in another plane, when compared to conventional methods and apparatus, and without any deconvolution. Other embodiments may yield other increases in resolution when compared to conventional methods and apparatus.

Example Results

Some embodiments of a focused plenoptic camera as described herein may be implemented in film cameras. Embodiments may, for example, be implemented in large-format film cameras. An example large-format film camera embodiment is illustrated in FIG. 8. One example embodiment may, for example, be implemented in large-format film camera using a 135 mm objective lens and 4×5 format film. A focused plenoptic camera based on a large-format film camera rather than on a digital camera may be used for experimental purposes in order to avoid resolution constraint of digital sensors. However, film camera embodiments of the focused plenoptic camera design are practical and may have practical applications. In conjunction with current high-resolution scanners used to digitize captured images from negatives or prints, large-format film camera embodiments are capable of 1 gigapixel, or even higher, resolution for the flat (2D) representation of the 4D radiance (the raw flat).

A component of the focused plenoptic camera is a microlens array. FIG. 16 shows a zoom into an example microlens array, and shows individual microlenses and (black) chromium mask between the microlenses. In one embodiment of a microlens array that may be used in the example embodiment based on a large-format film camera, the microlens array includes 146,000 microlenses of diameter 0.25 mm and focal length 0.7 mm. A mechanism inside a 4×5 inch film holder of the large-format film camera holds the microlens array so that the flat side of the glass base is pressed against the film. In one embodiment, the thickness of the microlens array is such that, when placed against the film, the microlenses are distance f from the film. Other configurations of microlenses arrays are possible, and the configuration of the large-format film camera makes it possible to easily change configurations of microlenses by simply using a different microlens array. Microsheets of glass may be used in the assembly as spacers or shims between the microlens array and the film to increase the distance from the microlenses and the film to be greater than f (e.g., 4/3f). An example thickness of a microsheet that may be used is 0.23 mm. Inserting microsheet glass provides spacing in a rigorously controlled manner. In one embodiment, additional spacing may be created by adding a single microsheet between the film and the microlenses in order to displace the microlenses by an additional 1/3f, approximately 0.2 mm from the sensor. Additional microsheets may be added to provide additional spacing.

Experiments may be conducted both with and without inserting microsheets of glass as spacers or shims between the microlens array and the film in the example film camera used for testing. In both cases, the focal length of the microlenses is f=0.700 mm. The spacing in two experimental conditions differ as follows:

b=0.71 mm so that n=71 and M=70, which is made possible directly by the thickness of glass of the microlens array assembly itself; and b=0.94 mm based on microsheet glass between microlens array and film. As a result, n=3.9 (almost 4) and M=3, approximately.

High-Resolution Rendering Methods and Results

FIGS. 17 through 20 are used to illustrate experimental results from applying the full-resolution rendering method to flats captured with the example focused plenoptic camera based on a large-format film camera described above. In particular, the operation of rendering in both the Keplerian telescopic case and the Galilean telescopic case is illustrated and described.

Figure 17:
FIG. 17 shows a portion of a digitized flat.

The original, unrendered flat was generated by capturing the image on film using the example focused plenoptic camera based on a large-format film camera, and digitizing the image via a scanning process using a high-resolution scanner. A portion of the digitized flat is shown in FIG. 17. After digitization, the full original flat is 24,862×21,818 pixels, of which 2,250×1,950 pixels are shown in FIG. 17. The approximate region of the original flat extracted to produce FIG. 17 is shown by small solid white rectangle in FIG. 18C.

Figure 18A:
FIGS. 18A through 18C show output images rendered from a flat using conventional rendering methods.
Figure 18B:
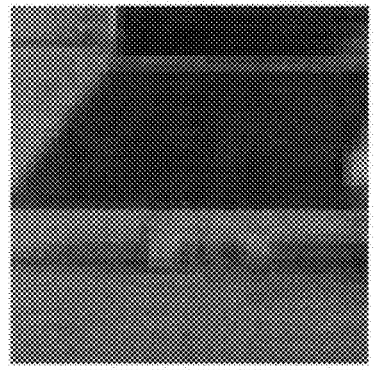
Figure 18C:
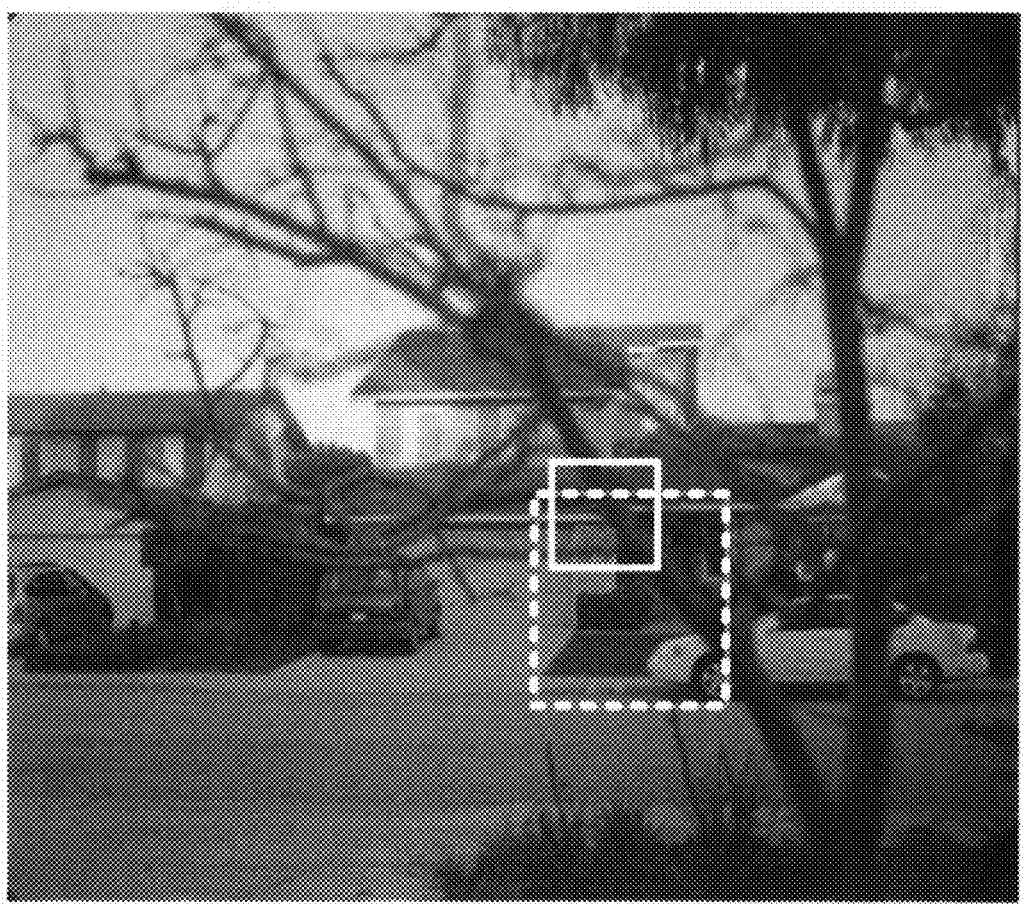

Output images rendered from the flat using conventional rendering methods are shown in FIGS. 18A through 18C. The entire flat was rendered with the conventional method, resulting in a 408×357 pixel image. FIG. 18A is rendered at 300 ppi, while FIG. 18C is rendered at 72 ppi. At 300 ppi, the image is only about 1 inch by 1 inch. FIG. 18B shows a 27× magnification of a crop of the curb area from the 300 ppi image in FIG. 18A. The solid white rectangle in FIG. 18C shows the region from the light-field shown in FIG. 17. The dashed white rectangle in FIG. 18C shows a region that is rendered according to an embodiment of the full-resolution light-field method as shown in FIGS. 19 and 20.

Figure 19:
FIG. 19 show a full-resolution rendering of a light-field, rendered assuming the Keplerian telescopic case according to one embodiment of the full-resolution light-field rendering method.

FIG. 19 show a full-resolution rendering of the experimental light-field, rendered assuming the Keplerian telescopic case according to one embodiment of the full-resolution light-field rendering method described herein. This region of the image is shown by the dashed white rectangle in FIG. 18C. For this rendering, the scaling-down factor was taken to be approximately 2.4, so that the full-resolution rendered image measured 11016×9666, i.e., over 100 megapixels. Even though the image is at 300 dpi, only a 2,250×1,950 region is shown in FIG. 19. The image is well-focused at full-resolution in the region of the house, but not well-focused on the tree branches.

Figure 20:
FIG. 20 shows a full-resolution rendering of a light-field, rendered assuming the Galilean telescopic case according to one embodiment of the full-resolution light-field rendering method.

FIG. 20 shows a full-resolution rendering of the experimental light-field, rendered assuming the Galilean telescopic case according to one embodiment of the full-resolution light-field rendering method described herein. This region of the image is shown by the dashed white rectangle in FIG. 18C. Note that, in contrast to the image in FIG. 20, this image is well-focused at full-resolution in the region of the tree branches but not well-focused on the house.

Figure 21:
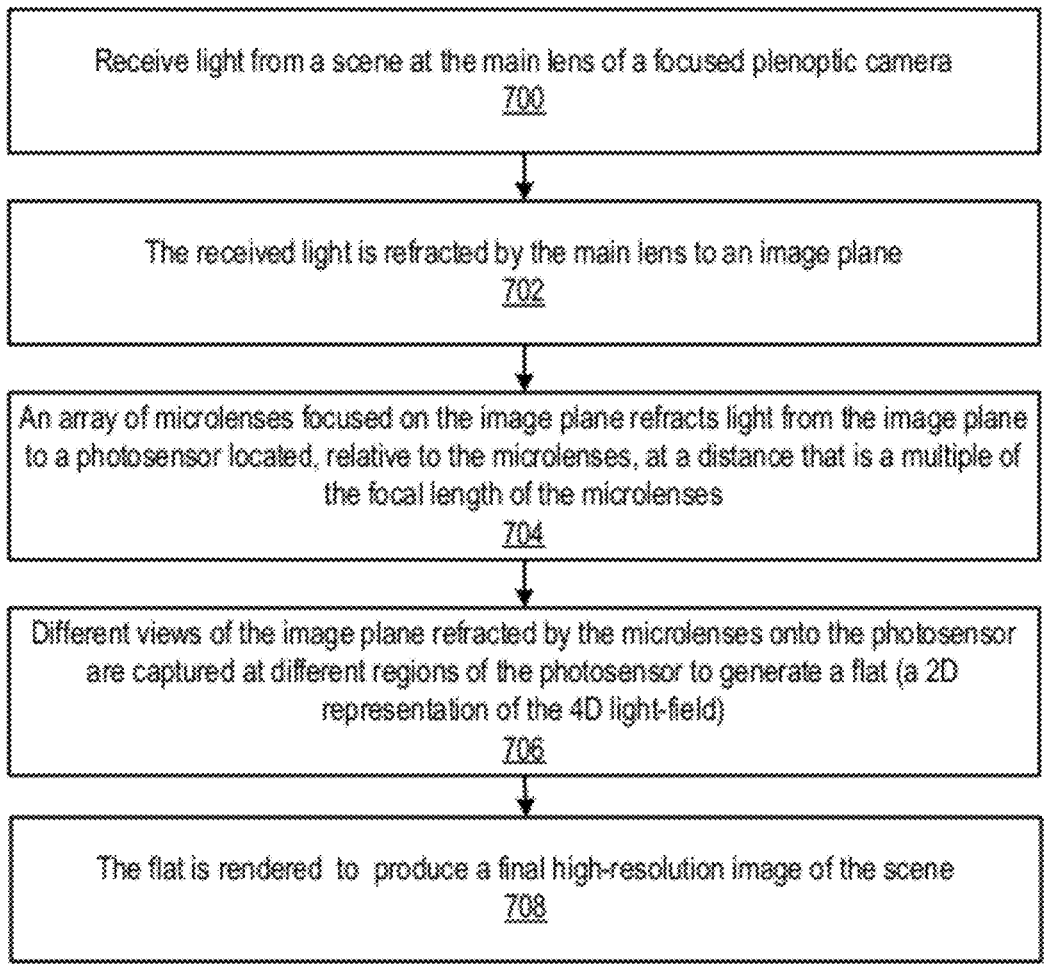
FIG. 21 is a flow chart illustrating how light is directed within a focused plenoptic camera according to one embodiment.

FIG. 21 is a flow chart illustrating how light is directed within a focused plenoptic camera according to one embodiment. As indicated at 700, light from a scene is received at the main lens of a focused plenoptic camera. FIGS. 6, 7 and 8 illustrate example focused plenoptic cameras. As indicated at 702, the received light is refracted by the main lens to an image plane. As indicated at 704, an array of microlenses, the microlenses of which are focused on the image plane, refracts light from the image plane onto a photosensor located, relative to the microlenses, at a distance that is a multiple of the focal length f of the microlenses. For example, the distance between the microlenses and the photosensor may be 3/4f, 4/3f, 5/3f, 1.5f, and so on. As indicated at 706, different views of the image plane, refracted by the microlenses onto the photosensor, are captured at different regions of the photosensor to generate a flat, which is a 2D representation of the 4D light-field. In some embodiments, the photosensor may be a device configured to digitally capture light such as a CCD, while in other embodiments the photosensor may be conventional film. As indicated at 708, the captured flat may be rendered to produce a final high-resolution image, or images, of the scene, for example using a full-resolution light-field rendering method as described in FIG. 22. For flats captured on conventional film, the flat may be digitized to generate a digitized flat before rendering.

Figure 22:
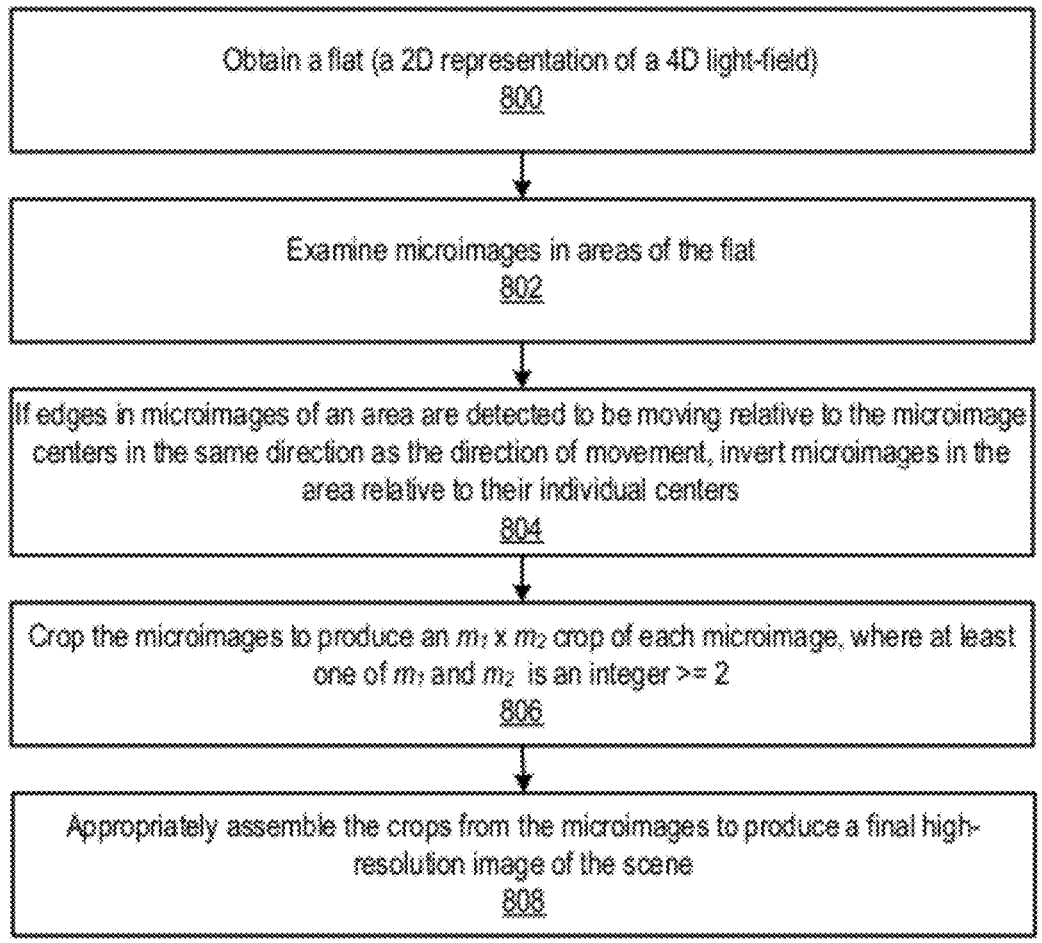
FIG. 22 is a flowchart of a full-resolution light-field rendering method according to one embodiment.

FIG. 22 is a flowchart of a full-resolution light-field rendering method according to one embodiment. As indicated at 800, a flat captured by a focused plenoptic camera may be obtained (see, e.g., FIG. 9 for an example of what such a flat may look like to a human observer). As indicated at 802, microimages in areas of the flat may be examined (manually or automatically, as described below) to determine the direction of movement of edges in the microimages relative to a direction of movement of the algorithm. At 804, if it is determined that edges in microimages of an area are moving relative to the microimage centers in the same direction as the direction of movement, the microimages in that area may be inverted relative to their individual centers. If the edges are not moving relative to the microimage centers in the same direction as the direction of movement (i.e., if the edges are moving in the opposite direction as the direction of movement), then the microimages in the area are not inverted.

In some embodiments, examination of the microimages to determine the direction of movement of edges may be performed manually by a user via a user interface. The user may mark or otherwise indicate areas that the user determines need be inverted via the user interface. In some embodiments, examination of the microimages to determine the direction of movement of edges may be performed automatically in software. In some embodiments, an automated software method may examine the microimages to determine noise in the microimages, for example using a Fourier transform to detect peaks at certain frequencies. An excessive amount of noise in an area of the final rendered image may indicate that microimages in that area are flipped, and thus need to be inverted. Microimages that include noise over a specified threshold may be marked to be inverted.

As indicated at 806, the microimages may each be cropped to produce an $m_1 \times m_2$ subregion or crop of each microimage, where at least one of $m_1$ and $m_2$ is an integer greater than two. As indicated at 808, the subregions or crops from the microimages may be appropriately assembled to produce a final high-resolution image of the scene.

In some embodiments, instead of cropping the microimages and assembling the subregions generated by the cropping, the microimages themselves may be appropriately assembled to produce a final high-resolution image of the scene. Thus, in these embodiments, element 806 is not performed; at 808, the microimages are assembled to produce an output image. In assembling the microimages, overlapping portions of adjacent microimages may be merged, blended, or otherwise handled.

In some embodiments, two or more images rendered from a flat according to rendering methods described herein may be combined to produce a higher-quality output image. For example, in some embodiments, the microimages in a flat may all be inverted, and the inverted microimages appropriately assembled to produce a first intermediate image. A second intermediate image may be generated without inverting the microimages prior to assembling. The two intermediate images may then be combined to produce a higher-quality output image. The combination of the two images may be performed manually by a user via a user interface, for example using a selection tool to select portions of an image to be combined with the other image, or alternatively may be performed automatically in software, for example using a noise detection technique as described above to find excessively noisy regions of one or both intermediate images. As an example, when combining the images, the user may manually (or software may automatically) select areas in one intermediate image that are of higher quality than the same areas in the other image, and then combine the selected areas with the other image to produce an output image that includes the highest quality portions of the two intermediate images. In some embodiments, a map (e.g., a bitmap) may be generated that indicates areas of each image that are to be included in the output image, and then the output image may be generated from the two intermediate images according to the map. In some embodiments, more than two intermediate images may be generated, and a similar method may be used to generate a higher-quality output image from the intermediate images.

Figure 25:
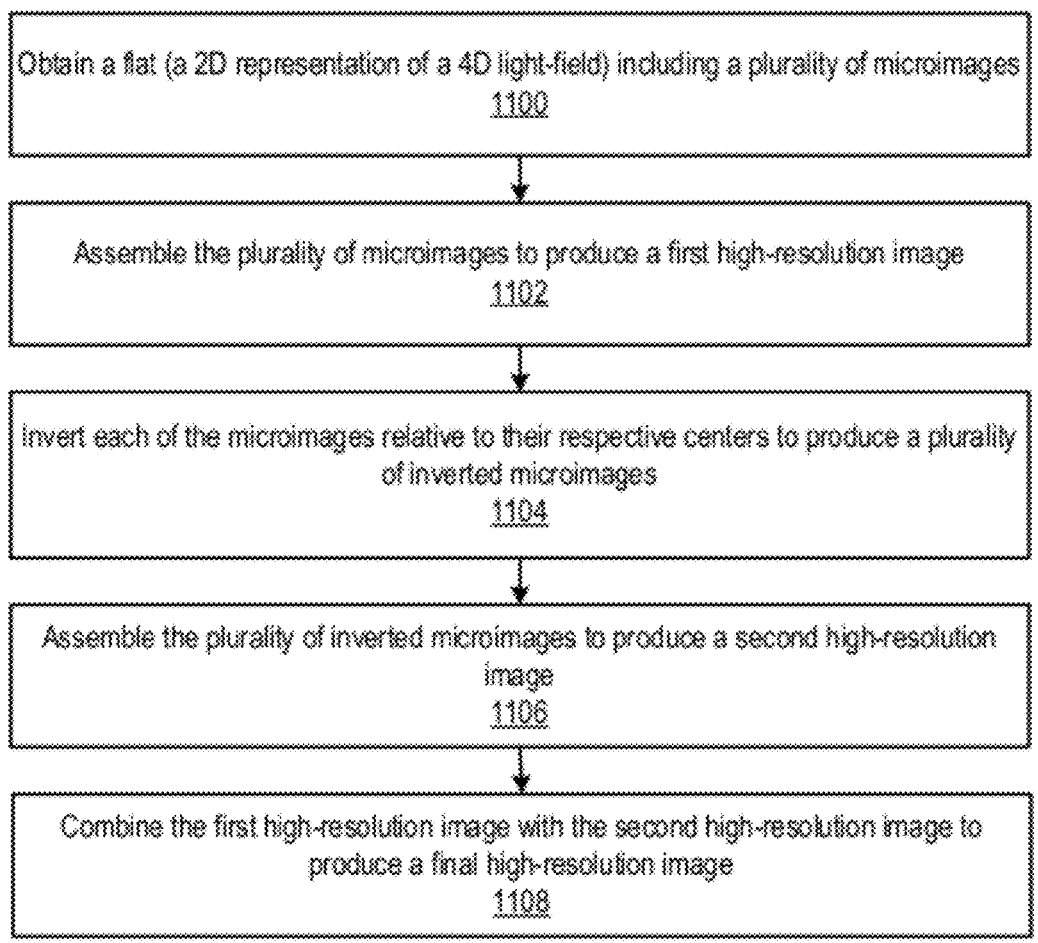
FIG. 25 is a flowchart of a full-resolution light-field rendering method in which multiple images are rendered from a flat and combined to produce a final high-resolution output image, according to some embodiments.

FIG. 25 is a flowchart of a full-resolution light-field rendering method in which multiple images are rendered from a flat and combined to produce a final high-resolution output image, according to some embodiments. As indicated at 1100, a flat captured by a focused plenoptic camera may be obtained (see, e.g., FIG. 9 for an example of what such a flat may look like to a human observer). As indicated at 1102, the plurality of microimages may be assembled to produce a first high-resolution image. As indicated at 1104, each of the microimages may be inverted relative to their respective centers to produce a plurality of inverted microimages. As indicated at 1106, the plurality of inverted microimages may be assembled to produce a second high-resolution image. As indicated at 1108, the first high-resolution image may be combined with the second high-resolution image to produce a final high-resolution image. The combination of the two images may be performed manually by a user via a user interface, for example using a selection tool to select portions of an image to be combined with the other image, or alternatively may be performed automatically in software, for example using a noise detection technique as described above to find excessively noisy regions of one or both intermediate images.

Figure 26:
FIG. 26 shows an example full-resolution rendering of a light-field in which foreground and background portions of the images shown in FIGS. 19 and 20 have been combined, according to one embodiment of the full-resolution light-field rendering method.

FIG. 26 shows an example full-resolution rendering of a light-field in which foreground and background portions of the example images shown in FIGS. 19 and 20 have been combined to produce a higher-quality output image. In FIG. 26, the foreground portion (the tree) of FIG. 19 has been replaced with the corresponding foreground portion of FIG. 19.

In some embodiments, multiple images may be rendered from a flat according to rendering methods described herein, using different values for $m_1$ and/or $m_2$ to crop the microimages before assembling the crops. This may produce multiple images with different visual quality. For example, assuming a square crop is to be made (i.e., $m_1=m_2$), some embodiments may be configured to perform the rendering using values for $m_1$ and $m_2$ in a specified range, for example from 5 to 10 inclusive to produce 6 output images, from 5 to 20 to produce 16 output images, and so on. One or more images may then be selected from among the multiple rendered images according to the quality of the images as output image(s). The selection may be performed manually, for example by a user via a user interface, or alternatively may be performed automatically in software, for example using a noise detection technique as described above to select images with lower levels of noise in one or more frequencies. Alternatively, two or more of the images may be selected and combined to generate a higher-quality output image. The combination of the images may be performed manually or automatically.

In some embodiments, inversion and cropping of microimages may be combined in a single automatic operation. For example, in some embodiments, a software module or modules configured to perform both inversion and cropping of microimages in a flat or in a specified area of a flat may have ($m_1$, $m_2$) as input parameters (or, alternatively, an input parameter m if the crop is to be a square and thus $m_1=m_2$). A negative value for ($m_1$, $m_2$) may be used to indicate that the microimages in the input flat or area are to be inverted, with a positive value for ($m_1$, $m_2$) indicating that the microimages are not to be inverted. Other methods to indicate whether microimages are to be inverted may be used.

In some embodiments, inversion and cropping of microimages may be performed in various combinations on an input flat to render multiple rendered images according to the combinations. For example, in one embodiment, some images may be rendered using a range of values for $m_1$ and $m_2$ as described above while also inverting the microimages, while other images may be rendered using a range of values for $m_1$ and $M_2$ as described above in which the microimages are not inverted. One or more of the rendered images may then be manually or automatically selected as output image(s). Alternatively, two or more of the rendered images may be combined as previously described (see, e.g., FIG. 26) to produce an output image.

Focused Plenoptic Cameras Employing Different Filtering at Different Microlenses Various embodiments of methods and apparatus for capturing and rendering images with focused plenoptic cameras employing different filtering at different microlenses are described. In a focused plenoptic camera, if the scene is sufficiently far from the camera, the scene may be considered to be at infinity. Depending on the camera, the distance from the camera at which a scene or object is at infinity typically lies within a range of about one meter to about five meters, although this range may include shorter or longer distances for some camera configurations. The main camera lens of the focused plenoptic camera creates an image of the scene at the focal plane of the main lens. Different ones of the microlenses may project identical or nearly identical microimages of the image at the focal plane onto the sensor. Thus, each point of the image at the focal plane is re-imaged onto the sensor multiple times by multiple microlenses in the microlens array of a focused plenoptic camera. Embodiments may leverage these characteristics of the focused plenoptic camera by applying different optical elements, such as different filters or different apertures, at different ones of the microlenses to capture various characteristics of light, such as luminance, color, polarization, and so on, differently (e.g., at different levels of exposure for luminance, at different wavelengths of color, at different angles of polarization, etc.) in different microimages. All of the microimages are captured at the same time in a single image (referred to as a flat) at the sensor. Thus, multiple microimages of the same image of a scene may be captured at different colors, different exposures, different polarities, etc., in a single image at the same time with a focused plenoptic camera according to embodiments. Images captured using embodiments of a focused plenoptic camera with different lenses may be used in High Dynamic Range (HDR) imaging, spectral imaging, and other imaging applications. When the main image created by the main lens of the focused plenoptic camera represents objects that are at optical infinity, those objects are exactly at the focal plane of the camera, one focal length from the main lens. The different views of the main image captured by the different microlenses are identical or nearly identical 3D views of the objects, that is identical or nearly identical images, but modified in brightness, color, polarization, or other characteristics. Thus, imaging functions, such as HDR imaging and spectral imaging, performed according to embodiments may produce precise and high quality output images, such as HDR images, color images, and so on.

In embodiments, different filters or other optical elements such as apertures that provide two or more different levels or types of light filtering may be combined with different ones of the microlenses in a microlens array of a focused plenoptic camera such as camera 200 illustrated in FIGS. 6 and 7 and camera 400 illustrated in FIG. 8. For example, an alternating pattern (or some other pattern) of two or more different filters may be applied to the microlenses of a microlens array, with one filter applied to each microlens. A raw image or "flat" captured using a focused plenoptic camera that incorporates two or more different filters includes multiple microimages captured according to the two or more different filters. One or more different images may then be assembled from the microimages, with each image assembled from the microimages captured using one of the different filters. A final image may then be generated by appropriately combining the images assembled from the microimages. Alternatively, a final image, or multiple images, may be assembled from the microimages that incorporates characteristics captured according to the two or more different filters by first combining the microimages and then assembling the combined microimages to produce one or more output images. Example methods for assembling microimages from a flat captured by a focused plenoptic camera to generate an image or images are shown in FIGS. 22 and 25.

In embodiments of a focused plenoptic camera with two or more different filters applied to different microlenses in the microlens array, a single image or "flat" may be captured using the camera. The flat consists of multiple microimages, each corresponding to a microlens in the microlens array. From this single flat, two or more different images may be generated by appropriately assembling the microimages. The two or more images exhibit different characteristics according to the respective filters used on the microlenses that captured the microimages from which the images are assembled. This allows, for example, a single image or flat to be captured of an action scene, such as a sporting event or wildlife; from that flat, multiple images, for example at different levels of exposure or at different polarization angles, may be generated. Two or more of the multiple images, or portions thereof, may then be combined to generate an output image.

In some embodiments, the microimages from a raw flat captured with a focused plenoptic camera employing two or more different filters may be combined to generate a combined flat (a flat including the combined microimages). The microimages from the combined flat may then be appropriately assembled to produce one or more output images. Combining the microimages to generate a combined flat allows the combined flat to be used in generating 3D views, performing refocusing, parallax generation, and in general in any of various light-field operations that may be performed on a flat captured with a focused plenoptic camera.

Different types of filters may be used in embodiments. Filters that may be used include, but are not limited to, light-limiting filters, color filters, and polarizing filters. Light-limiting filters may be implemented, for example, as neutral-density filters or as apertures. In embodiments employing light-limiting filters, different levels of light filtering may be employed at different microlenses (using either different neutral density filters or different apertures) to thus capture microimages at different levels of exposure in a raw flat. The microimages from the raw flat may then be appropriately assembled to generate High Dynamic Range (HDR) images. As noted above, the microimages may be combined to generate an HDR flat; the HDR flat may then be used generate 3D views, perform refocusing, and in general in any of various light-field operations in the HDR domain. Alternatively, the microimages from the raw flat may be appropriately assembled to generate two or more different intermediate images of the captured scene, each at a respective level of exposure, and the two or more intermediate images may then be combined to generate an HDR output image.

In embodiments employing color filters, different color filters may be employed at different microlenses to thus capture microimages specific to different wavelengths of light corresponding to the respective color filters. The microimages from the raw flat may be appropriately assembled to generate two or more images of the captured scene each corresponding to one of the color filters. Two or more of the images thus generated may be combined to generate color output images of the scene. Alternatively, the microimages from the raw flat may first be combined to generate a combined flat, and color output images may be appropriately assembled from the combined flat.

In embodiments employing polarizing filters, different polarizing filters may be employed at different microlenses to thus capture microimages specific to different polarizations of light corresponding to the respective polarizing filters. The microimages from the raw flat may be appropriately assembled to generate two or more images of the captured scene each corresponding to one of the polarizing filters. Two or more of the images thus generated may be combined to generate output images of the scene. Alternatively, the microimages from the raw flat may first be combined to generate a combined flat, and output images may be appropriately assembled from the combined flat.

Capturing High Dynamic Range (HDR) Images with a Focused Plenoptic Camera

In embodiments employing light-limiting filters, different levels of light filtering may be employed at different microlenses to capture microimages at different levels of exposure. In a focused plenoptic camera, the main camera lens creates an image at the focal plane. That image is re-imaged on the sensor multiple times by the array of microlenses. Different microlenses are provided with different neutral density filters or, alternatively, different apertures, that differently limit the amount of light through the microlenses. Thus, the microimages captured at the sensor via the individual microlenses are effectively at different effective exposures (or F-numbers). The microimages may be appropriately combined to generate an HDR image, or alternatively an HDR flat, of the scene.

In a focused plenoptic camera, the main camera lens creates an image "in the air" at the focal plane. This may be referred to as the main image. This image is observed by an array of microlenses that are focused on the main image (and not on the main lens). Based on the multiple microlenses (which may be viewed as multiple microcameras), each point in the main image is re-imaged two or more times on to the sensor, and thus each point in the main image is captured in two or more of the microimages at the sensor. This is true for both the Keplerian telescopic mode and the Galilean telescopic (or binocular) mode of a focused plenoptic camera.

Figure 27A:
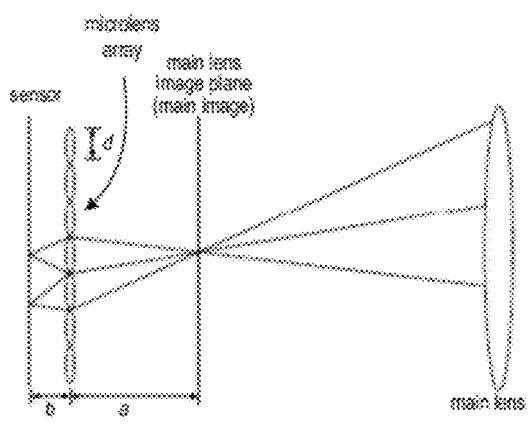
FIGS. 27A and 27B illustrate the different modes or configurations of a focused plenoptic camera according to some embodiments.
Figure 27B:
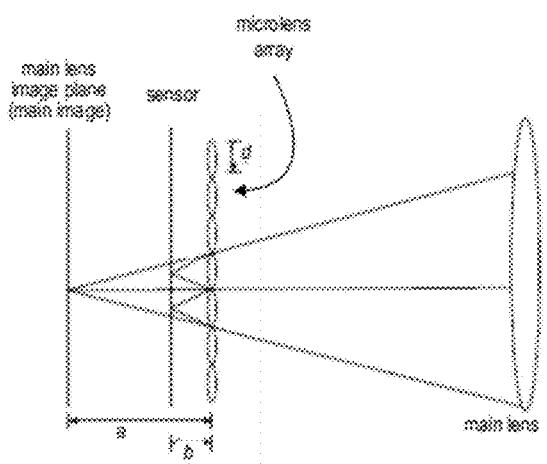

FIGS. 27A and 27B illustrate the different modes or configurations of a focused plenoptic camera according to some embodiments. FIG. 27A illustrates the Keplerian telescopic mode, and FIG. 27B illustrates the Galilean telescopic, or binocular, mode. Referring to FIG. 27A, in the Keplerian telescopic mode, the main image is real and is in front of the sensor. Referring to FIG. 27B, in Galilean telescopic mode, the main image is virtual, and is behind the sensor. In both modes, the main image is re-imaged to the sensor multiple times. The unobstructed diameters of the microlenses are the same, denoted as d. The distances a and b and the focal length of the microlenses satisfy the lens equation. Note that, in Galilean mode, a is negative.

Focused Plenoptic Camera with Apertures

Since the microlenses in a focused plenoptic camera effectively form microcameras, each microlens may be provided with an aperture. Different aperture sizes for the microlenses provide different F-numbers and exposures. Thus, two adjacent microlenses (each a "microcamera") with different sizes of apertures may be used to simultaneously capture microimages of the main image at different F-numbers and exposures. Since all of the microcameras in a focused plenoptic camera work simultaneously to capture microimages of the main image, a focused plenoptic camera with different apertures at the microlenses may capture a single flat including multiple microimages of the main image at different F-numbers and exposures, and an HDR image may be generated from the captured flat. Thus, embodiments do not have to capture two or more consecutive images at different times to generate an HDR image, as would be necessary with conventional cameras.

Figure 28:
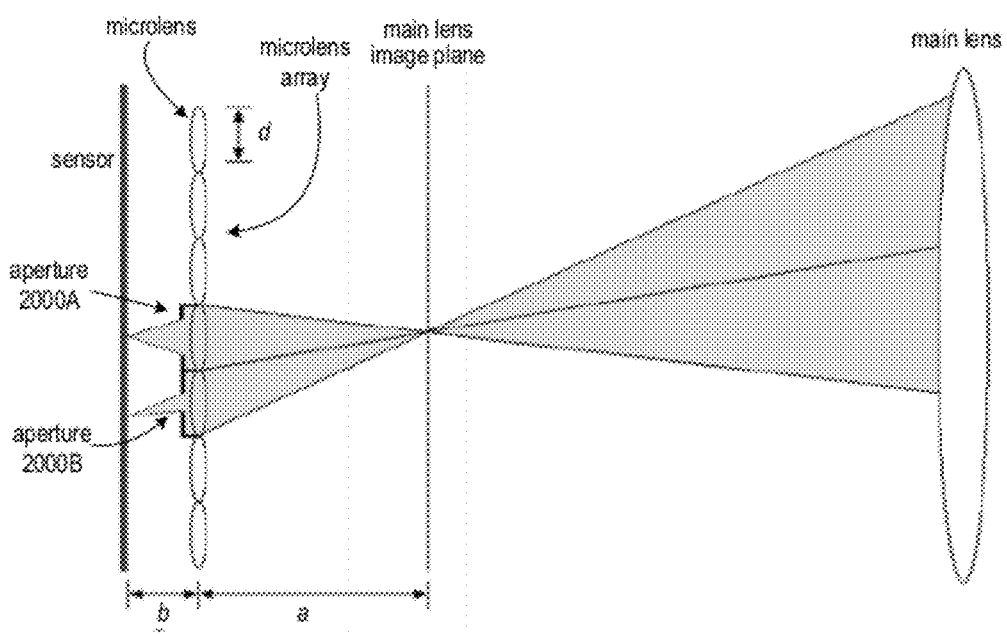
FIG. 28 illustrates a focused plenoptic camera including apertures at the microlenses according to some embodiments.

FIG. 28 illustrates a focused plenoptic camera including apertures at the microlenses according to some embodiments. The Keplerian telescopic mode is shown by way of example; however, apertures as illustrated in the Figure may be used in the Galilean telescopic, or binocular, mode as well. Two different apertures, aperture 2000A and aperture 2000B, are shown in the Figure. Note that the two apertures have different diameters, and that the diameters of the apertures are smaller than the microlens diameter d. More than two different apertures may be used, for example three, four, or more different diameters may be used. In some embodiments, some of the microlenses may not have apertures (effectively being "wide open" or at 100%) while others of the microlenses may have apertures. While FIG. 28 shows the apertures as located behind the microlenses, between the microlenses and the sensor, in some embodiments the apertures may be located in front of the microlenses, between the microlenses and the main lens.

Figure 29:
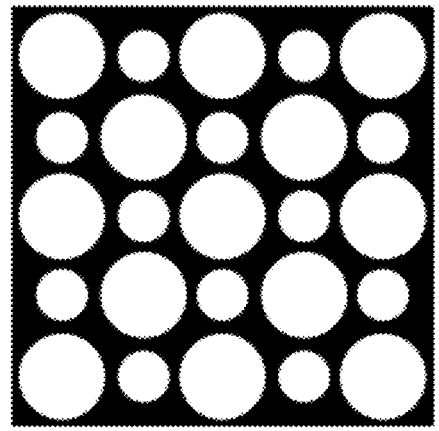
FIG. 29 illustrates an example pattern of different apertures that may be used in embodiments.

FIG. 29 illustrates an example pattern of different apertures that may be used in embodiments. The Figure shows an alternating pattern including circular apertures of two different diameters. It is to be noted that apertures of more than two different diameters may be used, different geometric shapes of apertures may be used for the apertures, and that other patterns may be used.

Circular apertures produce good quality images even when not perfectly in focus. The apertures define their F-numbers. In embodiments of the focused plenoptic camera, the full aperture F-number of the main lens may be matched with the F-number of the microlenses to maximize usage of the sensor space while not overlapping the microimages. Therefore, the apertures at the microlenses effectively limit the F-number of the main lens. This has two effects. First, microimages can be captured at the same maximal and reduced exposure as the main lens. Second, the diffraction is the same or worse than that of the main lens. The diffraction is defined by the F-number, and the final effect is a blur that for a circular apertures is $1.22\lambda F$, where $\lambda$ is the wavelength of light.

Figure 30A:
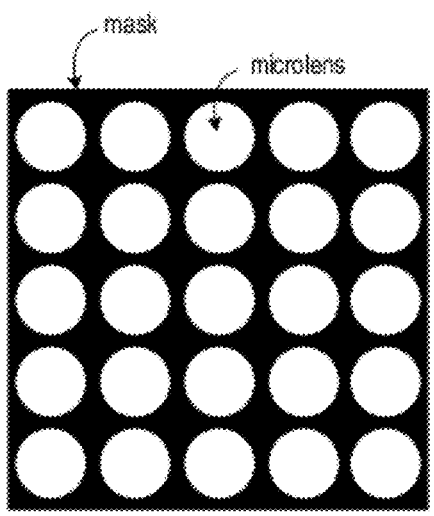
FIG. 30A illustrates a simple microlens array with wide-open apertures.
Figure 32:
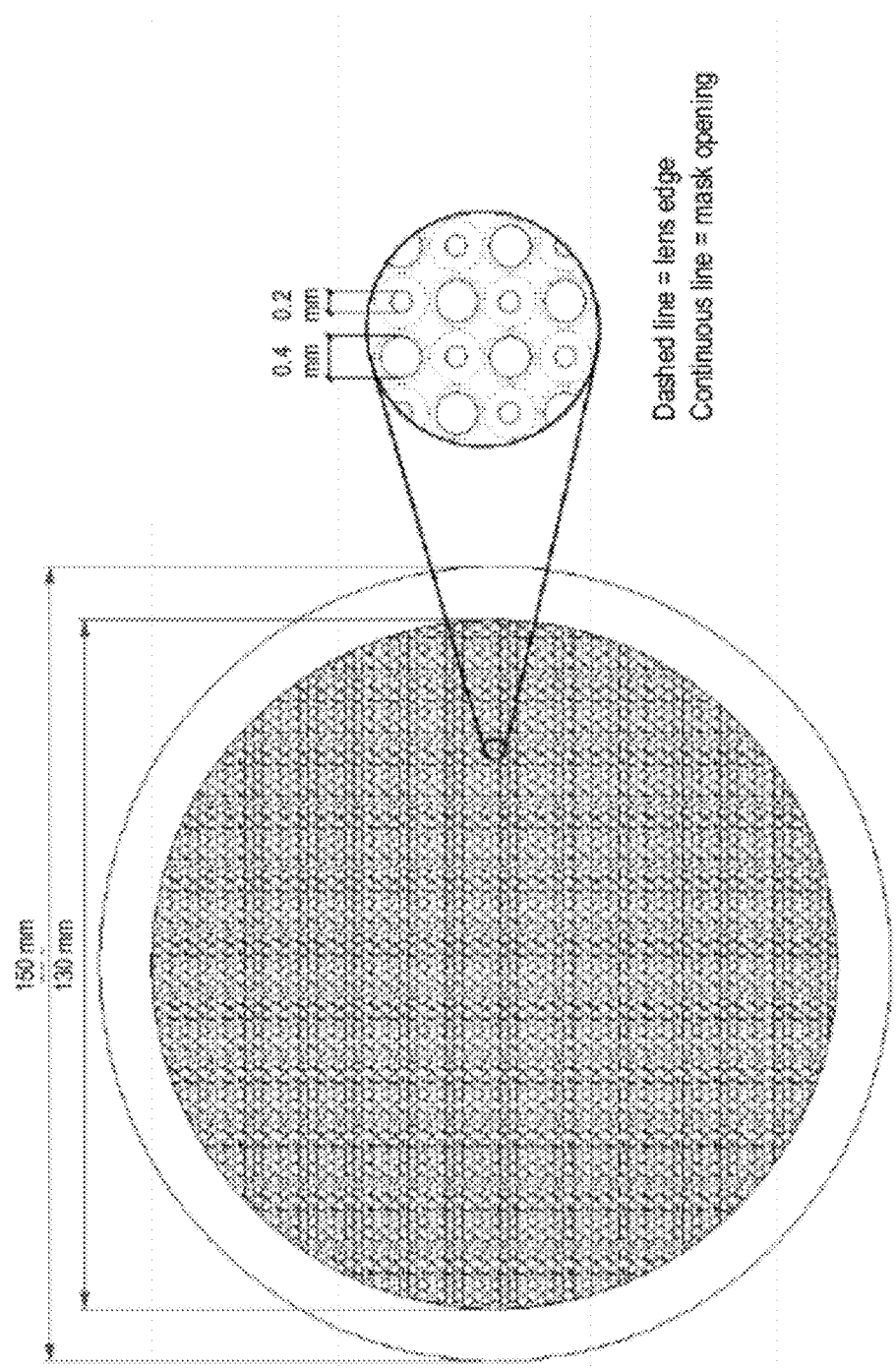
FIG. 32 illustrates an example circular microlens wafer including apertures at the microlenses, according to some embodiments.

FIGS. 30A through 30D illustrate different example patterns of apertures on a microlens array. FIG. 30A illustrates a simple microlens array with wide-open apertures. The microlens array may be manufactured as a wafer, for example a glass or fused silica wafer, with the microlenses integrated into the wafer. FIG. 32 illustrates an example circular microlens wafer. Referring to FIG. 30A, the white circles represent microlenses in the array. Each microlens may have a diameter of, for example, 240 microns. The distance between the centers of the microlenses (referred to as the pitch) may be, for example, 250 microns. Other diameters and/or pitches may be used. The black region represents a mask or masking on the microlens array to prevent light passing through the microlens array except through the microlenses. To create the mask, for example, on one side of the wafer (e.g., the back side of the wafer, with the microlens curvature on the front side), the appropriate masked region may be coated with an opaque material or substance, such as black chromium. Alternatively, the mask may be deposited on one wafer, while the microlenses are manufactured on another wafer; the two wafers may then be combined to create the microlens array. Other methods of manufacturing a microlens array and/or of applying a mask to a microlens array may be used. In addition, other methods of adding apertures to microlenses in a microlenses array than by masking the microlenses may be used.

Figure 30B:
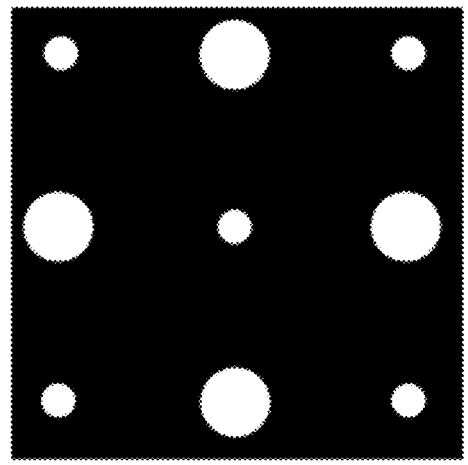
FIGS. 30B through 30D illustrate different masking patterns that may be applied to a microlens array such as the array illustrated in FIG. 30A to provide varying apertures for the microlenses, according to some embodiments.
Figure 30C:
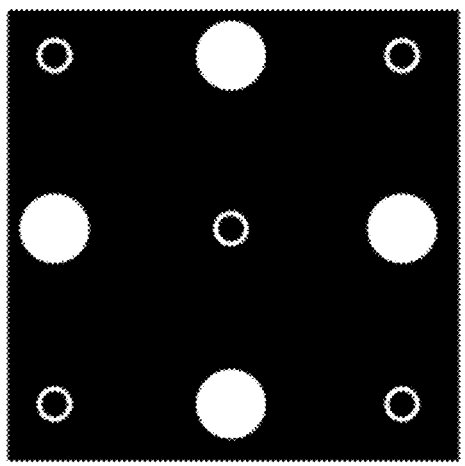
Figure 30D:
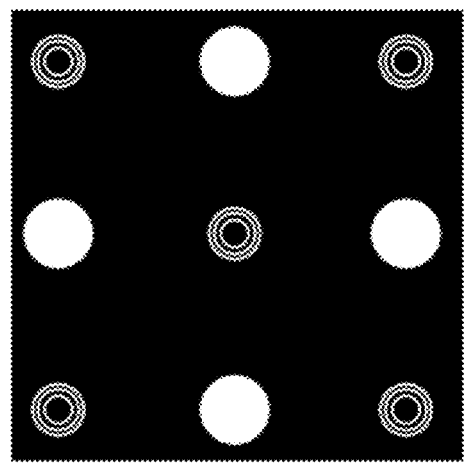

FIGS. 30B through 30D illustrate different masking patterns that may be applied to a microlens array such as the array illustrated in FIG. 30A to provide varying apertures for the microlenses, according to some embodiments. In the patterns illustrated in FIGS. 30B through 30D, every other microlens in the array is completely covered with the mask, e.g. by applying a black chromium coating to the wafer, and thus is unused. This increases spacing between microlenses, making it possible to capture larger microimages on the sensor. FIG. 30B illustrates a pattern of alternating circular apertures that differ in size by a factor of 4 by extending the opaque coating to partially cover some of the microlenses. Thus, the microlenses with the smaller aperture capture microimages that are ¼ as bright as the microimages captured by the microlenses with the larger aperture.

FIGS. 30C and 30D illustrate patterns of alternating apertures that differ in size in which different shapes than a pure open circle is used for the smaller aperture. At the scale of the microlenses used in the microlens array, small circular apertures may result in diffraction becoming a significant problem, which may result in blurring in the captured microimages. For example, smaller apertures than the apertures shown in FIG. 30B may produce blur bigger than the pixel size. As a solution to the problem of blurring that may be introduced by the use of smaller circular apertures, some embodiments may use other shapes for the apertures. For example, a ring shape, as shown for the smaller apertures in FIG. 30C, may be produced, for example by appropriately applying the opaque coating at the center and outside edges of the microlenses, to reduce the exposure for microimages captured via the microlenses while producing sharper images than could be captured using a pure open circle as shown in FIG. 30B. The diffraction blur produced by the ring apertures of FIG. 30C, and thus the sharpness of the microimages, may be comparable to that of the smaller apertures shown in FIG. 30B; however, the total amount of light is reduced 8 times by the ring apertures of FIG. 30C instead of the 4 times reduction of the smaller apertures of FIG. 30B. As another example, two or more concentric rings, for example rings appropriately representing Fresnel zones as in a zone plate, as shown for the smaller apertures in FIG. 30D, may be used to reduce the exposure for microimages captured via the microlenses while producing sharper images than could be captured using a pure open circle as shown in FIG. 30B.

Figure 31A:
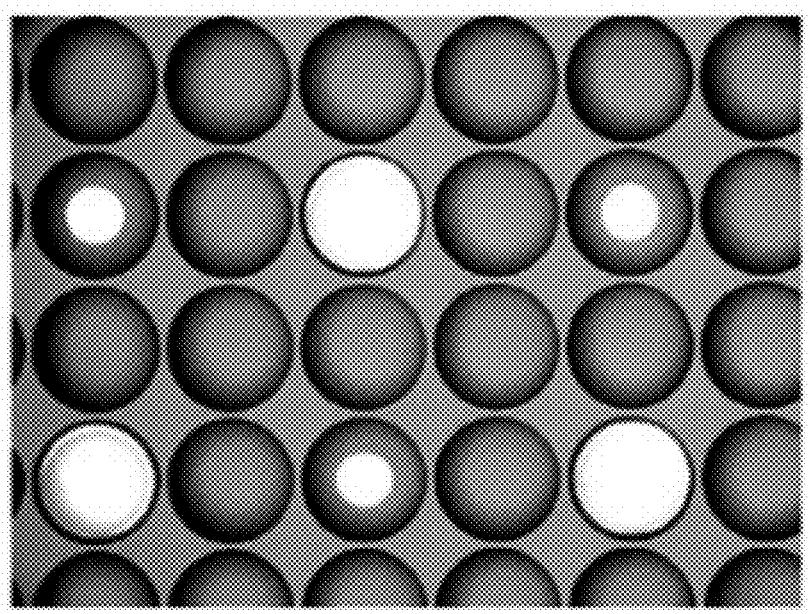
FIGS. 31A and 31B show magnified portions of images of example actual microlens arrays that include different apertures.
Figure 31B:
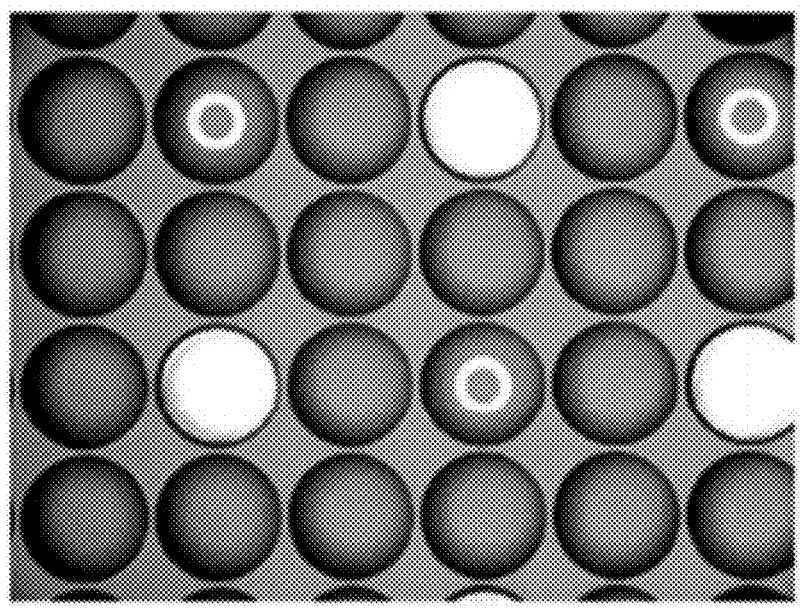

FIGS. 31A and 31B show magnified portions of images of example actual microlens arrays that include different apertures. FIG. 32A corresponds to the aperture pattern shown in FIG. 30B, and FIG. 32B corresponds to the aperture pattern shown in FIG. 30C that uses ring apertures for the smaller apertures.

FIG. 32 illustrates an example circular microlens wafer including apertures at the microlenses, according to some embodiments, and is not intended to be limiting. The wafer may have an outside diameter of 150 mm, with a diameter of the optically usable microlenses array at 130 mm. The microlenses may be 0.49 mm in diameter, with a pitch of 0.5 mm. The microlenses may be arranged in a square grid. The wafer may be coated, for example using black chromium, while leaving a checkerboard pattern of two different apertures on the microlenses. The larger aperture may be 0.4 mm in diameter, while the smaller aperture may be 0.2 mm in diameter. The callout shows a zoom in to a portion of the microlens array, and shows the edges of the microlenses as dotted lines and the edges of the apertures as solid lines. Note that the pattern shown on this example wafer is similar to the pattern shown in FIG. 29.

Figure 33:
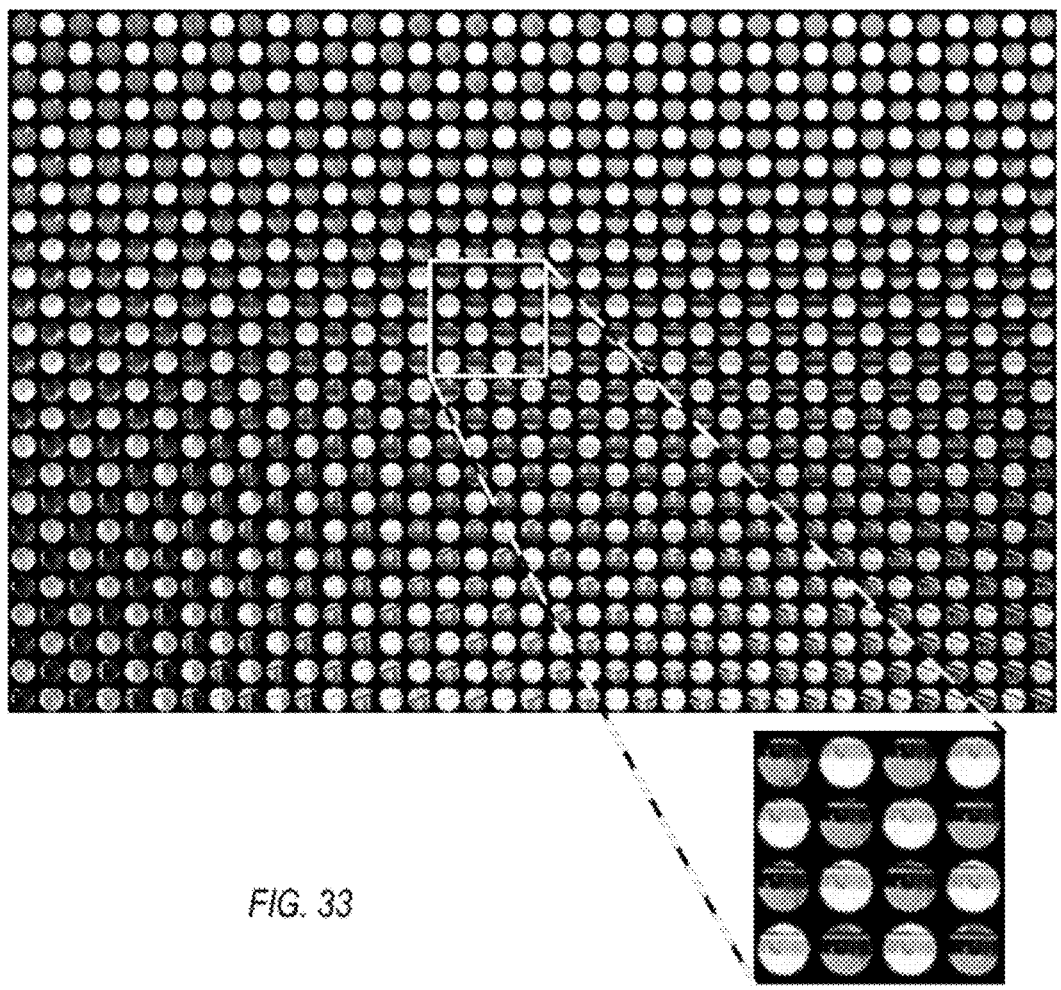
FIG. 33 shows a magnified portion of an example flat captured with a focused plenoptic camera using an alternating pattern of different apertures at the microlenses, according to some embodiments.

FIG. 33 shows a magnified portion of an example flat captured with a focused plenoptic camera using an alternating pattern of different apertures at the microlenses, according to some embodiments. The image has been converted to grayscale from a color image, and the brightness and contrast have been adjusted to more clearly show the effects of the different apertures. This example flat was captured with a pattern of alternating circular apertures that differ in size by a factor of 4, similar to that shown in FIGS. 30B and 31A. Thus, the microlenses with the smaller aperture capture microimages that are ¼ as bright as the microimages captured by the microlenses with the larger aperture. The resultant alternating pattern of brighter and darker microimages is clearly visible in the image. The area in the white square has been further expanded to more clearly illustrate the alternating bright and dark microimages captured at the sensor.

Figure 34A:
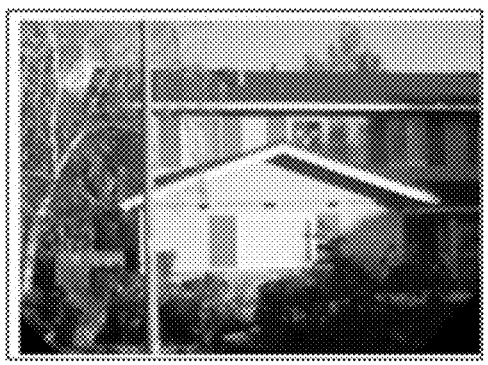
FIGS. 34A and 34B show two example images generated from the flat of which a portion is shown in FIG. 33.
Figure 34B:
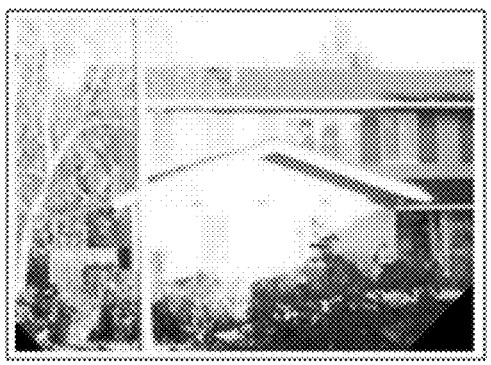

FIGS. 34A and 34B show two example images generated from the flat of which a portion is shown in FIG. 33. Example methods for assembling the microimages from the flat to generate the images are shown in FIGS. 22 and 25. FIG. 34A was generated from the microimages captured by the microlenses with the smaller aperture (the darker microimages). FIG. 34B was generated from the microimages captured by the microlenses with the larger aperture (the brighter microimages). Thus, the two images shown in FIGS. 34A and 34B differ in brightness by a factor of 4. Note the overexposed areas of FIG. 34B and the underexposed areas of FIG. 34A that compensate each other.

The two images shown in FIGS. 34A and 34B illustrate digital images that may be displayed or printed, and are not HDR images. However, the two images may be combined to form a High Dynamic Range (HDR) image according to any of a variety of High Dynamic Range Imaging (HDRI) techniques for generating HDR images from input images. HDR images are not directly printable, so an example HDR image resulting from a combination of the two images shown in FIGS. 34A and 34B is not presented.

Figure 35:
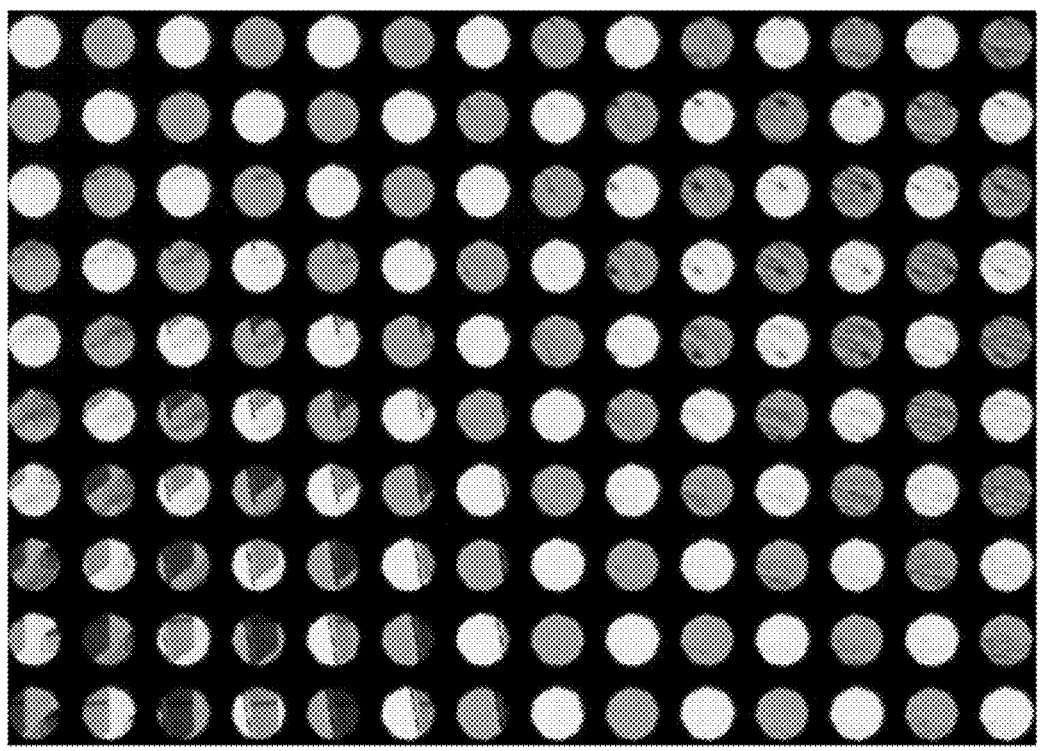
FIG. 35 shows a magnified portion of another example flat captured with a focused plenoptic camera using an alternating pattern of different apertures at the microlenses, according to some embodiments.

FIG. 35 shows a magnified portion of another example flat captured with a focused plenoptic camera using an alternating pattern of different apertures at the microlenses, according to some embodiments. The image has been converted to grayscale from a color image. This example flat was captured with a pattern of alternating circular apertures that differ in size by a factor of 4, similar to that shown in FIGS. 30B and 31A. Thus, the microlenses with the smaller aperture capture microimages that are ¼ as bright as the microimages captured by the microlenses with the larger aperture. The resultant alternating pattern of brighter and darker microimages is clearly visible in the image.

Figure 36A:
FIGS. 36A and 36B show two example images generated from the flat of which a portion is shown in FIG. 35.
Figure 36B:

FIGS. 36A and 36B show two example images generated from the flat of which a portion is shown in FIG. 35. Example methods for assembling the microimages from the flat to generate the images are shown in FIGS. 22 and 25. FIG. 36A was generated from the microimages captured by the microlenses with the smaller aperture (the darker microimages). FIG. 36B was generated from the microimages captured by the microlenses with the larger aperture (the brighter microimages). Thus, the two images shown in FIGS. 36A and 36B differ in brightness by a factor of 4. Note that the overexposed areas of FIG. 36B and the underexposed areas of FIG. 36A compensate each other.

The two images shown in FIGS. 36A and 36B illustrate digital images that may be displayed or printed, and are not HDR images. However, the two images may be combined to form a High Dynamic Range (HDR) image according to any of a variety of High Dynamic Range Imaging (HDRI) techniques for generating HDR images from input images. HDR images are not directly printable, so an example HDR image resulting from a combination of the two images shown in FIGS. 36A and 36B is not presented.

Focused Plenoptic Camera with Neutral Density Filters

At the scale of the microlenses used in the microlens array, small apertures may result in diffraction becoming a significant problem, which may result in blurring in the captured microimages. For example, smaller apertures than the apertures shown in FIGS. 30B and 30C may produce unacceptable blurring in the microimages due to diffraction. Thus, apertures may not be able to provide a wide enough range of exposures for at least some uses.

To provide a wider range of exposures than can be provided using apertures, some embodiments of a focused plenoptic camera may include a neutral density filter, or mask, for at least some of the microlenses of the microlens array. The apertures of the microlenses thus remain wide, while the mask controls the light transmission.

Figure 37A:
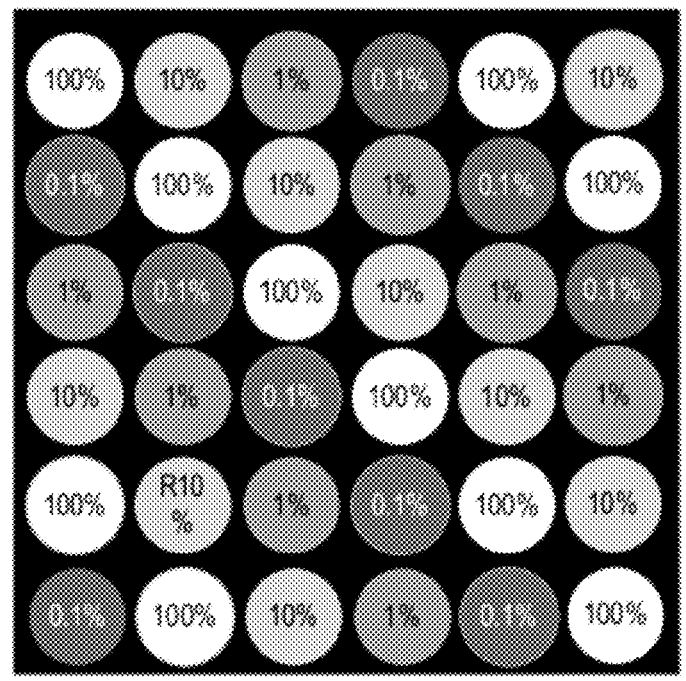
FIGS. 37A and 37B illustrate different example patterns of neutral density filters on a microlens array according to some embodiments.
Figure 37B:
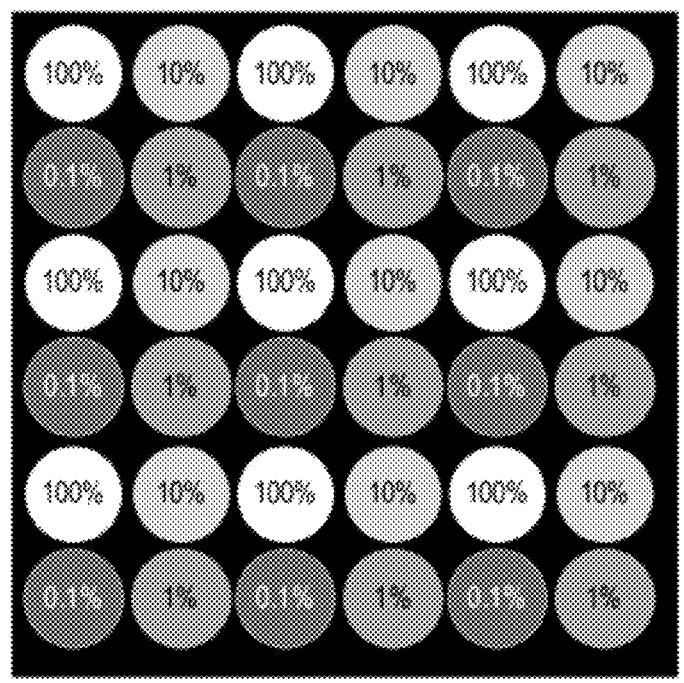

FIGS. 37A and 37B illustrate different example patterns of neutral density filters on a microlens array according to some embodiments. In some embodiments, the neutral density filters may be applied to the microlenses, for example via applying varying amounts of a coating of material on one side of the microlens array. The microlens array may be manufactured as a wafer, for example a glass or fused silica wafer, with the microlenses integrated into the wafer. FIG. 32 illustrates an example circular microlens wafer. Referring to FIGS. 37A and 37B, the circles represent microlenses in the array. Each microlens may have a diameter of, for example, 240 microns. The distance between the centers of the microlenses (referred to as the pitch) may be, for example, 250 microns. Other diameters and/or pitches may be used. The black region represents a mask or masking on the wafer to prevent light passing through the wafer except through the microlenses. To create the mask, for example, on one side of the wafer (e.g., the back side of the wafer, with the microlens curvature on the front side), the appropriate completely masked region may be coated with an opaque material or substance, such as black chromium. Alternatively, the mask may be deposited on one wafer, while the microlenses are manufactured on another wafer; the two wafers may then be combined to create the microlens array.

As shown in FIGS. 37A and 37B, some of the microlenses may be left with no coating, while varying levels of the coating may be applied to others of the microlenses to thus provide varying levels of masking that act as neutral density filters for the microlenses. In FIGS. 37A and 37B, four levels of light filtering have been applied: 100%, 10%, 1%, and 0.1%. The lenses indicated at 100% have no coating applied, and thus allow the transmission of 100% of the light to the sensor; the lenses indicated at 10% have enough coating applied to reduce the light transmission through the lenses to the sensor to 10% of the light allowed through the uncoated lenses; the lenses indicated at 1% have enough coating applied to reduce the light transmission through the lenses to the sensor to 1% of the light allowed through the uncoated lenses; and the lenses indicated at 0.1% have enough coating applied to reduce the light transmission through the lenses to the sensor to 0.1% of the light allowed through the uncoated lenses.

FIGS. 37A and 37B show two different example patterns of four levels of neutral density filtering on the microlens array that allow microimages at four levels of exposure to be captured simultaneously at the sensor. Other patterns may be used. For example, in some embodiments, every other microlens in the array may be completely covered with the mask, e.g. by applying a black chromium coating to the wafer, to thus increase spacing between microlenses so that larger microimages may be captured on the sensor. In addition, more or fewer levels of neutral density filters may be used to provide more or fewer levels of exposure to be captured. In addition, while FIGS. 37A and 37B show four levels of neutral density filtering that allow light transmission at 100% (1.0), 10% (0.1 or $\frac{1}{10}$), 1% (0.01 or $\frac{1}{100}$), and 0.1% (0.001 or $\frac{1}{1000}$), other levels of neutral density filtering may be used; for example, four levels of neutral density filtering that allow light transmission at 1.0, $\frac{1}{4}$, $\frac{1}{16}$, and $\frac{1}{64}$ may be used.

FIG. 38 shows an example of a checkerboard pattern of four different levels of filtering according to some embodiments. As an alternative to the circular masks as illustrated in FIGS. 37A and 37B, in some embodiments, a grid of square masks may be used, as shown in FIG. 38. For example, a checkerboard mask consisting of four squares that allow different levels of light transmission, for example 100%, 10%, 1%, and 0.1% as shown in FIG. 38, may be used. Other levels of light transmission may be used. For example, four levels of neutral density filtering that allow light transmission at 1.0, $\frac{1}{4}$, $\frac{1}{16}$, and $\frac{1}{64}$ may be used. In addition, more or fewer levels of light transmission may be used.

In some embodiments, the checkerboard pattern may be deposited on a wafer 2110, which may then be combined with the microlens wafer. Alternatively, the checkerboard pattern may be directly deposited on the microlens wafer. In some embodiments, different amounts of coating (e.g., black chromium) that allow different level of light transmission may be deposited independently on the wafer 2110 through a separate coating mask 2100, as illustrated in FIGS. 39A through 39C. In FIG. 39A, coating mask 2100A is used to apply the 0.1% coating to appropriate squares on wafer 2110. In FIG. 39B, coating mask 2100B is used to apply the 1% coating to appropriate squares on wafer 2110. In FIG. 39C, coating mask 2100C is used to apply the 10% coating to appropriate squares on wafer 2110. Note that no coating is required for the 100% squares on wafer 2110.

Other methods of manufacturing a microlens array, manufacturing a coated wafer, and/or of applying varying levels of light transmission masking to at least some of the microlenses in a microlens array may be used than those described above. For example, a wafer may be coated to allow four different levels of light transmission, for example 100%, 10%, 1%, and 0.1%, using a single coating mask, such as coating mask 2150 shown in FIGS. 40A and 40B, and depositing the coating (e.g., black chromium) in two steps, as illustrated in FIGS. 40A and 40B. In FIG. 40A, coating mask 2150 is used to deposit the 1% coating onto particular squares of wafer 2160. In FIG. 40B, coating mask 2150 is rotated counterclockwise 90%, and used to deposit 10% coating onto particular squares of wafer 2160. The coated wafer 2160 that results from this process is shown in FIG. 41A. As shown in FIG. 41A, using the pattern of coating mask 2150 first to coat some squares of wafer 2160 at 1%, and then coating some squares of wafer 2160 at 10% after rotating the mask 2150 by 90 degrees, results in some squares remaining uncoated (100%), some squares coated at 10%, some squares coated at 1%, and the remaining squares (those that were coated at both orientations of mask 2150) coated at 0.1%.

Wafer 2160 may then be cut or otherwise separated into four different wafers, as shown in FIG. 41B. Two of the wafers have four different levels of light transmission (100%, 10%, 1%, and 0.1%) and two of the wafers have two different levels of light transmission (one with 100% and 10%, and the other with 100% and 1%).

Combining Neutral Density Filters with Apertures

Figure 42:
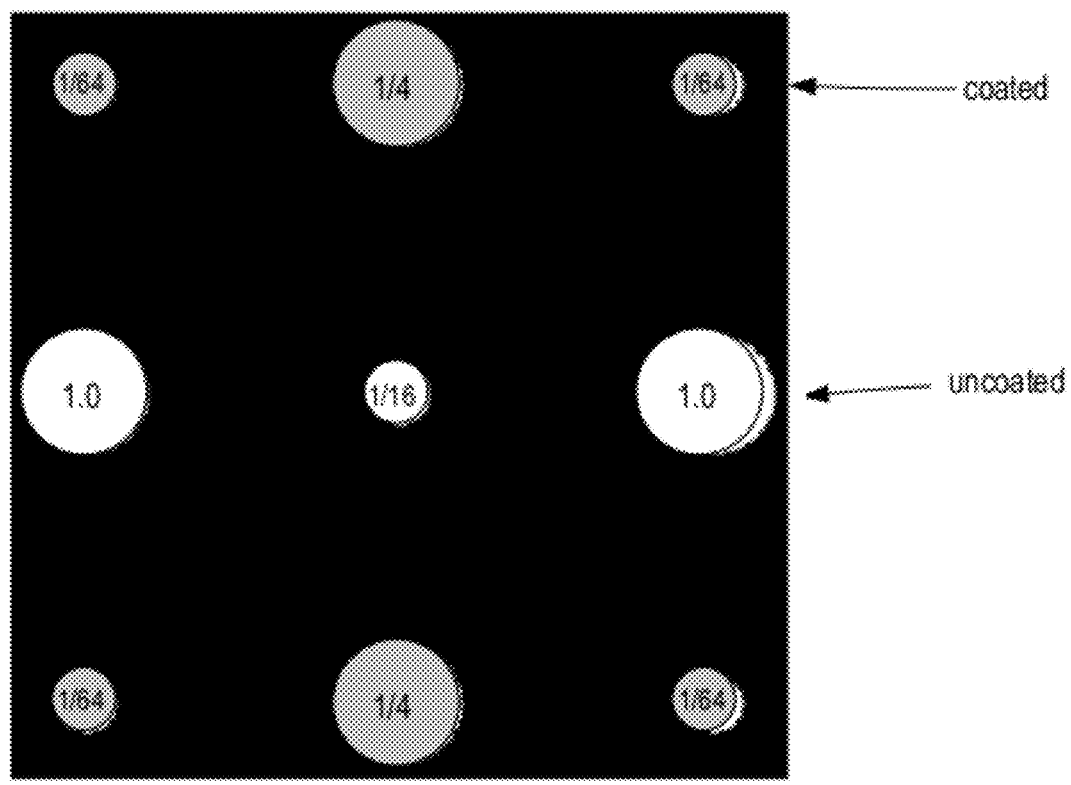
FIG. 42 shows an example microlens array that includes both apertures and neutral density filters at some of the microlenses, according to some embodiments.

In some embodiments, neutral density filters may be combined with a microlens array having apertures as previously described so that the final exposure is the result of the combination of the neutral density filters and the apertures. FIG. 42 shows an example microlens array that includes both apertures and neutral density filters at some of the microlenses, according to some embodiments. In this example, a mask of horizontal stripes of transmission levels 1.0 and $\frac{1}{16}$ is deposited on top of microlenses with apertures at 1.0 and $\frac{1}{4}$ as shown in FIG. 30B to produce four levels of exposure: 1.0, $\frac{1}{4}$, $\frac{1}{16}$, and $\frac{1}{64}$.

Figure 43:
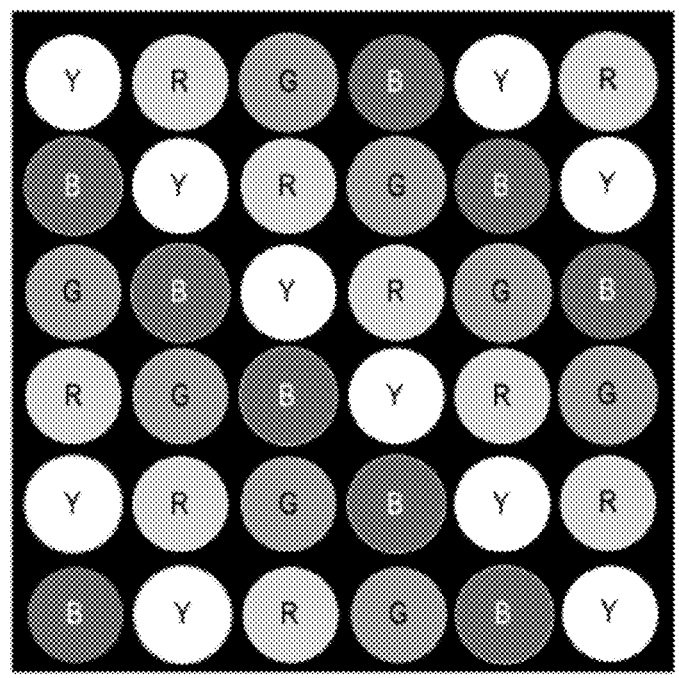
FIG. 43 illustrates an example pattern of different color filters on a microlens array, according to some embodiments.

Applying Color and/or Polarizing Filters to Microlenses in a Focused Plenoptic Camera Similar methods as those described above for neutral density filters may be used to deposit various color filters and/or polarizing filters as coating on separate wafers or directly on the microlens array. With an appropriate pattern of color filters applied to the microlenses in the array, true color imaging may be achieved in a focused plenoptic camera using a grayscale sensor. FIG. 43 illustrates an example pattern of four different color filters (R (red), G (green), B (blue), and Y (yellow)) on a microlens array, according to some embodiments. Different patterns may be used, ewer or more color filters may be used, and different color filters may be used, in various embodiments. Since nearby microlenses in a focused plenoptic camera capture microimages that include the same points from the main image, different color channels may be captured separately at the sensor for each point in the main image. In contrast, conventional Bayer-type filter sensors capture only one color channel (typically R, G, or B) at each pixel of the sensor, and thus only one color is captured for a particular point in the image. Foveon® sensors provide three stacked layers of pixels that allow three color channels (typically R, G, and B) to be captured at each point in the image. However, the Foveon® sensor arrangement that stacks pixels limits the number of color channels that may be captured for a point. With a focused plenoptic camera, from four to 100, or even more, copies of the same image, and thus of the same point in the image, may be captured by different microlenses. In contrast to Foveon® sensors, a focused plenoptic camera using an appropriate pattern of different color filters applied to the microlenses in the array may thus capture more than three, up to 100 or even more, microimages that include the same point in the image in different color channels. With, for example, a pattern of 100 different color filters each transmitting only a narrow range of the color spectrum, an embodiment of a focused plenoptic camera may sample all 100 wavelengths at a point in the image. Thus, embodiments of a focused plenoptic camera using color filters may provide true spectral imaging.

Figure 44:
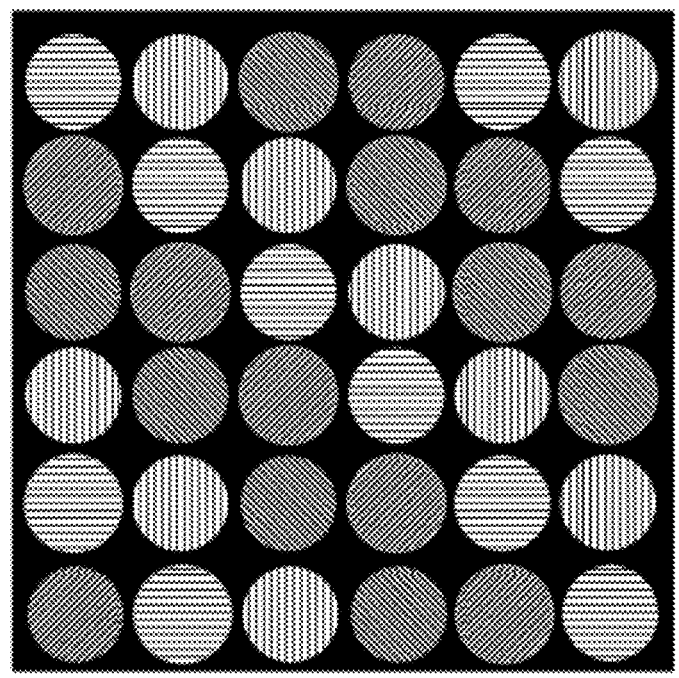
FIG. 44 illustrates an example pattern of different polarizing filters on a microlens array, according to some embodiments.

FIG. 44 illustrates an example pattern of four different polarizing filters (horizontal, vertical left rotational and right rotational) on a microlens array, according to some embodiments. With polarized filters, different modes of polarization may be captured in different microimages at the same time.

A raw image or "flat" captured using a focused plenoptic camera that incorporates two or more different color or polarizing filters includes multiple microimages captured according to the two or more different filters. One or more different images may then be assembled from the microimages, with each image assembled from the microimages captured using one of the different filters. A final image may then be generated by appropriately combining the images assembled from the microimages. Alternatively, a final image, or multiple images, may be assembled from the microimages by first combining the microimages and then assembling the combined microimages to produce one or more output images.

Combining Different Types of Filters in a Focused Plenoptic Camera

The different types of filters described above may be used or combined in a focused plenoptic camera in many different ways. For example, appropriate filters and/or apertures may be used in combination to perform true color imaging and HDR imaging at the same time, or polarizing filtering and color filtering at the same time, or even polarizing filtering, color filtering and HDR imaging at the same time. As another example, 3D imaging may be combined with HDR imaging. In this case, it may be appropriate to first combine neighboring microimages captured using different neutral density filters and/or apertures into a true HDR flat, and then apply appropriate light-field techniques to the HDR flat to, for example, produce 3D views or refocused views from the HDR flat.

Using appropriate combinations of filters, apertures, and techniques, embodiments of the focused plenoptic camera may be used to capture the full plenoptic function, which depends not only on position and angle, but also on wavelength, polarization and potentially other parameters. Thus, embodiments of the focused plenoptic camera may provide higher order multiplexing of a highly dimensional function onto the 2D sensor.

Figure 45:
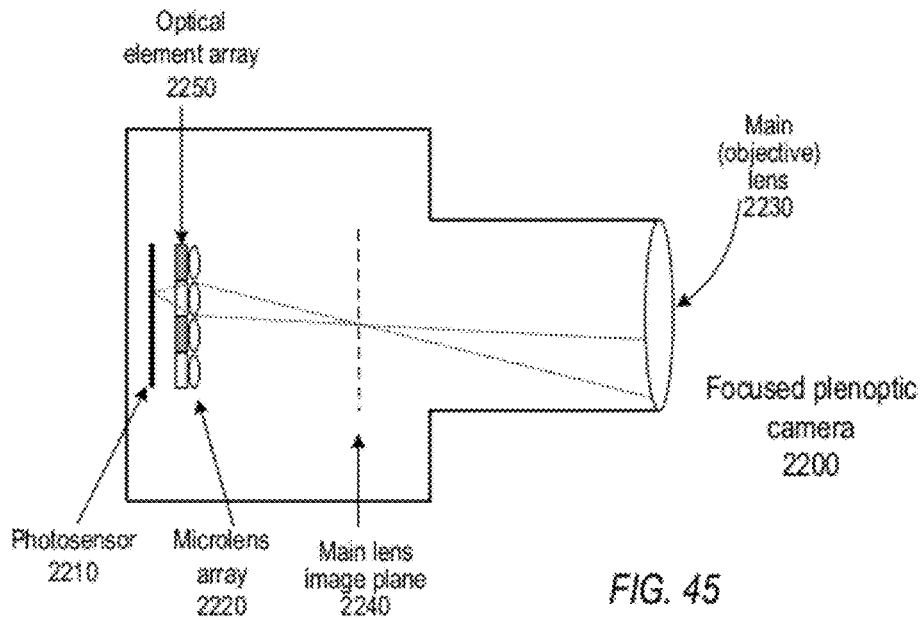
FIG. 45 is a block diagram illustrating a focused plenoptic camera including an array of optical elements such as filters or apertures according to some embodiments.

FIG. 45 is a block diagram illustrating a focused plenoptic camera, for example as illustrated in FIG. 6, including an array of optical elements such as filters or apertures according to one embodiment. Focused plenoptic camera 2200 may include a main (objective) lens 2230, a microlens array 2220, and a photosensor 2210. Microlens array 2220 may be located at a distance greater than f from photosensor 2210, where f is the focal length of the microlenses in array 2220. In addition, the microlenses in array 2220 are focused on the image plane 2240 of the main lens 2230. In some embodiments, photosensor 2210 may be conventional film; in other embodiments, photosensor 2210 may be a device for digitally capturing light, for example a CCD.

Focused plenoptic camera 2200 includes an optical element array 2250 proximate to the microlens array 2220. Optical element array 2250 includes a plurality of optical elements such as the filters or apertures as described herein. In FIG. 45, optical element array 2250 is shown as positioned behind microlens array 2220, between microlens array 2220 and photosensor 2210. However, in some embodiments, optical element array 2250 may be positioned in front of microlens array 2220, between microlens array 2200 and main lens 2230. Furthermore, some embodiments may include more than one optical element array 2250, and some embodiments may include at least one optical element array 2250 positioned behind microlens array 2220 and at least one optical element array positioned in front of microlens array 2220. While FIG. 45 shows optical element array 2250 as separate from microlens array 2220, for example as implemented on a separate wafer or other component than the microlens array 2220, in some embodiments the optical elements and microlenses may be integrated into one component, such as a silica, fused silica, or glass wafer as shown in FIG. 32.

In some embodiments in which the optical element array 2250 is a separate component from the microlens array 2220, the camera 2200 may be configured so that an optical element array 2250 may be inserted or removed from the camera 2200, replaced with a different optical element array 2250, and/or augmented by adding additional optical element array(s) 2250. For example, in some embodiments, an optical element array 2250 comprising different neutral density filters may be swapped for an optical element array 2250 comprising color filters or polarizing filters. Similarly, in some embodiments in which the optical element array 2250 is integrated with the microlens array 2220, the integrated array of microlenses and optical elements such as filters may be swapped for a different array, for example an array with different microlenses and/or filters, or for an array including only microlenses.

The optical elements in optical element array 2250 may be apertures or neutral density filters that affect the exposure at photosensor 2210, color filters that affect the wavelength of light that is received at photosensor 2210, polarizing filters that affect the polarization of light that is received at photosensor 2210, or some other type of optical element that affects light received at photosensor 2210. In some embodiments, optical element array 2250 may include two or more different types of optical elements, for example neutral density filters and color filters, or apertures and neutral density filters. Each optical element in optical element array 2250 corresponds to a particular one of the microlenses in microlens array 2220. However, note that configurations in which a single optical element corresponds to two or more microlenses in microlens array 2220, and/or in which two or more optical elements correspond to a single microlens in microlens array 2220, are possible and contemplated.

At least two of the optical elements provide different levels or types of effect on the light received at photosensor 2210 via the respective microlenses corresponding to the optical elements. For example, in an optical element array 2250 that includes apertures, at least two of the apertures may be of different diameters to thus produce different levels of exposure at photosensor 2210 for the respective microlenses. As another example, in an optical element array 2250 that includes neutral density filters, at least two of the filters provide different levels of filtering to thus produce different levels of exposure at photosensor 2210 for the respective microlenses. As yet another example, in an optical element array 2250 that includes color filters, at least two of the filters allow different wavelengths of the color spectrum of light to pass through the filters to thus capture different colors at photosensor 2210 for the respective microlenses. As still yet another example, in an optical element array 2250 that includes polarizing filters, at least two of the filters polarize at different angles to thus produce differently polarized light at photosensor 2210 for the respective microlenses.

Figure 46:
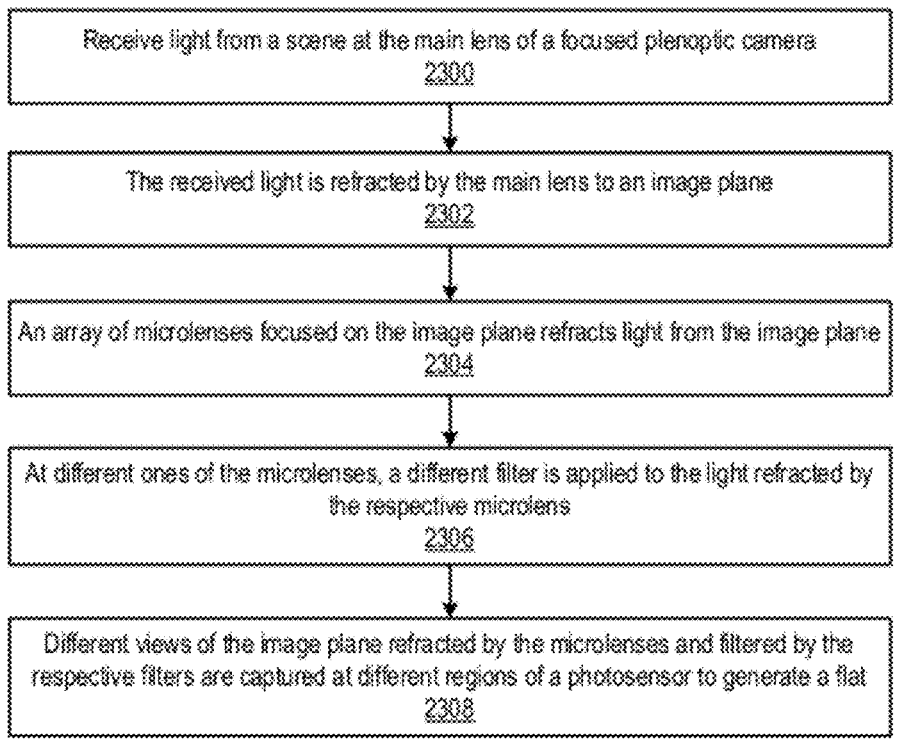
FIG. 46 is a flow chart illustrating how light is directed within a focused plenoptic camera including different filters according to some embodiments.

FIG. 46 is a flow chart illustrating how light is directed within a focused plenoptic camera including different filters, such as camera 2200 illustrated in FIG. 45, according to some embodiments. As indicated at 2300, light from a scene is received at the main lens of a focused plenoptic camera. FIGS. 6, 7 and 8 illustrate example focused plenoptic camera embodiments in which filters and/or apertures as described herein may be used. FIG. 28 illustrates an example focused plenoptic camera that includes different apertures at different microlenses; note that various filters, as described above, may be used instead of or in addition to apertures. As indicated at 2302, the received light is refracted by the main lens to an image plane. As indicated at 2304, an array of microlenses, the microlenses of which are focused on the image plane, refracts light from the image plane. As indicated at 2306, at different ones of the microlenses, a different filter or aperture is applied to the light refracted by the respective microlens. As indicated at 2308, different views of the image plane, refracted by the microlenses and filtered by the respective filters, are captured at different regions of the photosensor to generate a flat; the flat includes one microimage for each microlens in the microlens array.

Depending on the focal length of the main lens of the focused plenoptic camera, any object beyond some distance from the main lens, typically one to five meters, is at optical infinity, with subpixel precision. When the main image created by the main lens of the focused plenoptic camera represents objects from a scene that are at optical infinity, those objects are exactly at the focal plane of the camera, one focal length from the main lens. The different views of the main image captured by the different microlenses are identical or nearly identical 3D views of the objects, that is identical or nearly identical images, but modified in brightness, color, polarization, or other characteristics. Thus, imaging functions, such as HDR imaging and spectral imaging, performed according to embodiments may produce precise and high quality output images, such as HDR images, color images, and so on.

Figure 47:
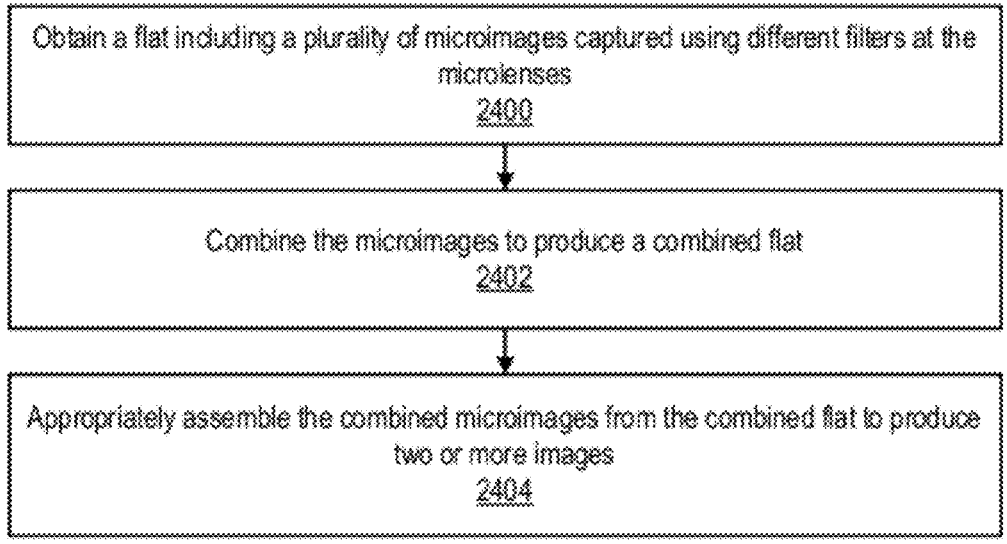
FIG. 47 is a flowchart illustrating a method in which the microimages captured using different filters are first combined to produce a combined flat and then assembled to produce one or more output images, according to some embodiments.

Rendering Methods for Flats Captured by a Focused Plenoptic Camera Using Different Filters FIGS. 47, 48, 49A-49B, and 50 illustrate general methods for rendering flats captured with a focused plenoptic camera including filters and/or apertures as described above. FIG. 47 is a flowchart illustrating a method in which the microimages captured using different filters are first combined to produce a combined flat and then assembled to produce one or more output images, according to some embodiments. As indicated at 2400, a flat captured by a focused plenoptic camera including different filters or apertures at the microlenses may be obtained (see, e.g., FIGS. 33 and 35 for examples of what such a flat may look like to a human observer). As indicated at 2402, the captured microimages may be combined to create a combined flat. For example, if apertures or neutral density filters are used to capture an HDR image, the microimages may be combined according to an HDRI technique to produce an HDR flat. As indicated at 2404, the combined microimages from the combined flat may be appropriately assembled to produce an output image or images. Example methods for assembling microimages from a flat to generate an image or images are shown in FIGS. 22 and 25.

Figure 49A:
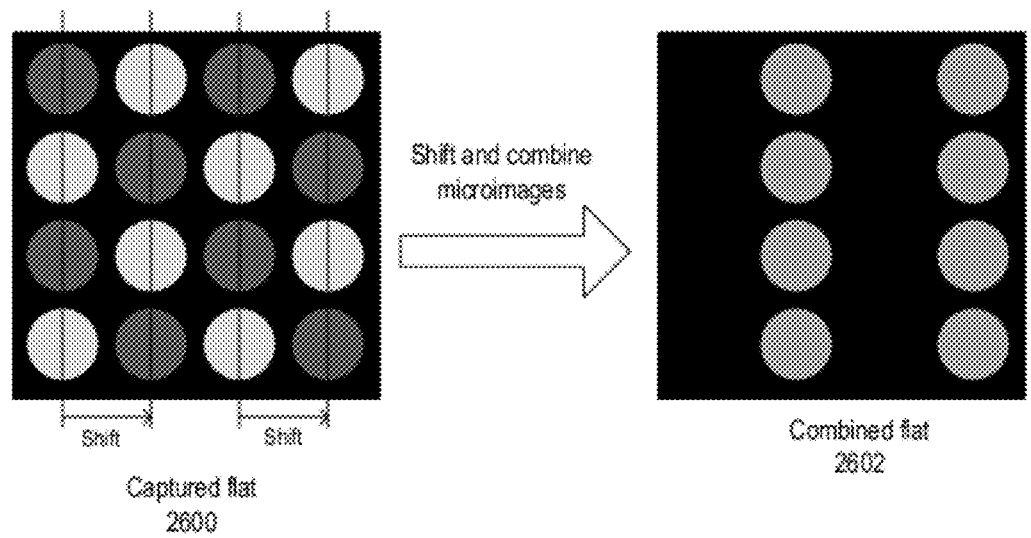
FIGS. 49A and 49B graphically illustrate a method in which the microimages captured using different filters are first combined to produce a combined flat and then assembled to produce a final image, according to some embodiments.
Figure 49B:
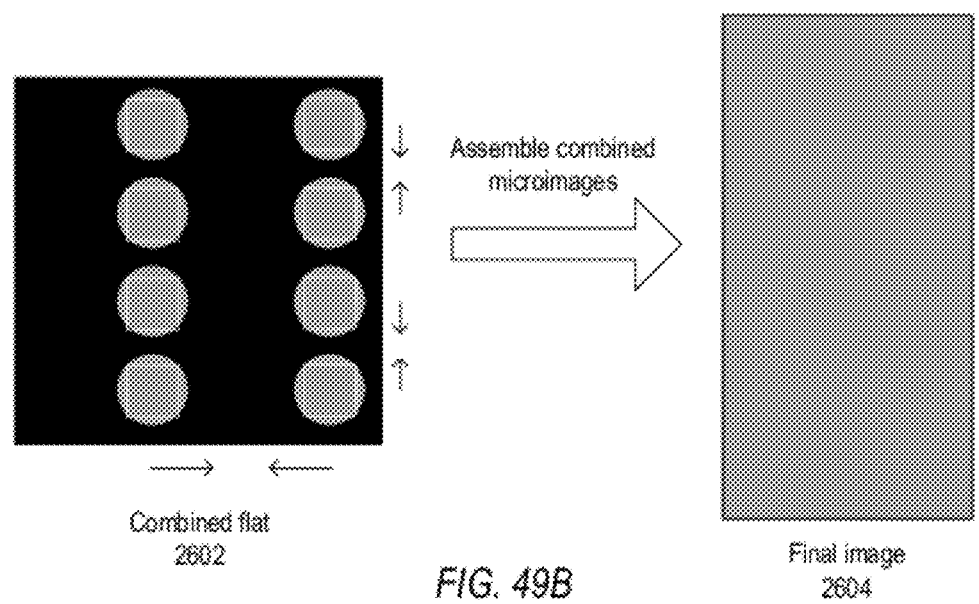

FIGS. 49A and 49B graphically illustrate a method in which the microimages captured using different filters are first combined to produce a combined flat and then assembled to produce a final image, according to some embodiments. FIG. 49A shows a flat 2600 captured by a focused plenoptic camera including different filters or apertures at the microlenses. The darker circles in captured flat 2600 represent microimages captured using one filter or aperture, and the lighter circles in flat 2600 represent microimages captured using a different filter or aperture. The captured microimages may be combined to create a combined flat 2602, as shown in FIG. 49A. In some embodiments, combining the microimages involves appropriately shifting some of the microimages and combining the microimages with others of the microimages, as shown in FIG. 49A. As shown in FIG. 49B, the combined microimages from the combined flat 2602 may be appropriately assembled to produce a final image 2604. Example methods for assembling microimages from a flat to generate an image or images are shown in FIGS. 22 and 25. In some embodiments, assembling the microimages from combined flat 2602 may include cropping the microimages, as illustrated by the dotted white squares, and moving the cropped regions together as indicated by the arrows in FIG. 49B to generate the final image 2604.

While FIGS. 49A and 49B illustrate a rendering method in which a final image 2604 is rendered from a captured flat 2600 including microimages captured using two different filters or apertures, the method may be applied, with some modifications, to render final images from captured flats including microimages captured using more than two different filters.

Figure 48:
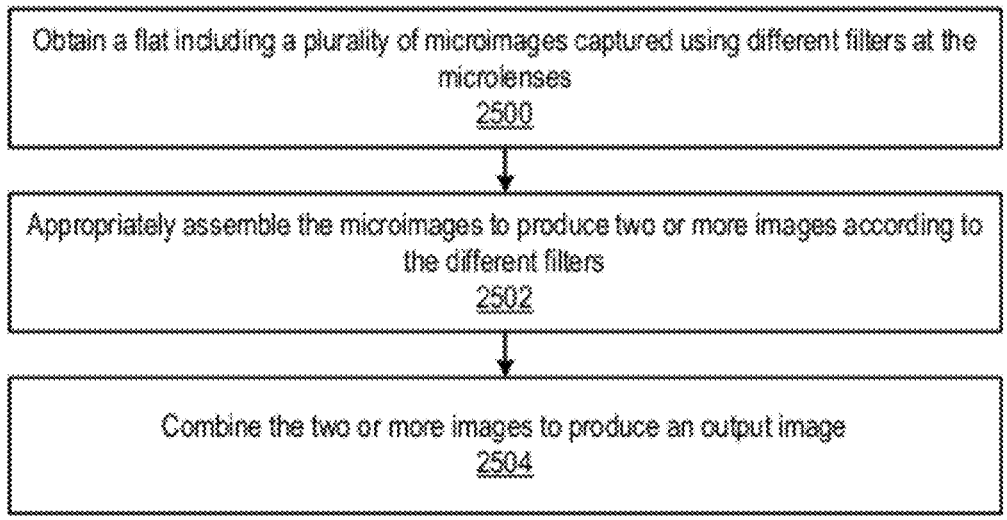
FIG. 48 is a flowchart illustrating a method in which microimages captured using different filters are first combined to produce two or more separate images, and then the separate images are combined to produce one or more output images, according to some embodiments.

FIG. 48 is a flowchart illustrating a method in which microimages captured using different filters are first combined to produce two or more separate images, and then the separate images are combined to produce one or more output images, according to some embodiments. As indicated at 2500, a flat captured by a focused plenoptic camera including different filters or apertures at the microlenses may be obtained (see, e.g., FIGS. 33 and 35 for examples of what such a flat may look like to a human observer). As indicated at 2502, the microimages from the flat may be appropriately assembled to produce two or more images according to the different filters used. Example methods for assembling microimages from a flat to generate an image or images are shown in FIGS. 22 and 25. As indicated at 2504, the two or more images may be appropriately combined to produce an output image. For example, if apertures or neutral density filters are used to capture an HDR image, the two or more images may be combined according to an HDRI technique to produce an HDR image.

Figure 50:
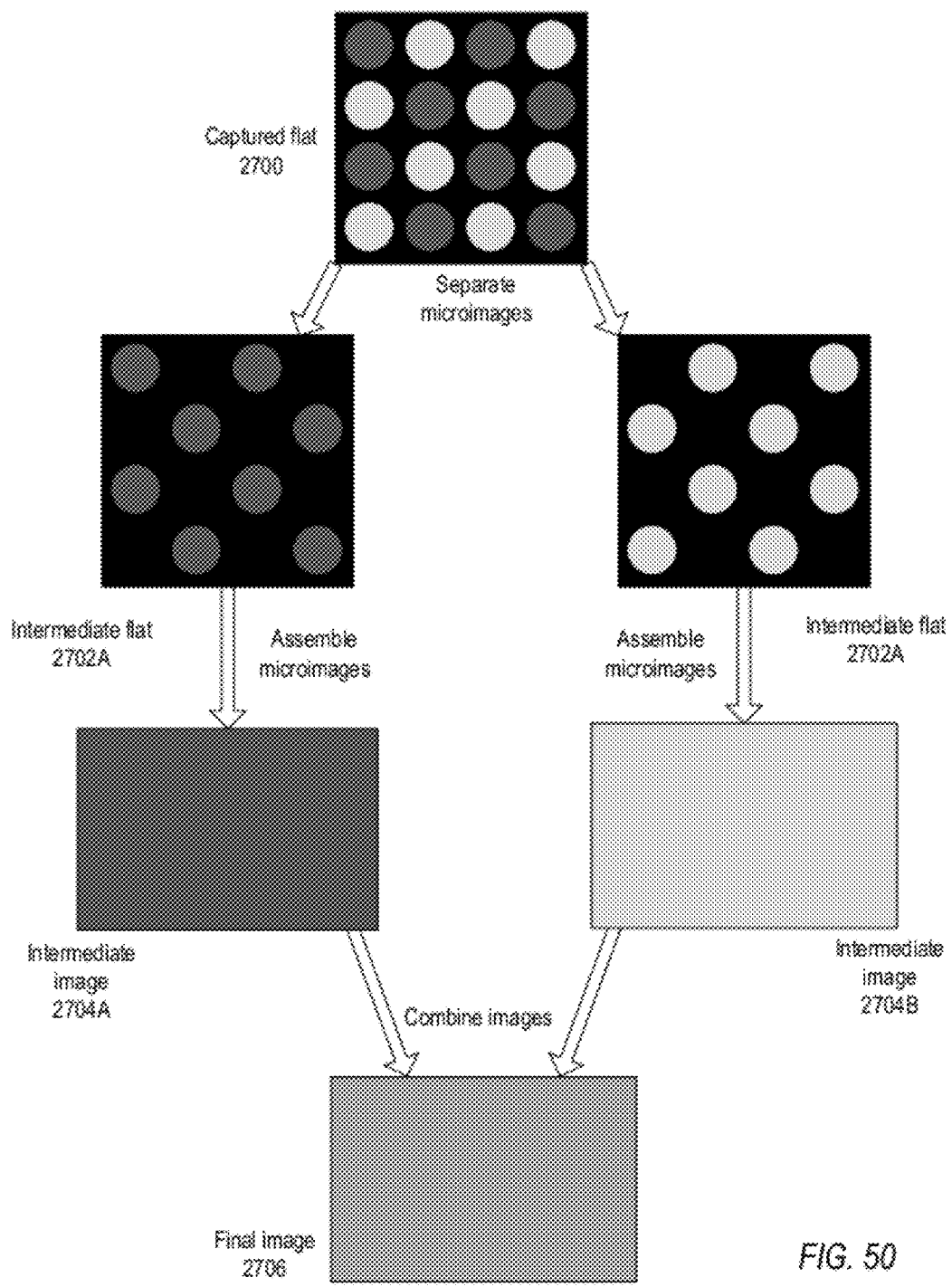
FIG. 50 graphically illustrates a method in which microimages captured using different filters are first combined to produce two or more separate images, and then the separate images are combined to produce one or more output images, according to some embodiments.

FIG. 50 graphically illustrates a method in which microimages captured using different filters are first combined to produce two or more separate images, and then the separate images are combined to produce one or more output images, according to some embodiments. FIG. 50 shows a flat 2700 captured by a focused plenoptic camera including different filters or apertures at the microlenses. The darker circles in captured flat 2700 represent microimages captured using one filter or aperture, and the lighter circles in flat 2700 represent microimages captured using a different filter or aperture. In some embodiments, the microimages from the flat 2700 may be separated to generate separate intermediate flats 2702, with each intermediate flat 2702 including microimages captured by one type of the filters or apertures. The microimages from each intermediate flat 2702 may be appropriately assembled to produce intermediate images 2704. Alternatively, the method may work directly from captured flat 2700 to assemble intermediate images 2704 without generating intermediate flats by appropriately selecting the microimages for each type of filter from the captured flat and assembling the selected microimages. Example methods for assembling microimages to generate an image or images are shown in FIGS. 22 and 25. In some embodiments, assembling the microimages from a flat 2702 may include cropping the microimages and then moving the cropped regions together. Intermediate images 2704 may be appropriately combined to produce a final image 2706. For example, if apertures or neutral density filters are used to capture an HDR image, the intermediate images 2704 may be combined according to an HDRI technique to produce an HDR image 2706.

While FIG. 50 illustrates a rendering method in which a final image 2706 is rendered from a captured flat 2600 including microimages captured using two different filters or apertures, the method may be applied, with some modifications, to render final images from captured flats including microimages captured using more than two different filters.

Implementations of Rendering Methods

Figure 23:
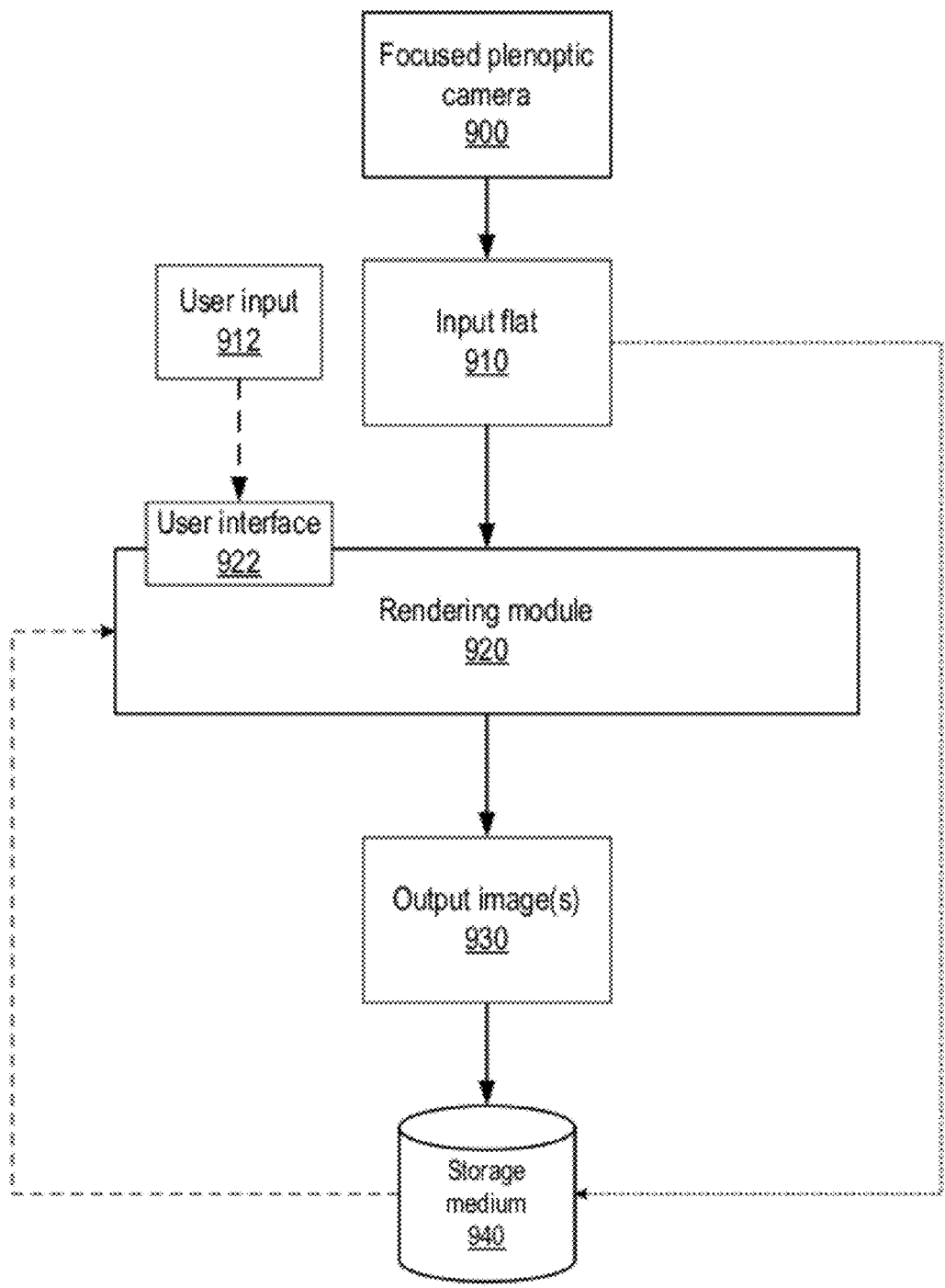
FIG. 23 illustrates a rendering module rendering a high-resolution image from a flat captured, for example, by a focused plenoptic camera, according to some embodiments.

FIG. 23 illustrates a rendering module rendering images from a flat captured, for example, by a focused plenoptic camera as described herein, according to some embodiments. Rendering module 920 may, for example, implement full-resolution light-field rendering methods as described in FIG. 22 and/or as described in FIG. 25. Rendering module 920 may also implement methods for rendering images from flats captured using various filters at the microlenses, such as the methods described in FIGS. 47, 48, 49A-49B, and 50. Rendering module 920 may also implement methods for rendering High Dynamic Range (HDR) images from captured flats as described herein. FIG. 24 illustrates an example computer system on which embodiments of rendering module 920 may be implemented. In some embodiments of a focused plenoptic camera, rendering module 920 may be implemented in the camera, e.g. in captured data processing module 260 of focused plenoptic camera 200 illustrated in FIG. 7. Referring to FIG. 23, rendering module 920 receives an input flat 910 captured by a focused plenoptic camera, such as one of the embodiments of focused plenoptic cameras described herein. Example portions of a flat as may be captured by various embodiments of a focused plenoptic camera are illustrated in FIGS. 9, 17, 33, and 35. Rendering module 920 then processes the input image 910 according to an appropriate rendering method or methods as described herein. Rendering module 920 generates as output one or more images 930. Example types of output images 930 include, but are not limited to, high-resolution images, HDR images, and HDR flats. FIGS. 19 and 20 illustrate example high-resolution images that may be rendered and output by rendering module 920. FIGS. 33 and 34A-34B, and FIGS. 35 and 36A-36B, illustrate, and the accompanying text describes, the generation of an HDR image (or an HDR flat) from an input flat. Output image 930 may, for example, be stored to a storage medium 940, such as system memory, a disk drive, DVD, CD, etc. The dashed line from input image 910 to storage medium 940 indicates that the original (input) flat 910 may also be stored. The dashed line from storage medium 940 to rendering module 920 indicates that stored images may be retrieved and further processed by rendering module 920.

In some embodiments, rendering module 920 may provide a user interface 922 via which a user may interact with the module 920, for example to specify or otherwise manage input flats 910 and output images 930 as described herein. In some embodiments, examination of microimages to determine the direction of movement of edges may be performed by a user via the user interface 922. The user may mark or otherwise indicate areas that the user determines need be inverted via the user interface 922. In some embodiments, examination of the microimages to determine the direction of movement of edges may be performed automatically by rendering module 920. Some embodiments may allow either manual or automatic examination and detection, or a combination thereof, to be used. The user interface 922 may also provide tools whereby a user may specify areas of two or more rendered images that are to be combined to produce a higher-quality output image.

In one embodiment of a full-resolution light-field rendering method implemented in a rendering module 920, the time required to render an image is proportional to the number of microlenses times the number of pixels sampled under each microlens. In other words, the time required to render an image is directly proportional to the size of the output image 930.

Example System

Embodiments of a rendering module and/or of the various rendering methods as described herein may be executed on one or more computer systems, which may interact with various other devices. One such computer system is illustrated by FIG. 24. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a rendering module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 24, memory 1020 may include program instructions 1025, configured to implement embodiments of a rendering module as described herein, e.g. a direct lighting module 300, an indirect lighting module 800, or a global illumination rendering module 900, and data storage 1035, comprising various data accessible by program instructions 1025. In one embodiment, program instructions 1025 may include software elements of embodiments of a rendering module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a rendering module as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A camera, comprising:
  a photosensor configured to capture light projected onto the photosensor;
  an objective lens, wherein the objective lens is configured to refract light from a scene located in front of the camera to form an image of the scene at an image plane of the objective lens;
  a microlens array positioned between the objective lens and the photosensor, wherein the microlens array comprises a plurality of microlenses, wherein the plurality of microlenses are focused on the image plane and not on the objective lens, wherein each microlens of the microlens array is configured to project a separate portion of the image of the scene formed at the image plane by the objective lens onto a separate location on the photosensor; and an optical element array proximate to the microlens array, wherein the optical element array is configured to affect light that passes through the microlens array to the photosensor, wherein the optical element array comprises a plurality of optical elements, wherein each optical element in the optical element array corresponds to a particular one of the plurality of microlenses, and wherein at least one of the optical elements in the optical element array is configured to affect light differently than at least one other optical element in the optical element array.

2. The camera as recited in claim 1, wherein the optical elements in the optical element array include apertures that affect the amount of light that passes through the microlens array to the photosensor, wherein at least two of the apertures are of different diameters to allow different amounts of light to pass through respective microlenses to the photosensor.

3. The camera as recited in claim 1, wherein the optical elements in the optical element array include neutral density filters that affect the amount of light that passes through respective microlenses in the microlens array to the photosensor, wherein at least two of the neutral density filters allow different amounts of light to pass through respective microlenses to the photosensor.

4. The camera as recited in claim 1, wherein the optical elements in the optical element array include color filters that affect the wavelengths of light that passes through respective microlenses in the microlens array to the photosensor, wherein at least two of the color filters allow different wavelengths of light to pass through respective microlenses to the photosensor.

5. The camera as recited in claim 1, wherein the optical elements in the optical element array include polarizing filters that affect the polarization of light that passes through respective microlenses in the microlens array to the photosensor, wherein at least two of the polarizing filters allow different polarizations of light to pass through respective microlenses to the photosensor.

6. The camera as recited in claim 1, wherein the optical elements in the optical element array include at least two different types of optical elements, wherein the types of optical elements include apertures that affect the amount of light that passes through the microlens array to the photosensor, neutral density filters that affect the amount of light that passes through respective microlenses in the microlens array to the photosensor, color filters that affect the wavelengths of light that passes through respective microlenses in the microlens array to the photosensor, and polarizing filters that affect the polarization of light that passes through respective microlenses in the microlens array to the photosensor.

7. The camera as recited in claim 1, wherein the optical element array is positioned between the microlens array and the photosensor.

8. The camera as recited in claim 1, wherein the optical element array is positioned between the objective lens and the microlens array.

9. The camera as recited in claim 1, wherein the photosensor is configured to capture a flat comprising the separate portions of the image of the scene projected onto the photosensor by the microlenses, wherein each of the separate portions is in a separate region of the flat, and wherein at least two of the separate portions differ according to the different effects of the optical elements corresponding to the microlenses that projected the at least two separate portions onto the photosensor.

10. The camera as recited in claim 9, wherein the camera is configured to store the captured flat to a memory device.

11. The camera as recited in claim 1, wherein the camera is configured so that the image plane of the objective lens is positioned between the objective lens and the microlens array.

12. The camera as recited in claim 1, wherein the camera is configured so that the image plane of the objective lens is positioned behind the photosensor.

13. A method, comprising:
receiving light from a scene at an objective lens of a camera;
refracting light from the objective lens to form an image of the scene at an image plane of the objective lens;
receiving light from the image plane at an array located between the objective lens and a photosensor of the camera and parallel to the image plane, wherein the array comprises a plurality of microlenses, wherein each of the plurality of microlenses is focused on the image plane and not on the objective lens, and wherein the array further comprises a plurality of filters or apertures, wherein each filter or aperture in the array corresponds to a particular one of the plurality of microlenses in the array, and wherein at least one subset of the filters or apertures affects light differently than at least one other subset of the filters or apertures in the array;
receiving light from the array at the photosensor, wherein the photosensor receives a separate portion of the image of the scene formed at the image plane by the objective lens from each microlens of the array at a separate location on the photosensor, and wherein at least one subset of the separate portions differs from at least one other subset of the separate portions according to the different effects of the filters or apertures in the array corresponding to the microlenses that projected the at least one subset of the separate portions onto the photosensor.

14. The method as recited in claim 13, wherein the filters or apertures in the array include filters that affect the wavelengths of light, and wherein the at least one subset of the filters or apertures allows different wavelengths of light to pass through respective microlenses than the at least one other subset of the filters or apertures in the array.

15. The method as recited in claim 13, wherein the filters or apertures in the array include filters that affect the polarization of light, and wherein the at least one subset of the filters or apertures allows a different polarization of light to pass through respective microlenses than the at least one other subset of the filters or apertures in the array.

16. The method as recited in claim 13, wherein the filters or apertures in the array affect the amount of light that passes through the microlens array to the photosensor, and wherein the at least one subset of the filters or apertures allows a different amount of light to pass through respective microlenses than the at least one other subset of the filters or apertures in the array.

17. The method as recited in claim 13, further comprising capturing a flat comprising the separate portions of the image of the scene projected onto the photosensor by the microlenses, wherein each of the separate portions is in a separate region of the flat.

18. The method as recited in claim 17, further comprising:
appropriately combining the different separate portions from the subsets of the separate portions to generate a combined flat, wherein the combined flat comprises the combined separate portions of the image of the scene; and
appropriately assembling the plurality of combined separate portions to produce one or more images of the scene.

19. The method as recited in claim 17, further comprising:
appropriately assembling the separate portions from each of the subsets of the separate portions to generate two or more separate images of the scene each corresponding to a particular subset of the separate portions; and
appropriately combining at least two of the two or more separate images of the scene to produce a combined image of the scene.

20. The method as recited in claim 17, further comprising storing the captured flat to a memory.

21. The method as recited in claim 17, wherein the filters or apertures in the array affect the amount of light that passes through the microlens array to the photosensor, and wherein the at least one subset of the filters or apertures allows a different amount of light to pass through respective microlenses than the at least one other subset of the filters or apertures in the array so that separate portions of the image of the scene are captured at different levels of exposure by different filters or apertures.

22. The method as recited in claim 21, further comprising:
appropriately combining the different separate portions from the subsets of the separate portions to generate a High Dynamic Range (HDR) flat, wherein the HDR flat comprises the combined separate portions of the image of the scene; and
appropriately assembling the plurality of combined separate portions to produce one or more HDR images of the scene.

23. The method as recited in claim 21, further comprising:
appropriately assembling the separate portions from each of the subsets of the separate portions to generate two or more separate images of the scene each corresponding to a particular subset of the separate portions; and
appropriately combining at least two of the two or more separate images of the scene to produce a High Dynamic Range (HDR) image of the scene.

* * * * *